US012529058B2

(12) United States Patent
Thompson

(10) Patent No.: US 12,529,058 B2
(45) Date of Patent: Jan. 20, 2026

(54) COMPOSITION FOR REGULATING PRODUCTION OF INTERFERING RIBONUCLEIC ACID

(71) Applicant: Wyvern Pharmaceuticals Inc., Calgary (CA)

(72) Inventor: Bradley G. Thompson, Calgary (CA)

(73) Assignee: Wyvern Pharmaceuticals Inc., Calgary (CA)

( * ) Notice: Subject to any disclaimer, the term of this patent is extended or adjusted under 35 U.S.C. 154(b) by 0 days.

(21) Appl. No.: 18/931,989

(22) Filed: Oct. 30, 2024

(65) Prior Publication Data

US 2025/0163424 A1    May 22, 2025

Related U.S. Application Data

(62) Division of application No. 18/518,069, filed on Nov. 22, 2023.

(51) Int. Cl.
*C12N 15/113*    (2010.01)
*C12N 15/86*    (2006.01)

(52) U.S. Cl.
CPC .......... *C12N 15/1137* (2013.01); *C12N 15/86* (2013.01); *C12N 2310/141* (2013.01); *C12N 2750/14143* (2013.01); *C12Y 207/01* (2013.01)

(58) Field of Classification Search
CPC ................ C12N 15/1137; C12N 15/86; C12N 2310/141; C12N 2750/14143; C12Y 207/01
See application file for complete search history.

(56) References Cited

U.S. PATENT DOCUMENTS

| | | | |
|---|---|---|---|
| 11,085,055 B2 | 8/2021 | Mallol et al. | |
| 11,162,102 B2* | 11/2021 | Minshull ............... | C12N 9/1241 |
| 11,530,423 B1 | 12/2022 | Thompson | |
| 11,873,505 B2 | 1/2024 | Thompson | |
| 12,018,274 B2 | 6/2024 | Thompson | |
| 12,134,770 B1 | 11/2024 | Thompson | |
| 2020/0362344 A1 | 11/2020 | Minshull et al. | |
| 2022/0356489 A1 | 11/2022 | Thompson | |
| 2024/0026377 A1 | 1/2024 | Thompson | |

FOREIGN PATENT DOCUMENTS

CA    2721333 A1    10/2009

OTHER PUBLICATIONS

Fiona T van den Berg, et al., Molecular Therapy—Nucleic Acids, vol. 5, 2016 (Year: 2016).*
O'Brien, et al., Aug. 3, 2018, Front Endocrinol (Lausanne), 9:402, p. 1-12; Fig. 1; p. 2, "Biogenesis of miRNAs" (Year: 2018).*
Gorski, S., Vogel, J. & Doudna, J., Nat Rev Mol Cell Biol 18, 215-228 (2017) (Year: 2017).*
Van den Berg, et al., pp. 1-12, Molecular Therapy—Nucleic Acids, vol. 5, 2016 (Year: 2016).*
O'Brien et al., Frontiers in Endocrinology, vol. 9, 2018, p. 1-2 (Year: 2018).*
Homo sapiens VEGF, mRNA, NCBI Reference Sequence, version Oct. 2023, 9 pages, retrieved from the internet Jul. 2, 2025 (Year: 2023).*
Lam et al. 2015. Molec. Ther. Nuc. Ac. 4:e252 (Year: 2015).*
Ying et al. 2008. Mol. Biotechnol. 38:257-268 (Year: 2008).*
Denzler R et al., Mol Cell. Nov. 3, 2016;64(3):565-579 (Year: 2016).*
Bottoni et al. "Targeting BTK through microRNA in chronic lymphocytic leukemia." Blood, The Journal of the American Society of Hematology 128.26 (2016): 3101-3112.
Christensen et al. "Recombinant adeno-associated virus-mediated microRNA delivery into the postnatal mouse brain reveals a role for miR-134 in dendritogenesis in vivo." Frontiers in neural circuits 3 (2010): 848.
Bofill-De Ros et al. "Guidelines for the optimal design of miRNA-based shRNAs." Methods 103 (2016): 157-166.
Brutons Tyrosine Kinase Genbank Sequence (2023).
Nature (2010. Gene Expression. Scitable. Available online at Nature.com) <https://www.nature.com/scitable/topicpage/gene-expression-14121669> (2010).
Tritschler et al. "Concepts and limitations for learning developmental trajectories from single cell genomics." Development 146.12 (2019): dev170506.
Ahmadzadeh et al. "BRAF mutation in hairy cell leukemia." Oncology reviews 8.2 (2014): 253.
Patton et al. "Biogenesis, delivery, and function of extracellular RNA." Journal of extracellular vesicles 4.1 (2015): 27494.
Clark et al. "Detection of BRAF splicing variants in plasma-derived cell-free nucleic acids and extracellular vesicles of melanoma patients failing targeted therapy therapies." Oncotarget 11.44 (2020): 4016.
NCBI Nucleotide Sequence ALK Lingand, search performed Dec. 26, 2024 (2023).
NCBI Nucleotide Sequence ALK Receptor, search performed Dec. 26, 2024 (2023).
NCBI search results for Seq ID No. 5 (2024).
GenBank EGF Sequence (2023).
GenBank EGFR Sequence (2023).
NCBI Nucleotide Sequence for PARP, search performed Dec. 26, 2024 (2024).
GenBank FLT3 Sequence (2024).

(Continued)

*Primary Examiner* — Ram R Shukla
*Assistant Examiner* — Shabana S Meyering
(74) *Attorney, Agent, or Firm* — Gowling WLG (Canada) LLP

(57) ABSTRACT

The embodiments of the present disclosure relate to decreasing the bioavailability of one or more target biomolecules by providing a composition that comprises a recombinant plasmid with one or more sequences of micro interfering ribonucleic acid (miRNA). When the recombinant plasmid interacts with a target cell, it causes the target cell to upregulate production of the miRNA, which then decreases the bioavailability of the target biomolecule. In some embodiments of the present disclosure, the target biomolecule is a kinase.

4 Claims, No Drawings

Specification includes a Sequence Listing.

(56) References Cited

OTHER PUBLICATIONS

Kondratov et al. "Direct head-to-head evaluation of recombinant adeno-associated viral vectors manufactured in human versus insect cells." Molecular Therapy 25.12 (2017): 2661-2675.
Wang et al. "Adeno-associated virus vector as a platform for gene therapy delivery". Nat Rev Drug Discov. May 2019;18(5):358-378. (Year: 2019).
Pagliuca (et al. 2013. Analysis of the combined action of miR-143 and miR-145 on oncogenic pathways in colorectal cancer cells reveals a coordinate program of gene repression. Oncogene 32:4806-4813) (Year: 2013).
Fattore (et al. 2016. miR-579-3p controls melanoma progression and resistance to target therapy. PNAS 113 [34]:E5005-E5013) (Year: 2016).
Origene (2024. Product datasheet for SC207797 B Raf [BRAF] [NM_004333] Human 3' UTR Clone. Rockville, MD: Origene) (Year:2024).
NCBI (Homo sapiens B-Raf proto-oncogene, serine/threonine kinase [BRAF], transcript variants 1-2, 4-14, mRNA: [see reference for NM number]. Available online at NCBI.nlm.nih.gov. Accessed on May 16, 2025 (Year: 2025).
MiRbase (2025. "miR-143" and "miR-145", and "miR-579-3p". Available online at miRbase.org. Accessed on May 16, 2025) (Year: 2025).

* cited by examiner

COMPOSITION FOR REGULATING PRODUCTION OF INTERFERING RIBONUCLEIC ACID

CROSS REFERENCE TO RELATED APPLICATION

The present application is a division of U.S. patent application Ser. No. 18/518,069 filed Nov. 22, 2023, entitled "Composition For Regulating Production Of Interfering Ribonucleic Acid" currently pending, the entirety of which is incorporated herein by reference.

SEQUENCE LISTING

This application contains a Sequence Listing electronically submitted via Patent Center to the United States Patent and Trademark Office as an XML Document file entitled "A8149358US-Sequence Listing.xml" created on 2023-11-17 and having a size of 75,546 bytes. The information contained in the Sequence Listing is incorporated by reference herein.

TECHNICAL FIELD

The present disclosure generally relates to compositions for regulating production of interfering ribonucleic acid (RNA). In particular, the present disclosure relates to compositions for regulating gene expression and therefore, the production of interfering RNA that will suppress over-expression or mis-expression of kinases.

BACKGROUND

Bioactive molecules, including kinases, are necessary for the homeostatic control of biological systems.

When bioactive molecules are over-expressed or mis-expressed, homeostasis is lost, and disease is often the result.

As such, it may be desirable to establish therapies, treatments and/or interventions that address when homeostasis and regulation of bioactive molecules is lost to prevent or treat the resulting disease.

SUMMARY

Some embodiments of the present disclosure relate to one or more compositions that upregulate the production of one or more sequences of micro interfering ribonucleic acid (miRNA). The sequences of miRNA may be complementary to a sequence of target messenger RNA (mRNA) that encodes for translation of a target biomolecule and the miRNA can cause the bioavailability of the target mRNA to decrease because it is degraded or inactivated by the miRNA, thereby causing a decrease in bioactivity of the target biomolecule within a subject that is administered the one or more compositions. In some embodiments of the present disclosure, the target biomolecule is a kinase. In some embodiments of the present disclosure, the target biomolecule is a kinase such as Bruton's tyrosine kinase. In some embodiments of the present disclosure, the target biomolecule is a kinase such as epidermal growth factor (EGF). In some embodiments of the present disclosure, the target biomolecule is a kinase such as vascular endothelial growth factor (VEGF). In some embodiments of the present disclosure, the target biomolecule is a kinase such as B-Raf. In some embodiments of the present disclosure, the target biomolecule is a kinase such as anaplastic lymphoma kinase (ALK). In some embodiments of the present disclosure, the target biomolecule is a kinase such as human epidermal growth factor receptor (HER). In some embodiments of the present disclosure, the target biomolecule is a kinase such as Fms-like tyrosine kinase 3 (FLT3). In some embodiments of the present disclosure, the target biomolecule is a kinase such as poly-ADP ribose polymerase (PARP).

In some embodiments of the present disclosure the compositions comprise a plasmid of deoxyribonucleic acid (DNA) that includes one or more insert sequences of nucleic acids that encode for the production of miRNA and a backbone sequence of nucleic acids that facilitates introduction of the one or more insert sequences into one or more of a subject's cells where it is expressed and/or replicated. Expression of the one or more insert sequences by one or more cells of the subject results in an increased production of the miRNA and, therefore, decreased translation or production of the target biomolecule by one or more of the subject's cells.

Some embodiments of the present disclosure relate to compositions that upregulate the production of miRNA that degrades, or causes degradation of, or inactivates or causes the inactivation of, the target mRNA of the target biomolecule.

Some embodiments of the present disclosure relate to a recombinant plasmid (RP). In some embodiments of the present disclosure, the RP comprises a nucleotide sequence of SEQ ID NO. 1 and SEQ ID NO. 2. The RP comprises a nucleotide sequence encoding one or more nucleotide sequences encoding a miRNA sequence that targets mRNA of Bruton's tyrosine kinase.

Some embodiments of the present disclosure relate to a recombinant plasmid. In some embodiments of the present disclosure, the RP comprises a nucleotide sequence of SEQ ID NO. 1 and SEQ ID NO. 3. The RP comprises a nucleotide sequence encoding one or more nucleotide sequences encoding a miRNA sequence that targets mRNA of EGF.

Some embodiments of the present disclosure relate to a recombinant plasmid. In some embodiments of the present disclosure, the RP comprises a nucleotide sequence of SEQ ID NO. 1 and SEQ ID NO. 4. The RP comprises a nucleotide sequence encoding one or more nucleotide sequences encoding a miRNA sequence that targets mRNA of VEGF.

Some embodiments of the present disclosure relate to a recombinant plasmid. In some embodiments of the present disclosure, the RP comprises a nucleotide sequence of SEQ ID NO. 1 and SEQ ID NO. 5. The RP comprises a nucleotide sequence encoding one or more nucleotide sequences encoding a miRNA sequence that targets mRNA of BRAF.

Some embodiments of the present disclosure relate to a recombinant plasmid. In some embodiments of the present disclosure, the RP comprises a nucleotide sequence of SEQ ID NO. 1 and SEQ ID NO. 6. The RP comprises a nucleotide sequence encoding one or more nucleotide sequences encoding a miRNA sequence that targets mRNA of ALK.

Some embodiments of the present disclosure relate to a recombinant plasmid. In some embodiments of the present disclosure, the RP comprises a nucleotide sequence of SEQ ID NO. 1 and SEQ ID NO. 7. The RP comprises a nucleotide sequence encoding one or more nucleotide sequences encoding a miRNA sequence that targets mRNA of HER.

Some embodiments of the present disclosure relate to a recombinant plasmid. In some embodiments of the present disclosure, the RP comprises a nucleotide sequence of SEQ ID NO. 1 and SEQ ID NO. 8. The RP comprises a nucleotide sequence encoding one or more nucleotide sequences encoding a miRNA sequence that targets mRNA of FLT3.

Some embodiments of the present disclosure relate to a recombinant plasmid. In some embodiments of the present disclosure, the RP comprises a nucleotide sequence of SEQ ID NO. 1 and SEQ ID NO. 9. The RP comprises a nucleotide sequence encoding one or more nucleotide sequences encoding a miRNA sequence that targets mRNA of PARP.

Some embodiments of the present disclosure relate to a method of making a composition/target cell complex. The method comprising a step of administering a RP comprising SEQ ID NO. 1 and one of SEQ ID NO. 2, SEQ ID NO. 3, SEQ ID NO. 4, SEQ ID NO. 5, SEQ ID NO. 6, SEQ ID NO. 7, SEQ ID NO. 8, or SEQ ID NO. 9, to a target cell for forming the composition/target cell complex, wherein the composition/target cell complex causes the target cell to increase production of one or more sequences of miRNA that decreases production of a target biomolecule.

Embodiments of the present disclosure relate to at least one approach for inducing endogenous production of one or more sequences of miRNA that target and silence mRNA of a target biomolecule, for example Bruton's tyrosine kinase. A first approach utilizes gene vectors containing nucleotide sequences for increasing the endogenous production of one or more sequences of miRNA, which are complete or partial sequences and/or combinations thereof, that target and silence the mRNA of Bruton's tyrosine kinase, which can be administered to a subject to increase the subject's production of one or more sequences of the miRNA.

Embodiments of the present disclosure relate to at least one approach for inducing endogenous production of one or more sequences of miRNA that target and silence mRNA of a target biomolecule, for example EGF. A first approach utilizes gene vectors containing nucleotide sequences for increasing the endogenous production of one or more sequences of miRNA, which are complete or partial sequences and/or combinations thereof, that target and silence the mRNA of EGF, which can be administered to a subject to increase the subject's production of one or more sequences of the miRNA.

Embodiments of the present disclosure relate to at least one approach for inducing endogenous production of one or more sequences of miRNA that target and silence mRNA of a target biomolecule, for example VEGF. A first approach utilizes gene vectors containing nucleotide sequences for increasing the endogenous production of one or more sequences of miRNA, which are complete or partial sequences and/or combinations thereof, that target and silence the mRNA of VEGF, which can be administered to a subject to increase the subject's production of one or more sequences of the miRNA.

Embodiments of the present disclosure relate to at least one approach for inducing endogenous production of one or more sequences of miRNA that target and silence mRNA of a target biomolecule, for example BRAF. A first approach utilizes gene vectors containing nucleotide sequences for increasing the endogenous production of one or more sequences of miRNA, which are complete or partial sequences and/or combinations thereof, that target and silence the mRNA of BRAF, which can be administered to a subject to increase the subject's production of one or more sequences of the miRNA.

Embodiments of the present disclosure relate to at least one approach for inducing endogenous production of one or more sequences of miRNA that target and silence mRNA of a target biomolecule, for example ALK. A first approach utilizes gene vectors containing nucleotide sequences for increasing the endogenous production of one or more sequences of miRNA, which are complete or partial sequences and/or combinations thereof, that target and silence the mRNA of ALK, which can be administered to a subject to increase the subject's production of one or more sequences of the miRNA.

Embodiments of the present disclosure relate to at least one approach for inducing endogenous production of one or more sequences of miRNA that target and silence mRNA of a target biomolecule, for example HER. A first approach utilizes gene vectors containing nucleotide sequences for increasing the endogenous production of one or more sequences of miRNA, which are complete or partial sequences and/or combinations thereof, that target and silence the mRNA of HER, which can be administered to a subject to increase the subject's production of one or more sequences of the miRNA.

Embodiments of the present disclosure relate to at least one approach for inducing endogenous production of one or more sequences of miRNA that target and silence mRNA of a target biomolecule, for example FLT3. A first approach utilizes gene vectors containing nucleotide sequences for increasing the endogenous production of one or more sequences of miRNA, which are complete or partial sequences and/or combinations thereof, that target and silence the mRNA of FLT3, which can be administered to a subject to increase the subject's production of one or more sequences of the miRNA.

Embodiments of the present disclosure relate to at least one approach for inducing endogenous production of one or more sequences of miRNA that target and silence mRNA of a target biomolecule, for example PARP. A first approach utilizes gene vectors containing nucleotide sequences for increasing the endogenous production of one or more sequences of miRNA, which are complete or partial sequences and/or combinations thereof, that target and silence the mRNA of PARP, which can be administered to a subject to increase the subject's production of one or more sequences of the miRNA.

DETAILED DESCRIPTION

Unless defined otherwise, all technical and scientific terms used therein have the meanings that would be commonly understood by one of skill in the art in the context of the present description. Although any methods and materials similar or equivalent to those described therein can also be used in the practice or testing of the present disclosure, the preferred methods and materials are now described. All publications mentioned therein are incorporated therein by reference to disclose and describe the methods and/or materials in connection with which the publications are cited.

As used therein, the singular forms "a", "an", and "the" include plural references unless the context clearly dictates otherwise. For example, reference to "a composition" includes one or more compositions and reference to "a subject" or "the subject" includes one or more subjects.

As used therein, the terms "about" or "approximately" refer to within about 25%, preferably within about 20%, preferably within about 15%, preferably within about 10%, preferably within about 5% of a given value or range. It is understood that such a variation is always included in any given value provided therein, whether or not it is specifically referred to.

As used therein, the term "ameliorate" refers to improve and/or to make better and/or to make more satisfactory.

As used therein, the term "cell" refers to a single cell as well as a plurality of cells or a population of the same cell type or different cell types. Administering a composition to a cell includes in vivo, in vitro and ex vivo administrations and/or combinations thereof.

As used therein, the term "complex" refers to an association, either direct or indirect, between one or more particles of a composition and one or more target cells. This association results in a change in the metabolism of the target cell. As used therein, the phrase "change in metabolism" refers to an increase or a decrease in the one or more target cells' production of one or more proteins, and/or any post-translational modifications of one or more proteins.

As used therein, the term "composition" refers to a substance that, when administered to a subject, causes one or more chemical reactions and/or one or more physical reactions and/or one or more physiological reactions and/or one or more immunological reactions in the subject. In some embodiments of the present disclosure, the composition is a plasmid vector.

As used therein, the term "endogenous" refers to the production and/or modification of a molecule that originates within a subject.

As used therein, the term "exogenous" refers to a molecule that is within a subject but that did not originate within the subject. As used therein, the terms "production", "producing" and "produce" refer to the synthesis and/or replication of DNA, the transcription of one or more sequences of RNA, the translation of one or more amino acid sequences, the post-translational modifications of an amino acid sequence, and/or the production of one or more regulatory molecules that can influence the production and/or functionality of an effector molecule or an effector cell. For clarity, "production" is also used therein to refer to the functionality of a regulatory molecule, unless the context reasonably indicates otherwise.

As used therein, the term "subject" refers to any therapeutic target that receives the composition. The subject can be a vertebrate, for example, a mammal including a human. The term "subject" does not denote a particular age or sex. The term "subject" also refers to one or more cells of an organism, an in vitro culture of one or more tissue types, an in vitro culture of one or more cell types, ex vivo preparations, and/or a sample of biological materials such as tissue, and/or biological fluids.

As used therein, the term "target biomolecule" refers to a kinase that is found within a subject. A biomolecule may be endogenous or exogenous to a subject.

As used therein, the term "target cell" refers to one or more cells and/or cell types that are deleteriously affected, either directly or indirectly, by a dysregulated biomolecule. The term "target cell" also refers to cells that are not deleteriously affected but that are the cells in which it is desired that the composition interacts.

As used therein, the term "therapeutically effective amount" refers to the amount of the composition used that is of sufficient quantity to ameliorate, treat and/or inhibit one or more of a disease, disorder or a symptom thereof. The "therapeutically effective amount" will vary depending on the composition used, the route of administration of the composition and the severity of the disease, disorder or symptom thereof. The subject's age, weight and genetic make-up may also influence the amount of the composition that will be a therapeutically effective amount.

As used therein, the terms "treat", "treatment" and "treating" refer to obtaining a desired pharmacologic and/or physiologic effect. The effect may be prophylactic in terms of completely or partially preventing an occurrence of a disease, disorder or symptom thereof and/or the effect may be therapeutic in providing a partial or complete amelioration or inhibition of a disease, disorder, or symptom thereof. Additionally, the term "treatment" refers to any treatment of a disease, disorder, or symptom thereof in a subject and includes: (a) preventing the disease from occurring in a subject which may be predisposed to the disease but has not yet been diagnosed as having it; (b) inhibiting the disease, i.e., arresting its development; and (c) ameliorating the disease.

As used therein, the terms "unit dosage form" and "unit dose" refer to a physically discrete unit that is suitable as a unitary dose for patients. Each unit contains a predetermined quantity of the composition and optionally, one or more suitable pharmaceutically acceptable carriers, one or more excipients, one or more additional active ingredients, or combinations thereof. The amount of composition within each unit is a therapeutically effective amount.

Where a range of values is provided therein, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges, and are also, encompassed within the disclosure, subject to any specifically excluded limit in the stated range. Where the stated range includes one or both of the limits, ranges excluding either or both of those included limits are also included in the disclosure.

In some embodiments of the present disclosure, a composition is a recombinant plasmid (RP) for introducing genetic material, such as one or more nucleotide sequences, into a target cell for reproduction or transcription of an insert that comprises one or more nucleotide sequences that are carried within the RP. In some embodiments of the present disclosure, the RP is delivered without a carrier, by a viral vector, by a protein coat, or by a lipid vesicle. In some embodiments of the present disclosure, the vector is an adeno-associated virus vector.

In some embodiments of the present disclosure, the insert comprises one or more nucleotide sequences that encode for production of at least one sequence of miRNA that decreases the production of target biomolecules. The miRNA may, directly or indirectly, bind to and degrade the target mRNA or otherwise inactivate the target mRNA so that less or none of the target-biomolecule protein is produced.

In some embodiments of the present disclosure, the target biomolecule is Bruton's tyrosine kinase.

In some embodiments of the present disclosure, the target biomolecule is EGF.

In some embodiments of the present disclosure, the target biomolecule is VEGF.

In some embodiments of the present disclosure, the target biomolecule is BRAF.

In some embodiments of the present disclosure, the target biomolecule is ALK.

In some embodiments of the present disclosure, the target biomolecule is HER.

In some embodiments of the present disclosure, the target biomolecule is FLT3.

In some embodiments of the present disclosure, the target biomolecule is PARP.

In some embodiments of the present disclosure, the insert comprises one or more nucleotide sequences that each encode one or more miRNA sequences that may be complementary to and degrade, or cause degradation of, mRNA of the target biomolecule.

Some embodiments of the present disclosure relate to a composition that can be administered to a subject with a condition that results, directly or indirectly, from the production of a dysregulated biomolecule. When a therapeutically effective amount of the composition is administered to the subject, the subject may change production and/or functionality of one or more biomolecules.

In some embodiments of the present disclosure, the subject may respond to receiving the therapeutic amount of the composition by changing production and/or functionality of one or more intermediary molecules by changing production of one or more DNA sequences, one or more RNA sequences, and/or one or more proteins that regulate the levels and/or functionality of the one or more intermediary molecules. The one or more intermediary molecules regulate the subject's levels and/or functionality of the one or more biomolecules.

In some embodiments of the present disclosure, administering a therapeutic amount of the composition to a subject upregulates the production, functionality or both one or more sequences of miRNA that each target the mRNA of one or more target biomolecules. In some embodiments of the present disclosure, there are one, two, three, four, five, or six miRNA sequences that each are complementary to and degrade, or cause degradation of, one biomolecule, such as Bruton's tyrosine kinase, EGF, VEGF, BRAF, ALK, HER, FLT3, or PARP. In some embodiments of the present disclosure, the composition may comprise multiple copies of the same nucleotide sequence of miRNA.

In some embodiments of the present disclosure, the composition is an RP that may be used for gene therapy. The gene therapy is useful for increasing the subject's endogenous production of one or more sequences of miRNA that target the mRNA of a target biomolecule. For example, the RP can contain one or more nucleotide sequences that cause increased production of one or more nucleotide sequences that cause an increased production of one or more miRNA sequences that are each complementary to and degrade, or cause degradation of, or inactivate, or cause inactivation of, one biomolecule, such as Bruton's tyrosine kinase, EGF, VEGF, BRAF, ALK, HER, FLT3, or PARP. Increased endogenous expression of the one or more miRNA sequences results in a decreased bioavailability of the desired biomolecule, which may also be referred to as a target biomolecule.

In some embodiments of the present disclosure, the delivery vehicle of the RP used for gene therapy may be a virus that can be enveloped, or not (unenveloped), replication effective or not (replication ineffective), or combinations thereof. In some embodiments of the present disclosure, the vector is a virus that is not enveloped and not replication effective. In some embodiments of the present disclosure, the vector is a virus of the Parvoviridae family. In some embodiments of the present disclosure, the vector is a virus of the genus Dependoparvovirus. In some embodiments of the present disclosure, the vector is an adeno-associated virus (AAV). In some embodiments of the present disclosure, the vector is a recombinant AAV. In some embodiments of the present disclosure, the vector is a recombinant AAV6.2FF.

In some embodiments of the present disclosure, the delivery vehicle of the RP used for gene therapy may be a protein coat.

In some embodiments of the present disclosure, the delivery vehicle of the RP used for gene therapy may be a lipid vesicle.

The embodiments of the present disclosure also relate to administering a therapeutically effective amount of the composition. In some embodiments of the present disclosure, the therapeutically effective amount of the composition that is administered to a patient is between about 10 and about $1 \times 10^{16}$ TCID$_{50}$/kg (50% tissue culture infective dose per kilogram of the patient's body mass. In some embodiments of the present disclosure, the therapeutically effective amount of the composition that is administered to the patient is about $1 \times 10^{13}$ TCID$_{50}$/kg. In some embodiments of the present disclosure, the therapeutically effective amount of the composition that is administered to a patient is measured in TPC/kg (total particle count of the composition per kilogram of the patient's body mass). In some embodiments the therapeutically effective amount of the composition is between about 10 and about $1 \times 10^{16}$ TCP/kg.

Some embodiments of the present disclosure relate to an adenovirus associated virus (AAV) genome consisting of a RP that when operable inside a target cell will cause the target cell to produce a miRNA sequence that downregulates production of a biomolecule, with examples being Bruton's tyrosine kinase, EGF, VEGF, BRAF, ALK, HER, FLT3, or PARP. The RP is comprised of AAV2 inverted terminal repeats (ITRs), a composite CASI promoter, a human growth hormone (HGH) signal peptide followed by a miRNA expression cassette containing up to six different miRNAs targeting Bruton's tyrosine kinase, EGF, VEGF, BRAF, ALK, HER, FLT3, or PARP, followed by a Woodchuck Hepatitis Virus post-transcriptional regulatory element (WPRE) and an SV40 polyA signal.

```
SEQ ID NO. 1 (backbone sequence No. 1):
5' aatcaacctctggattacaaaatttgtgaaagattgactggtattcttaactatgtt gctcctttttacgctatgtggatacgctgctttaatgcctttgtatcatgctattgcttcc cgtatggctttcatttctcctccttgtataaatcctggttgctgtctctttatgaggag ttgtggcccgttgtcaggcaacgtggcgtggtgtgcactgtgtttgctgacgcaacccc actggttggggcattgccaccacctgtcagctcctttccgggacttcgctttccccctc cctattgccacggcggaactcatcgccgcctgccttgcccgctgctggacagggctcgg ctgttgggcactgacaattccgtggtgttgtcggggaaatcatcgtcctttccttggctg ctcgcctgtgttgccacctggattctgcgcgggacgtccttctgctacgtcccttcggcc ctcaatccagcggaccttccttcccgcggcctgctgccggctctgcggcctcttccgcgt cttcgccttcgccctcagacgagtcggatctcccttttgggccgcctccccgcctaagctt
```

-continued

```
atcgataccgtcgagatctaacttgtttattgcagcttataatggttacaaataaagcaa tagcatcacaaatttcacaaataaagcattttttcactgcattctagttgtggtttgtc caaactcatcaatgtatcttatcatgtctggatctcgacctcgactagagcatggctacg tagataagtagcatgggggttaatcattaactacaaggaacccctagtgatggagttggc cactccctctctgcgcgctcgctcgctcactgaggccgggcgaccaaaggtcgcccgacg cccgggctttgcccgggcggcctcagtgagcgagcgagcgcgagctggcgtaatagcga agaggcccgcaccgatcgcccttcccaacagttgcgcagcctgaatggcgaatggcgatt ccgttgcaatggctggcggtaatattgttctggatattaccagcaaggccgatagtttga gttcttctactcaggcaagtgatgttattactaatcaaagaagtattgcgacaacggtta atttgcgtgatggacagactcttttactcggtggcctcactgattataaaaacacttctc aggattctggcgtaccgttcctgtctaaaatccctttaatcggcctcctgtttagctccc gctctgattctaacgaggaaagcacgttatacgtgctcgtcaaagcaaccatagtacgcg ccctgtagcggcgcattaagcgcggcgggtgtggtggttacgcgcagcgtgaccgctaca cttgccagcgccctagcgcccgctcctttcgctttcttccttcctttctcgccacgttc gccggctttccccgtcaagctctaaatcgggggctcccctttagggttccgatttagtgct ttacggcacctcgaccccaaaaaacttgattagggtgatggttcacgtagtgggccatcg ccctgatagacggtttttcgccctttgacgttggagtccacgttctttaatagtggactc ttgttccaaactggaacaacactcaaccctatctcggtctattcttttgatttataaggg attttgccgatttcggcctattggttaaaaaatgagctgatttaacaaaaatttaacgcg aattttaacaaaatattaacgtttacaatttaaatatttgcttatacaatcttcctgttt ttggggcttttctgattatcaaccggggtacatatgattgacatgctagttttacgatta ccgttcatcgattctcttgtttgctccagactctcaggcaatgacctgatagcctttgta gagacctctcaaaaatagctaccctctccggcatgaatttatcagctagaacggttgaat atcatattgatggtgatttgactgtctccggccttttctcacccgtttgaatctttaccta cacattactcaggcattgcatttaaaatatatgagggttctaaaaattttttatccttgcg ttgaaataaaggcttctcccgcaaaagtattacagggtcataatgttttttggtacaaccg atttagctttatgctctgaggcttttattgcttaattttgctaattctttgccttgcctgt atgatttattggatgttggaattcctgatgcggtattttctccttacgcatctgtgcggt atttcacaccgcatatggtgcactctcagtacaatctgctctgatgccgcatagttaagc cagccccgacacccgccaacacccgctgacgcgccctgacgggcttgtctgctcccggca tccgcttacagacaagctgtgaccgtctccgggagctgcatgtgtcagaggttttcaccg tcatcaccgaaacgcgcgagacgaaagggcctcgtgatacgcctatttttataggttaat gtcatgataataatggtttcttagacgtcaggtggcacttttcggggaaatgtgcgcgga accccctatttgtttattttttctaaatacattcaaatatgtatccgctcatgagacaataa ccctgataaatgcttcaataatattgaaaaaggaagagtatgagtattcaacatttccgt gtcgcccttattccctttttttgcggcattttgccttcctgttttttgctcacccagaaacg ctggtgaaagtaaaagatgctgaagatcagttgggtgcacgagtgggttacatcgaactg gatctcaacagcggtaagatccttgagagttttcgccccgaagaacgttttccaatgatg agcacttttaaagttctgctatgtggcgcggtattatcccgtattgacgccgggcaagag caactcggtcgccgcatacactattctcagaatgacttggttgagtactcaccagtcaca
```

-continued

```
gaaaagcatcttacggatggcatgacagtaagagaattatgcagtgctgccataaccatg agtgataacactgcggccaacttacttctgacaacgatcggaggaccgaaggagctaacc gcttttttgcacaacatgggggatcatgtaactcgccttgatcgttgggaaccggagctg aatgaagccataccaaacgacgagcgtgacaccacgatgcctgtagcaatggcaacaacg ttgcgcaaactattaactggcgaactacttactctagcttcccggcaacaattaatagac tggatggaggcggataaagttgcaggaccacttctgcgctcggcccttccggctggctgg tttattgctgataaatctggagccggtgagcgtgggtctcgcggtatcattgcagcactg gggccagatggtaagcctcccgtatcgtagttatctacacgacggggagtcaggcaact atggatgaacgaaatagacagatcgctgagataggtgcctcactgattaagcattggtaa ctgtcagaccaagtttactcatatatactttagattgatttaaaacttcatttttaattt aaaaggatctaggtgaagatcctttttgataatctcatgaccaaaatcccttaacgtgag ttttcgttccactgagcgtcagaccccgtagaaaagatcaaaggatcttcttgagatcct ttttttctgcgcgtaatctgctgcttgcaaacaaaaaaaccaccgctaccagcggtggtt tgtttgccggatcaagagctaccaactctttttccgaaggtaactggcttcagcagagcg cagataccaaatactgtccttctagtgtagccgtagttaggccaccacttcaagaactct gtagcaccgcctacatacctcgctctgctaatcctgttaccagtggctgctgccagtggc gataagtcgtgtcttaccgggttggactcaagacgatagttaccggataaggcgcagcgg tcgggctgaacggggggttcgtgcacacagcccagcttggagcgaacgacctacaccgaa ctgagatacctacagcgtgagctatgagaaagcgccacgcttcccgaagggagaaaggcg gacaggtatccggtaagcggcagggtcggaacaggagagcgcacgagggagcttccaggg ggaaacgcctggtatctttatagtcctgtcgggtttcgccacctctgacttgagcgtcga tttttgtgatgctcgtcaggggggcggagcctatggaaaaacgccagcaacgcggccttt ttacggttcctggccttttgctggccttttgctcacatgttctttcctgcgttatcccct gattctgtggataaccgtattaccgcctttgagtgagctgataccgctcgccgcagccga acgaccgagcgcagcgagtcagtgagcgaggaagcggaagagcgcccaatacgcaaaccg cctctccccgcgcgttggccgattcattaatgcagcagctgcgcgctcgctcgctcactg aggccgcccgggcaaagcccgggcgtcgggcgacctttggtcgcccggcctcagtgagcg agcgagcgcgcagagagggagtggccaactccatcactaggggttccttgtagttaatga ttaacccgccatgctacttatctacgtagccatgctctaggacattgattattgactagt ggagttccgcgttacataacttacggtaaatggcccgcctggctgaccgcccaacgaccc ccgcccattgacgtcaataatgacgtatgttcccatagtaacgccaatagggactttcca ttgacgtcaatgggtggagtatttacggtaaactgcccacttggcagtacatcaagtgta tcatatgccaagtacgccccctattgacgtcaatgacggtaaatggcccgcctggcatta tgcccagtacatgaccttatgggactttcctacttggcagtacatctacgtattagtcat cgctattaccatggtcgaggtgagccccacgttctgcttcactctccccatctcccccc ctccccaccccaattttgtatttatttattttttaattattttgtgcagcgatggggggg ggggggggggggcgcgcgccaggcgggggggggggcgaggggggggggggcgaggcg gagaggtgcggcggcagccaatcagagcggcgcgctccgaaagtttccttttatggcgag gcggcggcggcggcccctataaaaagcgaagcgcgcgggggggagtcgctgcgcgct gccttcgccccgtgcccgctccgccgccgcctcgcgccgcccgccccggctctgactga ccgcgttactaaaacaggtaagtccggcctccgcgccgggttttggcgcctcccgcgggc
```

-continued gcccccctcctcacggcgagcgctgccacgtcagacgaagggcgcagcgagcgtcctgat ccttccgcccggacgctcaggacagcggcccgctgctcataagactcggccttagaaccc cagtatcagcagaaggacattttaggacgggacttgggtgactctagggcactggttttc tttccagagagcggaacaggcgaggaaaagtagtcccttctcggcgattctgcggaggga tctccgtggggcggtgaacgccgatgatgcctctactaaccatgttcatgttttctttttt ttttctacaggtcctgggtgacgaacagggtaccgccaccatggccaccggctctcgcac aagcctgctgctggctttcggactgctgtgcctgccttggctccaggagggctccgcc 3'

SEQ ID NO. 2
(miRNA expression cassette No. 2-Bruton's tyrosine kinase):
5' gctagcatcgataccgtcgctatgtgctggaggcttgctgaaggctgtatgctgtaa ggtggttatgggagaatgccgttttggcctctgactgacggcattctcctaaccaccttA caggacacaaggcctgttactagcactcacatggaacaaatggcctctagcctggaggct tgctgaaggctgtatgctgttgagtttcgcattcttgttgccgttttggcctctgactga cggcaacaagagcgaaactcaacaggacacaaggcctgttactagcactcacatggaaca aatggcctctagcctggaggcttgctgaaggctgtatgctgtctatcctttcaagctagt caccgttttggcctctgactgacggtgactagcgaaaggatagacaggacacaaggcctg ttactagcactcacatggaacaaatggcctctctagaat 3'

SEQ ID NO. 3 (miRNA expression cassette No. 3-EGFR):
5' gctagcatcgataccgtcgctatgtgctggaggcttgctgaaggctgtatgctgaag ttagcatgtgtcccagaaccgttttggcctctgactgacggttctgggacatgctaactt caggacacaaggcctgttactagcactcacatggaacaaatggcctctagcctggaggct tgctgaaggctgtatgctgagaagaaaggtatcccaattgccgttttggcctctgactga cggcaattgggaccttcttctcaggacacaaggcctgttactagcactcacatggaaca aatggcctctagcctggaggcttgctgaaggctgtatgctgtagtgtttccaaatactgc ttgcgttttggcctctgactgacgcaagcagtatggaaacactacaggacacaaggcctg ttactagcactcacatggaacaaatggcctctctagaat 3'

SEQ ID NO. 4 (miRNA expression cassette No. 4-VEGF):
5' gctagcatcgataccgtcgctatgtgctggaggcttgctgaaggctgtatgctgtct gacagtgatgtcatcctttcgttttggcctctgactgacgaaaggatgatcactgtcaga caggacacaaggcctgttactagcactcacatggaacaaatggcctctagcctggaggct tgctgaaggctgtatgctgatttaggtcagatggaaactcgcgttttggcctctgactga cgcgagtttccctgacctaaatcaggacacaaggcctgttactagcactcacatggaaca aatggcctctagcctggaggcttgctgaaggctgtatgctgagtgtatgcttaacgtgga cttcgttttggcctctgactgacgaagtccacgaagcatacactcaggacacaaggcctg ttactagcactcacatggaacaaatggcctctctagaat 3'

SEQ ID NO. 5 (miRNA expression cassette No. 5-BRAF):
5' gctagcatcgataccgtcgctatgtgctggaggcttgctgaaggctgtatgctgata cttcagcctgaatcgtgaccgttttggcctctgactgacggtcacgattggctgaagtat caggacacaaggcctgttactagcactcacatggaacaaatggcctctagcctggaggct tgctgaaggctgtatgctgacttcactcatattgttccactcgttttggcctctgactga cgagtggaacaatgagtgaagtcaggacacaaggcctgttactagcactcacatggaaca aatggcctctagcctggaggcttgctgaaggctgtatgctgtatattctacaaatcacca -continued gggcgttttggcctctgactgacgccctggtgatgtagaatatacaggacacaaggcctg ttactagcactcacatggaacaaatggcctctctagaat 3'

SEQ ID NO. 6 (miRNA expression cassette No. 6-ALK):
5' gctagcatcgataccgtcgctatgtgctggaggcttgctgaaggctgtatgctgtat aagtccagtgagaagaaggcgttttggcctctgactgacgccttcttctctggacttata caggacacaaggcctgttactagcactcacatggaacaaatggcctctagcctggaggct tgctgaaggctgtatgctgctatcatcaaatgagctgctgcgttttggcctctgactgac gcagcagctcttgatgatagtcaggacacaaggcctgttactagcactcacatggaacaa atggcctctagcctggaggcttgctgaaggctgtatgctgaagactgctggaaattctat ggctgttttggcctctgactgacgaccatagaatccagcagtctcaggacacaaggcctg ttactagcactcacatggaacaaatggcctctctagaat 3'

SEQ ID NO. 7 (miRNA expression cassette No. 7-HER):
5' gctagcatcgataccgtcgctatgtgctggaggcttgctgaaggctgtatgctgatt agcactggtgatttccggctgttttggcctctgactgacgaccggaaatccagtgctaat caggacacaaggcctgttactagcactcacatggaacaaatggcctctagcctggaggct tgctgaaggctgtatgctgattgagtttcgcattcttgttgccgttttggcctctgactg acggcaacaagagcgaaactcaacaggacacaaggcctgttactagcactcacatggaac aaatggcctctagcctggaggcttgctgaaggctgtatgctgattgatcaggcaaacata gtcccgttttggcctctgactgacgggactatgtgcctgatcaatcaggacacaaggcct gttactagcactcacatggaacaaatggcctctctagaat3'

SEQ ID NO. 8 (miRNA expression cassette No. 8-FLT3):
5' gctagcatcgataccgtcgctatgtgctggaggcttgctgaaggctgtatgctgtct gatcgtggtgttatttgggcgttttggcctctgactgacgcccaataaccacgatcaga caggacacaaggcctgttactagcactcacatggaacaaatggcctctagcctggaggct tgctgaaggctgtatgctgttgagtttcgcattcttgttgccgttttggcctctgactga cggcaacaagagcgaaactcaacaggacacaaggcctgttactagcactcacatggaaca aatggcctctagcctggaggcttgctgaaggctgtatgctgtatcctcttataactcagc ctccgttttggcctctgactgacggaggctgagataagaggatacaggacacaaggcctg ttactagcactcacatggaacaaatggcctctctagaat 3'

SEQ ID NO. 9 (miRNA expression cassette No. 9-PARP):
5' gctagcatcgataccgtcgctatgtgctggaggcttgctgaaggctgtatgctgtcg tactgacttgtaggtatgccgttttggcctctgactgacggcatacctaagtcagtacgt caggacacaaggcctgttactagcactcacatggaacaaatggcctctagcctggaggct tgctgaaggctgtatgctgactcctaatcaatagcttccaccgttttggcctctgactga cggtggaagcttgattaggagtcaggacacaaggcctgttactagcactcacatggaaca aatggcctctagcctggaggcttgctgaaggctgtatgctgaatatgcctttaagctttg ctgcgttttggcctctgactgacgcagcaaagcaaaggcatattcaggacacaaggcctg ttactagcactcacatggaacaaatggcctctctagaat 3'

SEQ ID NO: 10 = SEQ ID NO: 1 + SEQ ID NO: 2
5' aatcaacctctggattacaaaatttgtgaaagattgactggtattcttaactatgtt gctccttttacgctatgtggatacgctgctttaatgcctttgtatcatgctattgcttcc cgtatggctttcatttctcctccttgtataaatcctggttgctgtctctttatgaggag ttgtggcccgttgtcaggcaacgtggcgtggtgtgcactgtgtttgctgacgcaacccc -continued

```
actggttggggcattgccaccacctgtcagctcctttccgggactttcgctttccccctc cctattgccacggcggaactcatcgccgcctgccttgcccgctgctggacaggggctcgg ctgtgggcactgacaattccgtggtgttgtcggggaaatcatcgtccttccttggctg ctcgcctgtgttgccacctggattctgcgcgggacgtccttctgctacgtcccttggccc tcaatccagcggaccttccttcccgcggcctgctgccggctctgcggcctcttccgcgtc ttcgccttcgccctcagacgagtcggatctcccctttgggccgcctccccgcctaagctta tcgataccgtcgagatctaacttgtttattgcagcttataatggttacaaataaagcaat agcatcacaaatttcacaaataaagcattttttttcactgcattctagttgtggtttgtcc aaactcatcaatgtatcttatcatgtctggatctcgacctcgactagagcatggctacgt agataagtagcatggcgggttaatcattaactacaaggaaccctagtgatggagttggc cactccctctctgcgcgctcgctcgctcactgaggccgggcgaccaaaggtcgcccgacg cccgggctttgcccgggcggcctcagtgagcgagcgagcgcgcagctggcgtaatagcga agaggcccgcaccgatcgcccttcccaacagttgcgcagcctgaatggcgaatggcgatt ccgttgcaatggctggcggtaatattgttctggatattaccagcaaggccgatagtttga gttcttctactcaggcaagtgatgttattactaatcaaagaagtattgcgacaacggtta atttgcgtgatggacagactcttttactcggtggcctcactgattataaaaacacttctc aggattctggcgtaccgttcctgtctaaaatcccttaatcggcctcctgtttagctccc gctctgattctaacgaggaaagcacgttatacgtgctcgtcaaagcaaccatagtacgcg ccctgtagcggcgcattaagcgcggcgggtgtggtggttacgcgcagcgtgaccgctaca cttgccagcgccctagcgcccgctcctttcgctttcttcccttcctttctcgccacgttc gccggctttccccgtcaagctctaaatcggggggctcccttttaggggttccgatttagtgct ttacggcacctcgaccccaaaaaacttgattagggtgatggttcacgtagtgggccatcg ccctgatagacggttttttcgccctttgacgttggagtccacgttctttaatagtggactc ttgttccaaactggaacaacactcaaccctatctcggtctattcttttgatttataaggg attttgccgatttcggcctattggttaaaaaatgagctgatttaacaaaaatttaacgcg aattttaacaaaatattaacgtttacaatttaaatatttgcttatacaatcttcctgttt ttggggcttttctgattatcaaccggggtacatatgattgacatgctagttttacgatta ccgttcatcgattctcttgtttgctccagactctcaggcaatgacctgatagcctttgta gagacctctcaaaaatagctaccctctccggcatgaatttatcagctagaacggttgaat atcatattgatggtgatttgactgtctccggcctttctcacccgtttgaatctttaccta cacattactcaggcattgcatttaaaatatgagggttctaaaaatttttatccttgcg ttgaaataaaggcttctcccgcaaaagtattacagggtcataatgttttggtacaaccg atttagcttatgctctgaggctttattgcttaattttgctaattctttgccttgcctgt atgatttattggatgttggaattcctgatgcggtattttctccttacgcatctgtgcggt atttcacaccgcatatggtgcactctcagtacaatctgctctgatgccgcatagttaagc cagccccgacacccgccaacacccgctgacgcgccctgacgggcttgtctgctcccggca tccgcttacagacaagctgtgaccgtctccgggagctgcatgtgtcagaggttttcaccg tcatcaccgaaacgcgcgagacgaaagggcctcgtgatacgcctatttttataggttaat gtcatgataataatggtttcttagacgtcaggtggcacttttcggggaaatgtgcgcgga accctatttgttttatttttctaaatacattcaaatatgtatccgctcatgagacaataa ccctgataaatgcttcaataatattgaaaaaggaagagtatgagtattcaacatttccgt
```

-continued gtcgcccttattccctttttgcggcattttgccttcctgttttgctcacccagaaacg ctggtgaaagtaaaagatgctgaagatcagttgggtgcacgagtgggttacatcgaactg gatctcaacagcggtaagatccttgagagttttcgccccgaagaacgttttccaatgatg agcacttttaaagttctgctatgtggcgcggtattatcccgtattgacgccgggcaagag caactcggtcgccgcatacactattctcagaatgacttggttgagtactcaccagtcaca gaaaagcatcttacggatggcatgacagtaagagaattatgcagtgctgccataaccatg agtgataacactgcggccaacttacttctgacaacgatcggaggaccgaaggagctaacc gcttttttgcacaacatgggggatcatgtaactcgccttgatcgttgggaaccggagctg aatgaagccataccaaacgacgagcgtgacaccacgatgcctgtagcaatggcaacaacg ttgcgcaaactattaactggcgaactacttactctagcttcccggcaacaattaatagac tggatggaggcggataaagttgcaggaccacttctgcgctcggcccttccggctggctgg tttattgctgataaatctggagccggtgagcgtgggtctcgcggtatcattgcagcactg gggccagatggtaagccctcccgtatcgtagttatctacacgacggggagtcaggcaact atggatgaacgaaatagacagatcgctgagataggtgcctcactgattaagcattggtaa ctgtcagaccaagtttactcatatatactttagattgatttaaaacttcattttaattt aaaaggatctaggtgaagatcctttttgataatctcatgaccaaaatcccttaacgtgag ttttcgttccactgagcgtcagaccccgtagaaaagatcaaaggatcttcttgagatcct ttttttctgcgcgtaatctgctgcttgcaaacaaaaaaaccaccgctaccagcggtggtt tgtttgccggatcaagagctaccaactctttttccgaaggtaactggcttcagcagagcg cagataccaaatactgtccttctagtgtagccgtagttaggccaccacttcaagaactct gtagcaccgcctacatacctcgctctgctaatcctgttaccagtggctgctgccagtggc gataagtcgtgtcttaccgggttggactcaagacgatagttaccggataaggcgcagcgg tcgggctgaacggggggttcgtgcacacagcccagcttggagcgaacgacctacaccgaa ctgagatacctacagcgtgagctatgagaaagcgccacgcttcccgaagggagaaaggcg gacaggtatccggtaagcggcagggtcggaacaggagagcgcacgagggagcttccaggg ggaaacgcctggtatctttatagtcctgtcgggtttcgccacctctgacttgagcgtcga tttttgtgatgctcgtcagggggggcggagcctatggaaaaacgccagcaacgcggcctt ttacggttcctggccttttgctggccttttgctcacatgttctttcctgcgttatccct gattctgtggataaccgtattaccgcctttgagtgagctgataccgctcgccgcagccga acgaccgagcgcagcgagtcagtgagcgaggaagcggaagagcgcccaatacgcaaaccg cctctccccgcgcgttggccgattcattaatgcagcagctgcgcgctcgctcgctcactg aggccgcccgggcaaagcccgggcgtcgggcgacctttggtcgcccggcctcagtgagcg agcgagcgcgcagagagggagtggccaactccatcactaggggttccttgtagttaatga ttaacccgccatgctacttatctacgtagccatgctctaggacattgattattgactagt ggagttccgcgttacataacttacggtaaatggcccgcctggctgaccgcccaacgaccc ccgcccattgacgtcaataatgacgtatgttcccatagtaacgccaatagggactttcca ttgacgtcaatgggtggagtatttacggtaaactgcccacttggcagtacatcaagtgta tcatatgccaagtacgccccctattgacgtcaatgacggtaaatggcccgcctggcatta tgcccagtacatgaccttatgggactttcctacttggcagtacatctacgtattagtcat cgctattaccatggtcgaggtgagccccacgttctgcttcactctccccatctccccccc -continued ctccccacccccaattttgtatttattatttttaattattttgtgcagcgatgggggg ggggggggggggggcgcgccaggcgggggggcggggcgagggcgggggggcgagg cggagaggtgcggcggcagccaatcagagcggcgcgctccgaaagtttccttttatggcg aggcggcggcggcggcggccctataaaaagcgaagcgcgcgggggggagtcgctgcgcg ctgccttcgcccgtgcccgctccgccgccgctcgcgccgcccgccccggctctgact gaccgcgttactaaaacaggtaagtccggcctccgcgccgggttttggcgcctcccgcgg gcgcccccctcctcacggcgagcgctgccacgtcagacgaagggcgcagcgagcgtcctg atccttccgcccggacgctcaggacagcggcccgctgctcataagactcggccttagaac cccagtatcagcagaaggacattttaggacgggacttgggtgactctagggcactggttt tctttccagagagcggaacaggcgaggaaaagtagtcccttctcggcgattctgcggagg gatctccgtgggcggtgaacgccgatgatgcctctactaaccatgttcatgttttcttt tttttctacaggtcctgggtgacgaacagggtaccgccaccatggccaccggctctcgc acaagcctgctgctggctttcggactgctgtgcctgccttggctccaggagggctccgcc gctagcatcgataccgtcgctatgtgctggaggcttgctgaaggctgtatgctgtaaggt ggttatgggagaatgccgttttggcctctgactgacggcattctcctaaccaccttacag gacacaaggcctgttactagcactcacatggaacaaatggcctctagcctggaggcttgc tgaaggctgtatgctgttgagtttcgcattcttgttgccgttttggcctctgactgacgg caacaagagcgaaactcaacaggacacaaggcctgttactagcactcacatggaacaaat ggcctctagcctggaggcttgctgaaggctgtatgctgtctatcctttcaagctagtcac cgttttggcctctgactgacggtgactagcgaaaggatagacaggacacaaggcctgtta ctagcactcacatggaacaaatggcctctctagaat 3'

SEQ ID NO: 11 = SEQ ID NO: 1 + SEQ ID NO: 3
5' aatcaacctctggattacaaaatttgtgaaagattgactggtattcttaactatgtt gctccttttacgctatgtggatacgctgctttaatgcctttgtatcatgctattgcttcc cgtatggctttcattttctcctccttgtataaatcctggttgctgtctctttatgaggag ttgtggcccgttgtcaggcaacgtggcgtggtgtgcactgtgtttgctgacgcaaccccc actggttggggcattgccaccacctgtcagctccttttccgggactttcgctttccccctc cctattgccacggcggaactcatcgccgcctgccttgcccgctgctggacaggggctcgg ctgtttgggcactgacaattccgtggtgttgtcggggaaatcatcgtcctttccttggctg ctcgcctgtgttgccacctggattctgcgcgggacgtccttctgctacgtcccttcggcc ctcaatccagcggaccttccttcccgcggcctgctgccggctctgcggcctcttccgcgt cttcgccttcgccctcagacgagtcggatctccctttgggccgcctccccgcctaagctt atcgataccgtcgagatctaacttgtttattgcagcttataatggttacaaataaagcaa tagcatcacaaatttcacaaataaagcattttttcactgcattctagttgtggtttgtc caaactcatcaatgtatcttatcatgtctggatctcgacctcgactagagcatggctacg tagataagtagcatggcgggttaatcattaactacaaggaacccctagtgatggagttgg ccactccctctctgcgcgctcgctcgctcactgaggccgggcgaccaaaggtcgcccgac gcccgggctttgcccgggggcctcagtgagcgagcgagcgcgcagctggcgtaatagcga agaggcccgcaccgatcgcccttcccaacagttgcgcagcctgaatggcgaatggcgatt ccgttgcaatggctggcggtaatattgttctggatattaccagcaaggccgatagtttga gttcttctactcaggcaagtgatgttattactaatcaaagaagtattgcgacaacggtta

```
atttgcgtgatggacagactcttttactcggtggcctcactgattataaaaacacttctc
aggattctggcgtaccgttcctgtctaaaatccctttaatcggcctcctgtttagctccc
gctctgattctaacgaggaaagcacgttatacgtgctcgtcaaagcaaccatagtacgcg
ccctgtagcggcgcattaagcgcggcgggtgtggtggttacgcgcagcgtgaccgctaca
cttgccagcgcctagcgcccgctcctttcgctttcttccttcctttctcgccacgttc
gccggctttccccgtcaagctctaaatcgggggctccctttaggggttccgatttagtgct
ttacggcacctcgaccccaaaaaacttgattagggtgatggttcacgtagtgggccatcg
ccctgatagacggttttcgcccttttgacgttggagtccacgttctttaatagtggactc
ttgttccaaactggaacaacactcaaccctatctcggtctattcttttgatttataaggg
atttttgccgatttcggcctattggttaaaaaatgagctgatttaacaaaaatttaacgcg
aatttttaacaaaatattaacgtttacaatttaaatatttgcttatacaatcttcctgttt
ttggggcttttctgattatcaaccggggtacatatgattgacatgctagttttacgatta
ccgttcatcgattctcttgtttgctccagactctcaggcaatgacctgatagcctttgta
gagacctctcaaaaatagctaccctctccggcatgaatttatcagctagaacggttgaat
atcatattgatggtgatttgactgtctccggccttttctcacccgtttgaatctttaccta
cacattactcaggcattgcatttaaaatatatgagggttctaaaaatttttatccttgcg
ttgaaataaaggcttctcccgcaaaagtattacagggtcataatgttttggtacaaccg
atttagctttatgctctgaggctttattgcttaatttttgctaattctttgccttgcctgt
atgatttattggatgttggaattcctgatgcggtattttctccttacgcatctgtgcggt
atttcacaccgcatatggtgcactctcagtacaatctgctctgatgccgcatagttaagc
cagccccgacacccgccaacacccgctgacgcgccctgacgggcttgtctgctcccggca
tccgcttacagacaagctgtgaccgtctccgggagctgcatgtgtcagaggttttcaccg
tcatcaccgaaacgcgcgagacgaaagggcctcgtgatacgcctattttataggttaat
gtcatgataataatggtttcttagacgtcaggtggcacttttcggggaaatgtgcgcgga
acccctatttgttttattttctaaatacattcaaatatgtatccgctcatgagacaataa
ccctgataaatgcttcaataatattgaaaaaggaagagtatgagtattcaacatttccgt
gtcgcccttattcccttttttgcggcattttgccttcctgttttgctcacccagaaacg
ctggtgaaagtaaaagatgctgaagatcagttgggtgcacgagtgggttacatcgaactg
gatctcaacagcggtaagatccttgagagttttcgccccgaagaacgttttccaatgatg
agcacttttaaagttctgctatgtggcgcggtattatcccgtattgacgccgggcaagag
caactcggtcgccgcatacactattctcagaatgacttggttgagtactcaccagtcaca
gaaaagcatcttacggatggcatgacagtaagagaattatgcagtgctgccataaccatg
agtgataacactgcggccaacttacttctgacaacgatcggaggaccgaaggagctaacc
gcttttttgcacaacatggggatcatgtaactcgccttgatcgttgggaaccggagctg
aatgaagccataccaaacgacgagcgtgacaccacgatgcctgtagcaatggcaacaacg
ttgcgcaaactattaactggcgaactacttactctagcttcccggcaacaattaatagac
tggatggaggcggataaagttgcaggaccacttctgcgctcggcccttccggctggctgg
tttattgctgataaatctggagccggtgagcgtgggtctcgcggtatcattgcagcactg
gggccagatggtaagccctcccgtatcgtagttatctacacgacggggagtcaggcaact
atggatgaacgaaatagacagatcgctgagataggtgcctcactgattaagcattggtaa
ctgtcagaccaagtttactcatatatactttagattgatttaaaacttcatttttaattt
```

-continued aaaaggatctaggtgaagatccttttttgataatctcatgaccaaaatcccttaacgtgag ttttcgttccactgagcgtcagaccccgtagaaaagatcaaaggatcttcttgagatcct tttttctgcgcgtaatctgctgcttgcaaacaaaaaaaccaccgctaccagcggtggtt tgtttgccggatcaagagctaccaactcttttttccgaaggtaactggcttcagcagagcg cagataccaaatactgtccttctagtgtagccgtagttaggccaccacttcaagaactct gtagcaccgcctacatacctcgctctgctaatcctgttaccagtggctgctgccagtggc gataagtcgtgtcttaccgggttggactcaagacgatagttaccggataaggcgcagcgg tcgggctgaacggggggttcgtgcacacagcccagcttggagcgaacgacctacaccgaa ctgagatacctacagcgtgagctatgagaaagcgccacgcttcccgaagggagaaaggcg gacaggtatccggtaagcggcagggtcggaacaggagagcgcacgagggagcttccaggg ggaaacgcctggtatctttatagtcctgtcgggtttcgccacctctgacttgagcgtcga ttttgtgatgctcgtcagggggcggagcctatggaaaaacgccagcaacgcggccttt ttacggttcctggccttttgctggccttttgctcacatgttctttcctgcgttatcccct gattctgtggataaccgtattaccgcctttgagtgagctgataccgctcgccgcagcga acgaccgagcgcagcgagtcagtgagcgaggaagcggaagagcgcccaatacgcaaaccg cctctcccgcgcgttggccgattcattaatgcagcagctgcgcgctcgctcgctcactg aggccgcccgggcaaagcccgggcgtcgggcgacctttggtcgcccggcctcagtgagcg agcgagcgcgcagagagggagtggccaactccatcactagggggttccttgtagttaatga ttaacccgccatgctacttatctacgtagccatgctctaggacattgattattgactagt ggagttccgcgttacataacttacggtaaatggcccgcctggctgaccgcccaacgaccc ccgcccattgacgtcaataatgacgtatgttcccatagtaacgccaatagggactttcca ttgacgtcaatgggtggagtatttacggtaaactgcccacttggcagtacatcaagtgta tcatatgccaagtacgccccctattgacgtcaatgacggtaaatggcccgcctggcatta tgcccagtacatgaccttatgggactttcctacttggcagtacatctacgtattagtcat cgctattaccatggtcgaggtgagccccacgttctgcttcactctccccatctcccccc ctccccaccccaattttgtatttatttattttttaattattttgtgcagcgatgggggg gggggggggggggcgcgcgccaggcggggggggcggggcgaggggggggcggggcgagg cggagaggtgcggcggcagccaatcagagcggcgcgctccgaaagtttccttttatggcg aggcggcggcggcggcccctataaaaagcgaagcgcgcggggggggagtcgctgcgcg ctgccttcgccccgtgccccgctccgccgccgcctcgcgccgcccgccccggctctgact gaccgcgttactaaaacaggtaagtccggcctccgcgccgggttttggcgcctcccgggg cgccccctcctcacggcgagcgctgccacgtcagacgaagggcgcagcgagcgtcctga tccttccgcccggacgctcaggacagcggcccgctgctcataagactcggccttagaacc ccagtatcagcagaaggacattttaggacgggacttgggtgactctagggcactggtttt ctttccagagagcggaacaggcgaggaaaagtagtcccttctcggcgattctgcggaggg atctccgtggggcggtgaacgccgatgatgcctctactaaccatgttcatgttttcttt tttttctacaggtcctgggtgacgaacagggtaccgccaccatggccaccggctctcgca caagcctgctgctggctttcggactgctgtgcctgccttggctccaggagggctccgccg ctagcatcgataccgtcgctatgtgctggaggcttgctgaaggctgtatgctgaagttag catgtgtcccagaaccgttttggcctctgactgacggttctgggacatgctaacttcagg -continued acacaaggcctgttactagcactcacatggaacaaatggcctctagcctggaggcttgct gaaggctgtatgctgagaagaaaggtatcccaattgccgttttggcctctgactgacggc aattgggaccttcttctcaggacacaaggcctgttactagcactcacatggaacaaatg gcctctagcctggaggcttgctgaaggctgtatgctgtagtgtttccaaatactgcttgc gttttggcctctgactgacgcaagcagtatggaaacactacaggacacaaggcctgttac tagcactcacatggaacaaatggcctctctagaat 3'

SEQ ID NO: 12 = SEQ ID NO: 1 + SEQ ID NO: 4
5' aatcaacctctggattacaaaatttgtgaaagattgactggtattcttaactatgtt gctccttttacgctatgtggatacgctgctttaatgcctttgtatcatgctattgcttcc cgtatggctttcattttctcctccttgtataaatcctggttgctgtctcttatgaggag ttgtggcccgttgtcaggcaacgtggcgtggtgtgcactgtgtttgctgacgcaacccc actggttggggcattgccaccacctgtcagctccttccgggactttcgctttccccctc cctattgccacggcggaactcatcgccgcctgccttgcccgctgctggacaggggctcgg ctgttgggcactgacaattccgtggtgttgtcggggaaatcatcgtccttccttggctg ctcgcctgtgttgccacctggattctgcgcgggacgtccttctgctacgtcccttcggcc ctcaatccagcggaccttccttcccgcggcctgctgccggctctgcggcctcttccgcgt cttcgccttcgccctcagacgagtcggatctccctttgggccgcctccccgcctaagctt atcgataccgtcgagatctaacttgtttattgcagcttataatggttacaaataaagcaa tagcatcacaaatttcacaaataaagcatttttttcactgcattctagttgtggtttgtc caaactcatcaatgtatcttatcatgtctggatctcgacctcgactagagcatggctacg tagataagtagcatggggggttaatcattaactacaaggaaccccctagtgatggagttggc cactccctctctgcgcgctcgctcgctcactgaggccgggcgaccaaaggtcgcccgacg cccgggctttgcccgggcggcctcagtgagcgagcgagcgcgcagctggcgtaatagcga agaggcccgcaccgatcgcccttcccaacagttgcgcagcctgaatggcgaatggcgatt ccgttgcaatggctggcggtaatattgttctggatattaccagcaaggccgatagtttga gttcttctactcaggcaagtgatgttattactaatcaaagaagtattgcgacaacggtta atttgcgtgatggacagactcttttactcggtggcctcactgattataaaaacacttctc aggattctggcgtaccgttcctgtctaaaatccctttaatcggcctcctgtttagctccc gctctgattctaacgaggaaagcacgttatacgtgctcgtcaaagcaaccatagtacgcg ccctgtagcggcgcattaagcgcggcgggtgtggtggttacgcgcagcgtgaccgctaca cttgccagcgccctagcgcccgctcctttcgctttcttcccttcctttctcgccacgttc gccggctttccccgtcaagctctaaatcggggggctcccctttagggttccgatttagtgct ttacggcacctcgaccccaaaaaacttgattagggtgatggttcacgtagtgggccatcg ccctgatagacggttttttcgccctttgacgttggagtccacgttctttaatagtggactc ttgttccaaactggaacaacactcaaccctatctcggtctattcttttgatttataaggg attttgccgatttcggcctattggttaaaaaatgagctgatttaacaaaaatttaacgcg aattttaacaaaatattaacgtttacaatttaaatatttgcttatacaatcttcctgttt ttggggcttttctgattatcaaccggggtacatatgattgacatgctagttttacgatta ccgttcatcgattctcttgtttgctccagactctcaggcaatgacctgatagcctttgta gagacctctcaaaaatagctaccctctccggcatgaatttatcagctagaacggttgaat atcatattgatggtgatttgactgtctccggcctttctcacccgtttgaatctttaccta -continued

```
cacattactcaggcattgcatttaaaatatatgagggttctaaaaattttatccttgcg ttgaaataaaggcttctcccgcaaaagtattacagggtcataatgttttggtacaaccg atttagctttatgctctgaggctttattgcttaattttgctaattctttgccttgcctgt atgatttattggatgttggaattcctgatgcggtattttctccttacgcatctgtgcggt atttcacaccgcatatggtgcactctcagtacaatctgctctgatgccgcatagttaagc cagccccgacacccgccaacacccgctgacgcgccctgacgggcttgtctgctcccggca tccgcttacagacaagctgtgaccgtctccgggagctgcatgtgtcagaggttttcaccg tcatcaccgaaacgcgcgagacgaaagggcctcgtgatacgcctattttataggttaat gtcatgataataatggtttcttagacgtcaggtggcacttttcggggaaatgtgcgcgga acccctatttgtttatttttctaaatacattcaaatatgtatccgctcatgagacaataa ccctgataaatgcttcaataatattgaaaaaggaagagtatgagtattcaacatttccgt gtcgcccttattcccttttttgcggcattttgccttcctgttttttgctcacccagaaacg ctggtgaaagtaaaagatgctgaagatcagttgggtgcacgagtgggttacatcgaactg gatctcaacagcggtaagatccttgagagttttcgccccgaagaacgttttccaatgatg agcacttttaaagttctgctatgtggcgcggtattatcccgtattgacgccgggcaagag caactcggtcgccgcatacactattctcagaatgacttggttgagtactcaccagtcaca gaaaagcatcttacggatggcatgacagtaagagaattatgcagtgctgccataaccatg agtgataacactgcggccaacttacttctgacaacgatcggaggaccgaaggagctaacc gcttttttgcacaacatgggggatcatgtaactcgccttgatcgttgggaaccggagctg aatgaagccataccaaacgacgagcgtgacaccacgatgcctgtagcaatggcaacaacg ttgcgcaaactattaactggcgaactacttactctagcttcccggcaacaattaatagac tggatggaggcggataaagttgcaggaccacttctgcgctcggcccttccggctggctgg tttattgctgataaatctggagccggtgagcgtgggtctcgcggtatcattgcagcactg gggccagatggtaagccctcccgtatcgtagttatctacacgacggggagtcaggcaact atggatgaacgaaatagacagatcgctgagataggtgcctcactgattaagcattggtaa ctgtcagaccaagtttactcatatatactttagattgatttaaaacttcattttttaattt aaaaggatctaggtgaagatcctttttgataatctcatgaccaaaatcccttaacgtgag ttttcgttccactgagcgtcagaccccgtagaaaagatcaaaggatcttcttgagatcct ttttttctgcgcgtaatctgctgcttgcaaacaaaaaaaccaccgctaccagcggtggtt tgtttgccggatcaagagctaccaactctttttccgaaggtaactggcttcagcagagcg cagataccaaatactgtccttctagtgtagccgtagttaggccaccacttcaagaactct gtagcaccgcctacatacctcgctctgctaatcctgttaccagtggctgctgccagtggc gataagtcgtgtcttaccgggttggactcaagacgatagttaccggataaggcgcagcgg tcgggctgaacggggggttcgtgcacacagcccagcttggagcgaacgacctacaccgaa ctgagatacctacagcgtgagctatgagaaagcgccacgcttcccgaagggagaaaggcg gacaggtatccggtaagcggcagggtcggaacaggagagcgcacgagggagcttccaggg ggaaacgcctggtatctttatagtcctgtcgggtttcgccacctctgacttgagcgtcga tttttgtgatgctcgtcaggggggcggagcctatggaaaaacgccagcaacgcggcctttt ttacggttcctggccttttgctggccttttgctcacatgttctttcctgcgttatcccct gattctgtggataaccgtattaccgcctttgagtgagctgataccgctcgccgcagccga acgaccgagcgcagcgagtcagtgagcgaggaagcggaagagcgcccaatacgcaaaccg
```

-continued cctctccccgcgcgttggccgattcattaatgcagcagctgcgcgctcgctcgctcactg aggccgcccgggcaaagcccgggcgtcgggcgacctttggtcgcccggcctcagtgagcg agcgagcgcgcagagagggagtggccaactccatcactagggggttccttgtagttaatga ttaacccgccatgctacttatctacgtagccatgctctaggacattgattattgactagt ggagttccgcgttacataacttacggtaaatggcccgcctggctgaccgcccaacgaccc ccgcccattgacgtcaataatgacgtatgttcccatagtaacgccaatagggactttcca ttgacgtcaatgggtggagtatttacggtaaactgcccacttggcagtacatcaagtgta tcatatgccaagtacgcccccctattgacgtcaatgacggtaaatggcccgcctggcatta tgcccagtacatgaccttatgggactttcctacttggcagtacatctacgtattagtcat cgctattaccatggtcgaggtgagccccacgttctgcttcactctccccatctccccccc ctccccaccccaattttgtatttatttattttttaattattttgtgcagcgatgggggg ggggggggggggggcgcgcgccaggcggggggggcggggcgagggcgggggggggcgagg cggagaggtgcggcggcagccaatcagagcggcgcgctccgaaagtttccttttatggcg aggcggcggcggcggccctataaaaagcgaagcgcgcggggggggagtcgctgcgcg ctgccttcgcccgtgccccgctccgccgccgcctcgcgccgcccgccccggctctgact gaccgcgttactaaaacaggtaagtccggcctccgcgccgggttttggcgcctcccgcgg gcgccccctcctcacggcgagcgctgccacgtcagacgaagggcgcagcgagcgtcctg atccttccgcccggacgctcaggacagcggcccgctgctcataagactcggccttagaac cccagtatcagcagaaggacatttttaggacgggacttgggtgactctagggcactggttt tctttccagagagcggaacaggcgaggaaaagtagtcccttctcggcgattctgcggagg gatctccgtggggcggtgaacgccgatgatgcctctactaaccatgttcatgttttcttt ttttttctacaggtcctgggtgacgaacagggtaccgccaccatggccaccggctctcgc acaagcctgctgctggcttttcggactgctgtgcctgccttggctccaggagggctccgcc gctagcatcgataccgtcgctatgtgctggaggcttgctgaaggctgtatgctgtctgac agtgatgtcatcctttcgttttggcctctgactgacgaaaggatgatcactgtcagacag gacacaaggcctgttactagcactcacatggaacaaatggcctctagcctggaggcttgc tgaaggctgtatgctgatttaggtcagatggaaactcgcgttttggcctctgactgacgc gagtttccctgacctaaatcaggacacaaggcctgttactagcactcacatggaacaaat ggcctctagcctggaggcttgctgaaggctgtatgctgagtgtatgcttaacgtggactt cgttttggcctctgactgacgaagtccacgaagcatacactcaggacacaaggcctgtta ctagcactcacatggaacaaatggcctctctagaat 3'

SEQ ID NO: 13 = SEQ ID NO: 1 + SEQ ID NO: 5
5' aatcaacctctggattacaaaatttgtgaaagattgactggtattcttaactatgtt gctccttttacgctatgtggatacgctgctttaatgcctttgtatcatgctattgcttcc cgtatggctttcattttctcctccttgtataaatcctggttgctgtctctttatgaggag ttgtggcccgttgtcaggcaacgtggcgtggtgtgcactgtgtttgctgacgcaaccccc actggttggggcattgccaccacctgtcagctcctttccgggactttcgctttcccctc cctattgccacggcggaactcatcgccgcctgccttgcccgctgctggacaggggctcgg ctgttgggcactgacaattccgtggtgttgtcggggaaatcatcgtcctttccttggctg ctcgcctgtgttgccacctggattctgcgcgggacgtccttctgctacgtcccttcggcc ctcaatccagcggaccttccttcccgcggcctgctgccggctctgcggcctcttccgcgt

```
cttcgccttcgccctcagacgagtcggatctcccttttgggccgcctccccgcctaagctt
atcgataccgtcgagatctaacttgtttattgcagcttataatggttacaaataaagcaa
tagcatcacaaatttcacaaataaagcattttttcactgcattctagttgtggtttgtc
caaactcatcaatgtatcttatcatgtctggatctcgacctcgactagagcatggctacg
tagataagtagcatggcgggttaatcattaactacaaggaaccccctagtgatggagttgg
ccactccctctctgcgcgctcgctcgctcactgaggccgggcgaccaaaggtcgcccgac
gcccgggctttgcccgggcggcctcagtgagcgagcgagcgcgcagctggcgtaatagcg
aagagggcccgcaccgatcgcccttcccaacagttgcgcagcctgaatggcgaatggcgat
tccgttgcaatggctggcggtaatattgttctggatattaccagcaaggccgatagtttg
agttcttctactcaggcaagtgatgttattactaatcaaagaagtattgcgacaacggtt
aatttgcgtgatggacagactctttttactcggtggcctcactgattataaaaacacttct
caggattctggcgtaccgttcctgtctaaaatccctttaatcggcctcctgtttagctcc
cgctctgattctaacgaggaaagcacgttatacgtgctcgtcaaagcaaccatagtacgc
gccctgtagcggcgcattaagcgcggcgggtgtggtggttacgcgcagcgtgaccgctac
acttgccagcgccctagcgcccgctcctttcgctttcttcccttcctttctcgccacgtt
cgccggctttccccgtcaagctctaaatcgggggctcccttagggttccgatttagtgc
tttacggcacctcgaccccaaaaaacttgattagggtgatggttcacgtagtgggccatc
gccctgatagacggtttttcgccctttgacgttggagtccacgttctttaatagtggact
cttgttccaaactggaacaacactcaaccctatctcggtctattcttttgatttataagg
gattttgccgatttcggcctattggttaaaaaatgagctgatttaacaaaaatttaacgc
gaattttaacaaaatattaacgtttacaatttaaatatttgcttatacaatcttcctgtt
tttggggcttttctgattatcaaccggggtacatatgattgacatgctagttttacgatt
accgttcatcgattctcttgtttgctccagactctcaggcaatgacctgatagcctttgt
agagacctctcaaaaatagctaccctctccggcatgaatttatcagctagaacggttgaa
tatcatattgatggtgatttgactgtctccggcctttctcacccgtttgaatctttacct
acacattactcaggcattgcatttaaaatatatgaggggttctaaaaattttttatccttgc
gttgaaataaaggcttctcccgcaaaagtattacagggtcataatgttttttggtacaacc
gatttagctttatgctctgaggctttattgcttaattttgctaattcttttgccttgcctg
tatgattattggatgttggaattcctgatgcggtattttctccttacgcatctgtgcgg
tatttcacaccgcatatggtgcactctcagtacaatctgctctgatgccgcatagttaag
ccagccccgacacccgccaacacccgctgacgcgccctgacgggcttgtctgctcccggc
atccgcttacagacaagctgtgaccgtctccgggagctgcatgtgtcagaggttttcacc
gtcatcaccgaaacgcgcgagacgaaagggcctcgtgatacgcctatttttataggttaa
tgtcatgataataatggtttcttagacgtcaggtggcacttttcggggaaatgtgcgcgg
aaccctatttgtttatttttctaaatacattcaaatatgtatccgctcatgagacaata
accctgataaatgcttcaataatattgaaaaaggaagagtatgagtattcaacatttccg
tgtcgcccttattcccttttttgcggcattttgccttcctgttttttgctcacccagaaac
gctggtgaaagtaaaagatgctgaagatcagttgggtgcacgagtgggttacatcgaact
ggatctcaacagcggtaagatccttgagagttttcgccccgaagaacgttttccaatgat
gagcacttttaaagttctgctatgtggcgcggtattatcccgtattgacgccgggcaaga
```

```
gcaactcggtcgccgcatacactattctcagaatgacttggttgagtactcaccagtcac agaaaagcatcttacggatggcatgacagtaagagaattatgcagtgctgccataaccat gagtgataacactgcggccaacttacttctgacaacgatcggaggaccgaaggagctaac cgcttttttgcacaacatgggggatcatgtaactcgccttgatcgttgggaaccggagct gaatgaagccataccaaacgacgagcgtgacaccacgatgcctgtagcaatggcaacaac gttgcgcaaactattaactggcgaactacttactctagcttcccggcaacaattaataga ctggatggaggcggataaagttgcaggaccacttctgcgctcggcccttccggctggctg gtttattgctgataaatctggagccggtgagcgtgggtctcgcggtatcattgcagcact ggggccagatggtaagccctcccgtatcgtagttatctacacgacggggagtcaggcaac tatggatgaacgaaatagacagatcgctgagataggtgcctcactgattaagcattggta actgtcagaccaagtttactcatatatactttagattgatttaaaacttcattttttaatt taaaaggatctaggtgaagatcctttttgataatctcatgaccaaaatcccttaacgtga gttttcgttccactgagcgtcagaccccgtagaaaagatcaaaggatcttcttgagatcc ttttttttctgcgcgtaatctgctgcttgcaaacaaaaaaaccaccgctaccagcggtggt ttgtttgccggatcaagagctaccaactcttttccgaaggtaactggcttcagcagagc gcagataccaaatactgtccttctagtgtagccgtagttaggccaccacttcaagaactc tgtagcaccgcctacatacctcgctctgctaatcctgttaccagtggctgctgccagtgg cgataagtcgtgtcttaccgggttggactcaagacgatagttaccggataaggcgcagcg gtcgggctgaacggggggttcgtgcacacagcccagcttggagcgaacgacctacaccga actgagatacctacagcgtgagctatgagaaagcgccacgcttcccgaagggagaaaggc ggacaggtatccggtaagcggcagggtcggaacaggagagcgcacgagggagcttccagg gggaaacgcctggtatctttatagtcctgtcgggtttcgccacctctgacttgagcgtcg atttttgtgatgctcgtcaggggggcggagcctatggaaaaacgccagcaacgcggcctt tttacggttcctggccttttgctggccttttgctcacatgttctttcctgcgttatcccc tgattctgtggataaccgtattaccgcctttgagtgagctgataccgctcgccgcagccg aacgaccgagcgcagcgagtcagtgagcgaggaagcggaagagcgcccaatacgcaaacc gcctctccccgcgcgttggccgattcattaatgcagcagctgcgcgctcgctcgctcact gaggccgcccgggcaaagcccgggcgtcgggcgacctttggtcgcccggcctcagtgagc gagcgagcgcgcagagagggagtggccaactccatcactaggggttccttgtagttaatg attaacccgccatgctacttatctacgtagccatgctctaggacattgattattgactag tggagttccgcgttacataacttacggtaaatggcccgcctggctgaccgcccaacgacc cccgcccattgacgtcaataatgacgtatgttcccatagtaacgccaatagggactttcc attgacgtcaatgggtggagtatttacggtaaactgcccacttggcagtacatcaagtgt atcatatgccaagtacgccccctattgacgtcaatgacggtaaatggcccgcctggcatt atgcccagtacatgaccttatgggactttcctacttggcagtacatctacgtattagtca tcgctattaccatggtcgaggtgagccccacgttctgcttcactctccccatctccccc cctccccaccccaatttgtatttatttattttttaattattttgtgcagcgatggggg ggggggggggggggcgcgcgccaggcggggggggcgggcgaggggggggggggcgagg cggagaggtgcggcggcagccaatcagagcggcgcgctccgaaagtttccttttatggcg aggcggcggcggcggcggccctataaaaagcgaagcgcgcggggggggagtcgctgcgcg ctgccttcgccccgtgccccgctccgccgccgcctcgcgccgcccgccccggctctgact
```

-continued gaccgcgttactaaaacaggtaagtccggcctccgcgccgggttttggcgcctcccgcgg gcgccccctcctcacggcgagcgctgccacgtcagacgaagggcgcagcgagcgtcctg atccttccgcccggacgctcaggacagcggcccgctgctcataagactcggccttagaac cccagtatcagcagaaggacattttaggacgggacttgggtgactctagggcactggttt tctttccagagagcggaacaggcgaggaaaagtagtcccttctcggcgattctgcggagg gatctccgtggggcggtgaacgccgatgatgcctctactaaccatgttcatgttttcttt tttttctacaggtcctgggtgacgaacagggtaccgccaccatggccaccggctctcgc acaagcctgctgctggcttttcggactgctgtgcctgccttggctccaggagggctccgcc gctagcatcgataccgtcgctatgtgctggaggcttgctgaaggctgtatgctgatactt cagcctgaatcgtgaccgttttggcctctgactgacggtcacgattggctgaagtatcag gacacaaggcctgttactagcactcacatggaacaaatggcctctagcctggaggcttgc tgaaggctgtatgctgacttcactcatattgttccactcgttttggcctctgactgacga gtggaacaatgagtgaagtcaggacacaaggcctgttactagcactcacatggaacaaat ggcctctagcctggaggcttgctgaaggctgtatgctgtatattctacaaatcaccaggg cgttttggcctctgactgacgccctggtgatgtagaatatacaggacacaaggcctgtta ctagcactcacatggaacaaatggcctctctagaat 3'

SEQ ID NO: 14 = SEQ ID NO: 1 + SEQ ID NO: 6
5' aatcaacctctggattacaaaatttgtgaaagattgactggtattcttaactatgtt gctccttttacgctatgtggatacgctgctttaatgcctttgtatcatgctattgcttcc cgtatggctttcattttctcctccttgtataaatcctggttgctgtctctttatgaggag ttgtggcccgttgtcaggcaacgtggcgtggtgtgcactgtgtttgctgacgcaaccccc actggttggggcattgccaccacctgtcagctccttccgggactttcgctttccccctc cctattgccacggcggaactcatcgccgcctgccttgcccgctgctggacaggggctcgg ctgttgggcactgacaattccgtggtgttgtcggggaaatcatcgtccttccttggctg ctcgcctgtgttgccacctggattctgcgcgggacgtccttctgctacgtcccttcggcc ctcaatccagcggaccttccttcccgcggcctgctgccggctctgcggcctcttccgcgt cttcgccttcgccctcagacgagtcggatctcccttttgggccgcctcccgcctaagctt atcgataccgtcgagatctaacttgtttattgcagcttataatggttacaaataaagcaa tagcatcacaaatttcacaaataaagcattttttcactgcattctagttgtggtttgtc caaactcatcaatgtatcttatcatgtctggatctcgacctcgactagagcatggctacg tagataagtagcatggcgggttaatcattaactacaaggaacccctagtgatggagttgg ccactccctctctgcgcgctcgctcgctcactgaggccgggcgaccaaaggtcgcccgac gcccgggctttgccCgggcggcctcagtgagcgagcgagcgcgcagctggcgtaatagcg aagaggcccgcaccgatcgcccttcccaacagttgcgcagcctgaatggcgaatggcgat tccgttgcaatggctggcggtaatattgttctggatattaccagcaaggccgatagtttg agttcttctactcaggcaagtgatgttattactaatcaaagaagtattgcgacaacggtt aatttgcgtgatggacagactcttttactcggtggcctcactgattataaaaacacttct caggattctggcgtaccgttcctgtctaaaatcccttttaatcggcctcctgtttagctcc cgctctgattctaacgaggaaagcacgttatacgtgctcgtcaaagcaaccatagtacgc gccctgtagcggcgcattaagcgcggcgggtgtggtggttacgcgcagcgtgaccgctac acttgccagcgccctagcgcccgctccttttcgctttcttcccttcctttctcgccacgtt

```
cgccggctttccccgtcaagctctaaatcgggggctccctttagggttccgatttagtgc tttacggcacctcgaccccaaaaaacttgattagggtgatggttcacgtagtgggccatc gccctgatagacggttttcgccctttgacgttggagtccacgttctttaatagtggact cttgttccaaactggaacaacactcaaccctatctcggtctattcttttgatttataagg gattttgccgatttcggcctattggttaaaaaatgagctgatttaacaaaaatttaacgc gaattttaacaaaatattaacgtttacaatttaaatatttgcttatacaatcttcctgtt tttggggcttttctgattatcaaccggggtacatatgattgacatgctagttttacgatt accgttcatcgattctcttgtttgctccagactctcaggcaatgacctgatagcctttgt agagacctctcaaaaatagctaccctctccggcatgaatttatcagctagaacggttgaa tatcatattgatggtgatttgactgtctccggccttctcacccgtttgaatctttacct acacattactcaggcattgcatttaaaatatatgagggttctaaaaattttatccttgc gttgaaataaaggcttctcccgcaaaagtattacagggtcataatgttttggtacaacc gatttagctttatgctctgaggctttattgcttaattttgctaattctttgccttgcctg tatgatttattggatgttggaattcctgatgcggtattttctccttacgcatctgtgcgg tatttcacaccgcatatggtgcactctcagtacaatctgctctgatgccgcatagttaag ccagccccgacaccgccaacacccgctgacgcgccctgacgggcttgtctgctcccggc atccgcttacagacaagctgtgaccgtctccgggagctgcatgtgtcagaggttttcacc gtcatcaccgaaacgcgcgagacgaaagggcctcgtgatacgcctatttttataggttaa tgtcatgataataatggtttcttagacgtcaggtggcacttttcggggaaatgtgcgcgg aacccctatttgtttattttttctaaatacattcaaatatgtatccgctcatgagacaata accctgataaatgcttcaataatattgaaaaaggaagagtatgagtattcaacatttccg tgtcgcccttattccctttttttgcggcattttgccttcctgttttttgctcacccagaaac gctggtgaaagtaaaagatgctgaagatcagttgggtgcacgagtgggttacatcgaact ggatctcaacagcggtaagatccttgagagttttcgccccgaagaacgttttccaatgat gagcacttttaaagttctgctatgtggcgcggtattatcccgtattgacgccgggcaaga gcaactcggtcgccgcatacactattctcagaatgacttggttgagtactcaccagtcac agaaaagcatcttacggatggcatgacagtaagagaattatgcagtgctgccataaccat gagtgataacactgcggccaacttacttctgacaacgatcggaggaccgaaggagctaac cgcttttttgcacaacatgggggatcatgtaactcgccttgatcgttgggaaccggagct gaatgaagccataccaaacgacgagcgtgacaccacgatgcctgtagcaatggcaacaac gttgcgcaaactattaactggcgaactacttactctagcttcccggcaacaattaataga ctggatggaggcggataaagttgcaggaccacttctgcgctcggcccttccggctggctg gtttattgctgataaatctggagccggtgagcgtgggtctcgcggtatcattgcagcact ggggccagatggtaagccccccgtatcgtagttatctacacgacggggagtcaggcaact atggatgaacgaaatagacagatcgctgagataggtgcctcactgattaagcattggtaa ctgtcagaccaagtttactcatatatactttagattgatttaaaacttcatttttaattt aaaaggatctaggtgaagatcctttttgataatctcatgaccaaaatcccttaacgtgag ttttcgttccactgagcgtcagaccccgtagaaaagatcaaaggatcttcttgagatcct ttttttctgcgcgtaatctgctgcttgcaaacaaaaaaaccaccgctaccagcggtggtt tgtttgccggatcaagagctaccaactctttttccgaaggtaactggcttcagcagagcg
```

-continued

```
cagataccaaatactgtccttctagtgtagccgtagttaggccaccacttcaagaactct gtagcaccgcctacatacctcgctctgctaatcctgttaccagtggctgctgccagtggc gataagtcgtgtcttaccgggttggactcaagacgatagttaccggataaggcgcagcgg tcgggctgaacgggggttcgtgcacacagcccagcttggagcgaacgacctacaccgaa ctgagatacctacagcgtgagctatgagaaagcgccacgcttcccgaagggagaaaggcg gacaggtatccggtaagcggcagggtcggaacaggagagcgcacgagggagcttccaggg ggaaacgcctggtatctttatagtcctgtcgggtttcgccacctctgacttgagcgtcga tttttgtgatgctcgtcagggggcggagcctatggaaaaacgccagcaacgcggccttt ttacggttcctggccttttgctggccttttgctcacatgttctttcctgcgttatcccct gattctgtggataaccgtattaccgcctttgagtgagctataccgctcgccgcagccga acgaccgagcgcagcgagtcagtgagcgaggaagcggaagagcgcccaatacgcaaaccg cctctcccgcgcgttggccgattcattaatgcagcagctgcgcgctcgctcgctcactg aggccgcccgggcaaagcccggcgtcgggcgacctttggtcgcccggcctcagtgagcg agcgagcgcgcagagggagtggccaactccatcactagggggttccttgtagttaatga ttaacccgccatgctacttatctacgtagccatgctctaggacattgattattgactagt ggagttccgcgttacataacttacggtaaatggcccgcctggctgaccgcccaacgaccc ccgcccattgacgtcaataatgacgtatgttcccatagtaacgccaatagggactttcca ttgacgtcaatgggtggagtatttacggtaaactgcccacttggcagtacatcaagtgta tcatatgccaagtacgccccctattgacgtcaatgacggtaaatggcccgcctggcatta tgcccagtacatgaccttatgggactttcctacttggcagtacatctacgtattagtcat cgctattaccatggtcgaggtgagccccacgttctgcttcactctccccatctcccccc ctccccaccccaattttgtatttatttatttttaattattttgtgcagcgatggggggg ggggggggggggcgcgcgccaggcggggcggggggggcgagggcggggggggcgagg cggagaggtgcggcggcagccaatcagagcggcgcgctccgaaagtttccttttatggcg aggcggcggcgcggcggccctataaaaagcgaagcgcgcggggggggagtcgctgcgcg ctgccttcgccccgtgcccgctccgccgccgcctcgcgccgcccgccccggctctgact gaccgcgttactaaaacaggtaagtccggcctccgcgccgggttttggcgcctcccgcgg gcgccccctcctcacggcgagcgctgccacgtcagacgaagggcgcagcgagcgtcctg atccttccgcccggacgctcaggacagcggcccgctgctcataagactcggccttagaac cccagtatcagcagaaggacattttaggacgggacttgggtgactctagggcactggttt tctttccagagagcggaacaggcgaggaaaagtagtcccttctcggcgattctgcggagg gatctccgtggggcggtgaacgccgatgatgcctctactaaccatgttcatgttttcttt tttttctacaggtcctgggtgacgaacagggtaccgccaccatggccaccggctctcgc acaagcctgctgctggctttcggactgctgtgcctgccttggctccaggagggctccgcc gctagcatcgataccgtcgctatgtgctggaggcttgctgaaggctgtatgctgtataag tccagtgagaagaaggcgttttggcctctgactgacgccttcttctctggacttatacag gacacaaggcctgttactagcactcacatggaacaaatggcctctagcctggaggcttgc tgaaggctgtatgctgctatcatcaaatgagctgctgcgttttggcctctgactgacgca gcagctcttgatgatagtcaggacacaaggcctgttactagcactcacatggaacaaatg gcctctagcctggaggcttgctgaaggctgtatgctgaagactgctggaaattctatggc
```

-continued tgttttggcctctgactgacgaccatagaatccagcagtctcaggacacaaggcctgtta ctagcactcacatggaacaaatggcctctctagaat 3'

SEQ ID NO: 15 = SEQ ID NO: 1 + SEQ ID NO: 7
5' aatcaacctctggattacaaaatttgtgaaagattgactggtattcttaactatgtt gctccttttacgctatgtggatacgctgctttaatgcctttgtatcatgctattgcttcc cgtatggctttcattttctcctccttgtataaatcctggttgctgtctctttatgaggag ttgtggcccgttgtcaggcaacgtggcgtggtgtgcactgtgtttgctgacgcaacccc actggttggggcattgccaccacctgtcagctccttttcgggactttcgctttccccctc cctattgccacggcggaactcatcgccgcctgccttgcccgctgctggacaggggctcgg ctgttgggcactgacaattccgtggtgttgtcggggaaatcatcgtcctttccttggctg ctcgcctgtgttgccacctggattctgcgcgggacgtccttctgctacgtcccttcggcc ctcaatccagcggaccttccttcccgcggcctgctgccggctctgcggcctcttccgcgt cttcgccttcgccctcagacgagtcggatctcccctttgggccgcctccccgcctaagctt atcgataccgtcgagatctaacttgtttattgcagcttataatggttacaaataaagcaa tagcatcacaaatttcacaaataaagcattttttcactgcattctagttgtggtttgtc caaactcatcaatgtatcttatcatgtctggatctcgacctcgactagagcatggctacg tagataagtagcatggcgggttaatcattaactacaaggaaccccctagtgatggagttgg ccactccctctctgcgcgctcgctcgctcactgaggccgggcgaccaaaggtcgcccgac gcccgggctttgccgggcggcctcagtgagcgagcgagcgcgcagctggcgtaatagcg aagaggcccgcaccgatcgcccttcccaacagttgcgcagcctgaatggcgaatggcgat tccgttgcaatggctggcggtaatattgttctggatattaccagcaaggccgatagtttg agttcttctactcaggcaagtgatgttattactaatcaaagaagtattgcgacaacggtt aatttgcgtgatggacagactcttttactcggtggcctcactgattataaaaacacttct caggattctggcgtaccgttcctgtctaaaatccctttaatcggcctcctgtttagctcc cgctctgattctaacgaggaaagcacgttatacgtgctcgtcaaagcaaccatagtacgc gccctgtagcggcgcattaagcgcggcgggtgtggtggttacgcgcagcgtgaccgctac acttgccagcgccctagcgcccgctcctttcgctttcttcccttcctttctcgccacgtt cgccggctttccccgtcaagctctaaatcgggggctcccctttagggttccgatttagtgc tttacggcacctcgaccccaaaaaacttgattagggtgatggttcacgtagtgggccatc gccctgatagacggttttttcgccctttgacgttggagtccacgttctttaatagtggact cttgttccaaactggaacaacactcaaccctatctcggtctattcttttgatttataagg gattttgccgatttcggcctattggttaaaaaatgagctgatttaacaaaaatttaacgc gaattttaacaaaatattaacgtttacaatttaaatatttgcttatacaatcttcctgtt tttgggcttttctgattatcaaccggggtacatatgattgacatgctagttttacgatt accgttcatcgattctcttgtttgctccagactctcaggcaatgacctgatagcctttgt agagacctctcaaaaatagctaccctctccggcatgaatttatcagctagaacggttgaa tatcatattgatggtgatttgactgtctccggccttttctcacccgtttgaatctttacct acacattactcaggcattgcatttaaaatatatgagggttctaaaaattttttatccttgc gttgaaataaaggcttctcccgcaaaagtattacagggtcataatgttttttggtacaacc gatttagctttatgctctgaggctttattgcttaattttgctaattcttttgccttgcctg tatgatttattggatgttggaattcctgatgcggtattttctccttacgcatctgtgcgg -continued

```
tatttcacaccgcatatggtgcactctcagtacaatctgctctgatgccgcatagttaag ccagccccgacacccgccaacacccgctgacgcgccctgacgggcttgtctgctcccggc atccgcttacagacaagctgtgaccgtctccgggagctgcatgtgtcagaggttttcacc gtcatcaccgaaacgcgcgagacgaaagggcctcgtgatacgcctattttataggttaa tgtcatgataataatggtttcttagacgtcaggtggcacttttcggggaaatgtgcgcgg aacccctatttgtttattttttctaaatacattcaaatatgtatccgctcatgagacaata accctgataaatgcttcaataatattgaaaaaggaagagtatgagtattcaacatttccg tgtcgcccttattccctttttttgcggcattttgccttcctgtttttgctcacccagaaac gctggtgaaagtaaaagatgctgaagatcagttgggtgcacgagtgggttacatcgaact ggatctcaacagcggtaagatccttgagagttttcgccccgaagaacgttttccaatgat gagcacttttaaagttctgctatgtggcgcggtattatcccgtattgacgccgggcaaga gcaactcggtcgccgcatacactattctcagaatgacttggttgagtactcaccagtcac agaaaagcatcttacggatggcatgacagtaagagaattatgcagtgctgccataaccat gagtgataacactgcggccaacttacttctgacaacgatcggaggaccgaaggagctaac cgcttttttgcacaacatgggggatcatgtaactcgccttgatcgttgggaaccggagct gaatgaagccataccaaacgacgagcgtgacaccacgatgcctgtagcaatggcaacaac gttgcgcaaactattaactggcgaactacttactctagcttcccggcaacaattaataga ctggatggaggcggataaagttgcaggaccacttctgcgctcggcccttccggctggctg gtttattgctgataaatctggagccggtgagcgtgggtctcgcggtatcattgcagcact ggggccagatggtaagccctcccgtatcgtagttatctacacgacggggagtcaggcaac tatggatgaacgaaatagacagatcgctgagataggtgcctcactgattaagcattggta actgtcagaccaagtttactcatatatactttagattgatttaaaacttcattttttaatt taaaaggatctaggtgaagatcctttttgataatctcatgaccaaaatcccttaacgtga gttttcgttccactgagcgtcagacccccgtagaaaagatcaaaggatcttcttgagatcc ttttttttctgcgcgtaatctgctgcttgcaaacaaaaaaaccaccgctaccagcggtggt ttgtttgccggatcaagagctaccaactctttttccgaaggtaactggcttcagcagagc gcagataccaaatactgtccttctagtgtagccgtagttaggccaccacttcaagaactc tgtagcaccgcctacatacctcgctctgctaatcctgttaccagtggctgctgccagtgg cgataagtcgtgtcttaccgggttggactcaagacgatagttaccggataaggcgcagcg gtcgggctgaacggggggttcgtgcacacagcccagcttggagcgaacgacctacaccga actgagatacctacagcgtgagctatgagaaagcgccacgcttcccgaagggagaaaggc ggacaggtatccggtaagcggcagggtcggaacaggagagcgcacgagggagcttccagg gggaaacgcctggtatctttatagtcctgtcgggtttcgccacctctgacttgagcgtcg atttttgtgatgctcgtcaggggggcggagcctatggaaaaacgccagcaacgcggcctt tttacggttcctggccttttgctggccttttgctcacatgttctttcctgcgttatcccc tgattctgtggataaccgtattaccgcctttgagtgagctgataccgctcgccgcagccg aacgaccgagcgcagcgagtcagtgagcgaggaagcggaagagcgcccaatacgcaaacc gcctctccccgcgcgttggccgattcattaatgcagcagctgcgcgctcgctcgctcact gaggcgcccgggcaaagcccgggcgtcgggcgacctttggtcgcccggcctcagtgagc gagcgagcgcgcagagagggagtggccaactccatcactagggggttccttgtagttaatg
```

-continued

```
attaacccgccatgctacttatctacgtagccatgctctaggacattgattattgactag tggagttccgcgttacataacttacggtaaatggcccgcctggctgaccgcccaacgacc cccgcccattgacgtcaataatgacgtatgttcccatagtaacgccaatagggactttcc attgacgtcaatgggtggagtatttacggtaaactgcccacttggcagtacatcaagtgt atcatatgccaagtacgccccctattgacgtcaatgacggtaaatggcccgcctggcatt atgcccagtacatgaccttatgggactttcctacttggcagtacatctacgtattagtca tcgctattaccatggtcgaggtgagccccacgttctgcttcactctccccatctccccc cctccccaccccaattttgtatttatttattttttaattattttttgtgcagcgatggggg ggggggggggggggcgcgcgccaggcggggcggggcggggcgaggggggggcggggcga ggcggagaggtgcggcggcagccaatcagagcggcgcgctccgaaagtttccttttatgg cgaggcggcggcggcggcggccctataaaaagcgaagcgcgcggggggggagtcgctgcg cgctgccttcgcccccgtgccccgctccgccgccgcctcgcgccgcccgcccggctctga ctgaccgcgttactaaaacaggtaagtccggcctccgcgccgggttttggcgcctcccgc gggcgccccctcctcacggcgagcgctgccacgtcagacgaagggcgcagcgagcgtcc tgatccttccgcccggacgctcaggacagcggcccgctgctcataagactcggccttaga accccagtatcagcagaaggacattttaggacgggacttgggtgactctagggcactggt tttctttccagagagcggaacaggcgaggaaaagtagtcccttctcggcgattctgcgga gggatctccgtgggcggtgaacgccgatgatgcctctactaaccatgttcatgttttct ttttttttctacaggtcctgggtgacgaacagggtaccgccaccatggccaccggctctc gcacaagcctgctgctggctttcggactgctgtgcctgccttggctccaggagggctccg ccgctagcatcgataccgtcgctatgtgctggaggcttgctgaaggctgtatgctgatta gcactggtgatttccggctgttttggcctctgactgacgaccggaaatccagtgctaatc aggacacaaggcctgttactagcactcacatggaacaaatggcctctagcctggaggctt gctgaaggctgtatgctgattgagtttcgcattcttgttgccgttttggcctctgactga cggcaacaagagcgaaactcaacaggacacaaggcctgttactagcactcacatggaaca aatggcctctagcctggaggcttgctgaaggctgtatgctgattgatcaggcaaacatag tcccgttttggcctctgactgacgggactatgtgcctgatcaatcaggacacaaggcctg ttactagcactcacatggaacaaatggcctctctagaat 3'
```

SEQ ID NO: 16 = SEQ ID NO: 1 + SEQ ID NO: 8
```
5' aatcaacctctggattacaaaatttgtgaaagattgactggtattcttaactatgtt gctccttttacgctatgtggatacgctgctttaatgcctttgtatcatgctattgcttcc cgtatggctttcattttctcctccttgtataaatcctggttgctgtctctttatgaggag ttgtggcccgttgtcaggcaacgtggcgtggtgtgcactgtgtttgctgacgcaaccccc actggttggggcattgccaccacctgtcagctcctttccgggactttcgctttccccctc cctattgccacggcggaactcatcgccgcctgccttgcccgctgctggacaggggctcgg ctgttgggcactgacaattccgtggtgttgtcggggaaatcatcgtcctttccttggctg ctcgcctgtgttgccacctggattctgcgcgggacgtccttctgctacgtcccttcggcc ctcaatccagcggaccttccttcccgcggcctgctgccggctctgcggcctcttccgcgt cttcgccttcgccctcagacgagtcggatctccctttgggccgcctccccgcctaagctt atcgataccgtcgagatctaacttgtttattgcagcttataatggttacaaataaagcaa tagcatcacaaatttcacaaataaagcattttttttcactgcattctagttgtggtttgtc
```

-continued

```
caaactcatcaatgtatcttatcatgtctggatctcgacctcgactagagcatggctacg
tagataagtagcatggcgggttaatcattaactacaaggaaccoctagtgatggagttgg
ccactccctctctgcgcgctcgctcgctcactgaggccgggcgaccaaaggtcgcccgac
gcccgggctttgcccgggcggcctcagtgagcgagcgagcgcgcagctggcgtaatagcg
aagaggcccgcaccgatcgcccttcccaacagttgcgcagcctgaatggcgaatggcgat
tccgttgcaatggctggcggtaatattgttctggatattaccagcaaggccgatagtttg
agttcttctactcaggcaagtgatgttattactaatcaaagaagtattgcgacaacggtt
aatttgcgtgatggacagactcttttactcggtggcctcactgattataaaaacacttct
caggattctggcgtaccgttcctgtctaaaatcccttttaatcggcctcctgtttagctcc
cgctctgattctaacgaggaaagcacgttatacgtgctcgtcaaagcaaccatagtacgc
gccctgtagcggcgcattaagcgcggcgggtgtggtggttacgcgcagcgtgaccgctac
acttgccagcgccctagcgcccgctcctttcgctttcttcccttcctttctcgccacgtt
cgccggctttccccgtcaagctctaaatcgggggctccctttagggttccgatttagtgc
tttacggcacctcgaccccaaaaaacttgatagggtgatggttcacgtagtgggccatc
gccctgatagacggttttcgccctttgacgttggagtccacgttctttaatagtggact
cttgttccaaactggaacaacactcaaccctatctcggtctattcttttgatttataagg
gatttgccgatttcggcctattggttaaaaaatgagctgatttaacaaaaatttaacgc
gaattttaacaaaatattaacgtttacaatttaaatatttgcttatacaatcttcctgtt
tttgggcttttctgattatcaaccggggtacatatgattgacatgctagttttacgatt
accgttcatcgattctcttgtttgctccagactctcaggcaatgacctgatagcctttgt
agagacctctcaaaaatagctaccctctccggcatgaatttatcagctagaacggttgaa
tatcatattgatggtgatttgactgtctccggcctttctcacccgtttgaatctttacct
acacattactcaggcattgcatttaaaatatgagggttctaaaaattttttatccttgc
gttgaaataaaggcttctcccgcaaaagtattacagggtcataatgttttggtacaacc
gatttagctttatgctctgaggctttattgcttaattttgctaattctttgccttgcctg
tatgatttattggatgttggaattcctgatgcggtattttctccttacgcatctgtgcgg
tatttcacaccgcatatggtgcactctcagtacaatctgctctgatgccgcatagttaag
ccagccccgacacccgccaacacccgctgacgcgccctgacgggcttgtctgctcccggc
atccgcttacagacaagctgtgaccgtctccgggagctgcatgtgtcagaggttttcacc
gtcatcaccgaaacgcgcgagacgaaagggcctcgtgatacgcctatttttataggttaa
tgtcatgataataatggtttcttagacgtcaggtggcacttttcggggaaatgtgcgcgg
aaccoctatttgttattttttctaaatacattcaaatatgtatccgctcatgagacaata
accctgataaatgcttcaataatattgaaaaaggaagagtatgagtattcaacatttccg
tgtcgcccttattcccttttttgcggcattttgccttcctgttttgctcacccagaaac
gctggtgaaagtaaaagatgctgaagatcagttgggtgcacgagtgggttacatcgaact
ggatctcaacagcggtaagatccttgagagttttcgccccgaagaacgttttccaatgat
gagcacttttaaagttctgctatgtggcgcggtattatcccgtattgacgccgggcaaga
gcaactcggtcgccgcatacactattctcagaatgacttggttgagtactcaccagtcac
agaaaagcatcttacggatggcatgacagtaagagaattatgcagtgctgccataaccat
gagtgataacactgcggccaacttacttctgacaacgatcggaggaccgaaggagctaac
cgcttttttgcacaacatgggggatcatgtaactcgccttgatcgttgggaaccggagct
```

-continued gaatgaagccataccaaacgacgagcgtgacaccacgatgcctgtagcaatggcaacaac gttgcgcaaactattaactggcgaactacttactctagcttcccggcaacaattaataga ctggatggaggcggataaagttgcaggaccacttctgcgctcggcccttccggctggctg gtttattgctgataaatctggagccggtgagcgtgggtctcgcggtatcattgcagcact ggggccagatggtaagccctcccgtatcgtagttatctacacgacggggagtcaggcaac tatggatgaacgaaatagacagatcgctgagataggtgcctcactgattaagcattggta actgtcagaccaagtttactcatatatactttagattgatttaaaacttcatttttaatt taaaaggatctaggtgaagatcctttttgataatctcatgaccaaaatcccttaacgtga gttttcgttccactgagcgtcagaccccgtagaaaagatcaaaggatcttcttgagatcc ttttttctgcgcgtaatctgctgcttgcaaacaaaaaaaccaccgctaccagcggtggt ttgtttgccggatcaagagctaccaactcttttccgaaggtaactggcttcagcagagc gcagataccaaatactgtccttctagtgtagccgtagttaggccaccacttcaagaactc tgtagcaccgcctacatacctcgctctgctaatcctgttaccagtggctgctgccagtgg cgataagtcgtgtcttaccgggttggactcaagacgatagttaccggataaggcgcagcg gtcgggctgaacggggggttcgtgcacacagcccagcttggagcgaacgacctacaccga actgagatacctacagcgtgagctatgagaaagcgccacgcttcccgaagggagaaaggc ggacaggtatccggtaagcggcagggtcggaacaggagagcgcacgagggagcttccagg gggaaacgcctggtatctttatagtcctgtcgggtttcgccacctctgacttgagcgtcg atttttgtgatgctcgtcagggggcggagcctatggaaaaacgccagcaacgcggcctt tttacggttcctggccttttgctggccttttgctcacatgttctttcctgcgttatcccc tgattctgtggataaccgtattaccgcctttgagtgagctgataccgctcgccgcagccg aacgaccgagcgcagcgagtcagtgagcgaggaagcggaagagcgcccaatacgcaaacc gcctctccccgcgcgttggccgattcattaatgcagcagctgcgcgctcgctcgctcact gaggccgcccgggcaaagcccgggcgtcgggcgaccttggtcgcccggcctcagtgagc gagcgagcgcgcagagagggagtggccaactccatcactaggggttccttgtagttaatg attaacccgccatgctacttatctacgtagccatgctctaggacattgattattgactag tggagttccgcgttacataacttacggtaaatggcccgcctggctgaccgcccaacgacc cccgcccattgacgtcaataatgacgtatgttcccatagtaacgccaatagggactttcc attgacgtcaatgggtggagtatttacggtaaactgcccacttggcagtacatcaagtgt atcatatgccaagtacgccccctattgacgtcaatgacggtaaatggcccgcctggcatt atgcccagtacatgaccttatgggactttcctacttggcagtacatctacgtattagtca tcgctattaccatggtcgaggtgagccccacgttctgcttcactctccccatctccccc cctccccaccccaattttgtatttatttattttttaattattttgtgcagcgatggggg ggggggggggggggcgcgcgccaggcggggcggggcggggcgaggggcggggcggggcg aggcggagaggtgcggcggcagccaatcagagcggcgcgctccgaaagtttccttttatg gcgaggcggcggcggcggcggccctataaaaagcgaagcgcgcggcggggggagtcgctgc gcgctgccttcgccccgtgccccgctccgccgccgcctcgccgccccgccccggctctg actgaccgcgttactaaaacaggtaagtccggcctccgcgccgggttttggcgcctccg cgggcgcccccctcctcacggcgagcgctgccacgtcagacgaagggcgcagcgagcgtc ctgatccttccgcccggacgctcaggacagcggcccgctgctcataagactcggccttag -continued aaccccagtatcagcagaaggacattttaggacgggacttgggtgactctagggcactgg ttttctttccagagagcggaacaggcgaggaaaagtagtcccttctcggcgattctgcgg agggatctccgtggggcggtgaacgccgatgatgcctctactaaccatgttcatgttttc ttttttttttctacaggtcctgggtgacgaacagggtaccgccaccatggccaccggctct cgcacaagcctgctgctggctttcggactgctgtgcctgccttggctccaggagggctcc gccgctagcatcgataccgtcgctatgtgctggaggcttgctgaaggctgtatgctgtct gatcgtggtgttatttgggcgttttggcctctgactgacgcccaaataaccacgatcaga caggacacaaggcctgttactagcactcacatggaacaaatggcctctagcctggaggct tgctgaaggctgtatgctgttgagtttcgcattcttgttgccgttttggcctctgactga cggcaacaagagcgaaactcaacaggacacaaggcctgttactagcactcacatggaaca aatggcctctagcctggaggcttgctgaaggctgtatgctgtatccttcttataactcagc ctccgttttggcctctgactgacggaggctgagataagaggatacaggacacaaggcctg ttactagcactcacatggaacaaatggcctctctagaat 3'

SEQ ID NO: 17 = SEQ ID NO: 1 + SEQ ID NO: 9
5' aatcaacctctggattacaaaatttgtgaaagattgactggtattcttaactatgtt gctccttttacgctatgtggatacgctgctttaatgcctttgtatcatgctattgcttcc cgtatggctttcattttctcctccttgtataaatcctggttgctgtctctttatgaggag ttgtggcccgttgtcaggcaacgtggcgtggtgtgcactgtgtttgctgacgcaaccccc actggttggggcattgccaccacctgtcagctccttttccgggactttcgctttccccctc cctattgccacggcggaactcatcgccgcctgccttgcccgctgctggacaggggctcgg ctgtgggcactgacaattccgtggtgttgtcggggaaatcatcgtcctttccttggctg ctcgcctgtgttgccacctggattctgcgcgggacgtccttctgctacgtccccttcggcc ctcaatccagcggaccttccttcccgcggcctgctgccggctctgcggcctcttccgcgt cttcgccttcgccctcagacgagtcggatctccctttgggccgcctccccgcctaagctt atcgataccgtcgagatctaacttgtttattgcagcttataatggttacaaataaagcaa tagcatcacaaatttcacaaataaagcatttttttcactgcattctagttgtggtttgtc caaactcatcaatgtatcttatcatgtctggatctcgacctcgactagagcatggctacg tagataagtagcatggcgggttaatcattaactacaaggaacccctagtgatggagttgg ccactccctctctgcgcgctcgctcgctcactgaggccgggcgaccaaaggtcgcccgac gcccgggctttgcccgggcggcctcagtgagcgagcgagcgcgcagctggcgtaatagcg aagaggcccgcaccgatcgcccttcccaacagttgcgcagcctgaatggcgaatggcgat tccgttgcaatggctggcggtaatattgttctggatattaccagcaaggccgatagtttg agttcttctactcaggcaagtgatgttattactaatcaaagaagtattgcgacaacggtt aatttgcgtgatggacagactcttttactcggtggcctcactgattataaaaacacttct caggattctggcgtaccgttcctgtctaaaatccctttaatcggcctcctgtttagctcc cgctctgattctaacgaggaaagcacgttatacgtgctcgtcaaagcaaccatagtacgc gccctgtagcggcgcattaagcgcggcgggtgtggtggttacgcgcagcgtgaccgctac acttgccagcgccctagcgcccgctcctttcgctttcttcccttcctttctcgccacgtt cgccggctttccccgtcaagctctaaatcgggggctcccttttagggttccgatttagtgc tttacggcacctcgaccccaaaaaacttgattagggtgatggttcacgtagtgggccatc gccctgatagacggttttcgccctttgacgttggagtccacgttctttaatagtggact -continued

```
cttgttccaaactggaacaacactcaaccctatctcggtctattcttttgatttataagg gattttgccgatttcggcctattggttaaaaaatgagctgatttaacaaaaatttaacgc gaattttaacaaaatattaacgtttacaatttaaatatttgcttatacaatcttcctgtt tttggggcttttctgattatcaaccggggtacatatgattgacatgctagttttacgatt accgttcatcgattctcttgtttgctccagactctcaggcaatgacctgatagcctttgt agagacctctcaaaaatagctaccctctccggcatgaatttatcagctagaacggttgaa tatcatattgatggtgatttgactgtctccggcctttctcacccgtttgaatctttacct acacattactcaggcattgcatttaaaatatatgagggttctaaaaatttttatccttgc gttgaaataaaggcttctcccgcaaaagtattacagggtcataatgttttggtacaacc gattagctttatgctctgaggctttattgcttaattttgctaattctttgccttgcctg tatgatttattggatgttggaattcctgatgcggtattttctccttacgcatctgtgcgg tatttcacaccgcatatggtgcactctcagtacaatctgctctgatgccgcatagttaag ccagccccgacacccgccaacacccgctgacgcgccctgacgggcttgtctgctcccggc atccgcttacagacaagctgtgaccgtctccgggagctgcatgtgtcagaggttttcacc gtcatcaccgaaacgcgcgagacgaaagggcctcgtgatacgcctattttttataggttaa tgtcatgataataatggtttcttagacgtcaggtggcacttttcggggaaatgtgcgcgg aacccctatttgtttattttctaaatacattcaaatatgtatccgctcatgagacaata accctgataaatgcttcaataatattgaaaaaggaagagtatgagtattcaacatttccg tgtcgcccttattcccttttttgcggcattttgccttcctgtttttgctcacccagaaac gctggtgaaagtaaaagatgctgaagatcagttgggtgcacgagtgggttacatcgaact ggatctcaacagcggtaagatccttgagagttttcgccccgaagaacgttttccaatgat gagcacttttaaagttctgctatgtggcgcggtattatcccgtattgacgccgggcaaga gcaactcggtcgccgcatacactattctcagaatgacttggttgagtactcaccagtcac agaaaagcatcttacggatggcatgacagtaagagaattatgcagtgctgccataaccat gagtgataacactgcggccaacttacttctgacaacgatcggaggaccgaaggagctaac cgcttttttgcacaacatgggggatcatgtaactcgccttgatcgttgggaaccggagct gaatgaagccataccaaacgacgagcgtgacaccacgatgcctgtagcaatggcaacaac gttgcgcaaactattaactggcgaactacttactctagcttcccggcaacaattaataga ctggatggaggcggataaagttgcaggaccacttctgcgctcggcccttccggctggctg gtttattgctgataaatctggagccggtgagcgtgggtctcgcggtatcattgcagcact ggggccagatggtaagccctcccgtatcgtagttatctacacgacggggagtcaggcaac tatggatgaacgaaatagacagatcgctgagataggtgcctcactgattaagcattggta actgtcagaccaagtttactcatatatactttagattgatttaaaacttcatttttaatt taaaaggatctaggtgaagatcctttttgataatctcatgaccaaaatcccttaacgtga gttttcgttccactgagcgtcagacccgtagaaaagatcaaaggatcttcttgagatcc ttttttttctgcgcgtaatctgctgcttgcaaacaaaaaaaccaccgctaccagcggtggt ttgtttgccggatcaagagctaccaactcttttttccgaaggtaactggcttcagcagagc gcagataccaaatactgtccttctagtgtagccgtagttaggccaccacttcaagaactc tgtagcaccgcctacatacctcgctctgctaatcctgttaccagtggctgctgccagtgg cgataagtcgtgtcttaccgggttggactcaagacgatagttaccggataaggcgcagcg gtcgggctgaacggggggttcgtgcacacagcccagcttggagcgaacgacctacaccga
```

-continued

```
actgagatacctacagcgtgagctatgagaaagcgccacgcttcccgaagggagaaaggc ggacaggtatccggtaagcggcagggtcggaacaggagagcgcacgagggagcttccagg gggaaacgcctggtatctttatagtcctgtcgggtttcgccacctctgacttgagcgtcg attttgtgatgctcgtcagggggcggagcctatggaaaaacgccagcaacgcggcctt tttacggttcctggccttttgctggccttttgctcacatgttctttcctgcgttatcccc tgattctgtggataaccgtattaccgcctttgagtgagctgataccgctcgccgcagccg aacgaccgagcgcagcgagtcagtgagcgaggaagcggaagagcgcccaatacgcaaacc gcctctccccgcgcgttggccgattcattaatgcagcagctgcgcgctcgctcgctcact gaggccgcccgggcaaagcccgggcgtcgggcgacctttggtcgcccggcctcagtgagc gagcgagcgcgcagagagggagtggccaactccatcactaggggttccttgtagttaatg attaacccgccatgctacttatctacgtagccatgctctaggacattgattattgactag tggagttccgcgttacataacttacggtaaatggcccgcctggctgaccgcccaacgacc cccgcccattgacgtcaataatgacgtatgttcccatagtaacgccaatagggactttcc attgacgtcaatgggtggagtatttacggtaaactgcccacttggcagtacatcaagtgt atcatatgccaagtacgccccctattgacgtcaatgacggtaaatggcccgcctggcatt atgcccagtacatgaccttatgggactttcctacttggcagtacatctacgtattagtca tcgctattaccatggtcgaggtgagccccacgttctgcttcactctccccatctccccc cctccccaccccaattttgtatttatttattttttaattatttttgtgcagcgatggggg ggggggggggggggcgcgcgccaggcggggcggggcgggggcgaggggggggcggggcga ggcggagaggtgcggcggcagccaatcagagcggcgcgctccgaaagtttccttttatgg cgaggcggcggcggcggccctataaaaagcgaagcgcgcggggggggagtcgctgcg cgctgccttcgccccgtgccccgctccgccgccgcctcgcgccgccgccccggctctga ctgaccgcgttactaaaacaggtaagtccggcctccgcgccgggttttggcgcctcccgc gggcgccccctcctcacggcgagcgctgccacgtcagacgaagggcgcagcgagcgtcc tgatccttccgcccggacgctcaggacagcggcccgctgctcataagactcggccttaga accccagtatcagcagaaggacattttaggacgggacttgggtgactctagggcactggt tttctttccagagagcggaacaggcgaggaaaagtagtcccttctcggcgattctgcgga gggatctccgtggggcggtgaacgccgatgatgcctctactaaccatgttcatgttttct ttttttttctacaggtcctgggtgacgaacagggtaccgccaccatggccaccggctctc gcacaagcctgctgctggctttcggactgctgtgcctgccttggctccaggagggctccg ccgctagcatcgataccgtcgctatgtgctggaggcttgctgaaggctgtatgctgtcgt actgacttgtaggtatgccgttttggcctctgactgacggcatacctaagtcagtacgtc aggacacaaggcctgttactagcactcacatggaacaaatggcctctagcctggaggctt gctgaaggctgtatgctgactcctaatcaatagcttccaccgttttggcctctgactgac ggtggaagcttgattaggagtcaggacacaaggcctgttactagcactcacatggaacaa atggcctctagcctggaggcttgctgaaggctgtatgctgaatatgcctttaagctttgc tgcgttttggcctctgactgacgcagcaaagcaaaggcatattcaggacacaaggcctgt tactagcactcacatggaacaaatggcctctctagaat 3'
```

As will be appreciated by those skilled in the art, because the recombinant plasmid is a circular vector, the one or more sequences of the miRNA expression cassettes may be connected at the 3' end of SEQ ID NO. 1, as shown in SEQ ID NO. 10-17 or at the 5' end of SEQ ID NO. 1.

As will be appreciated by those skilled in the art, a perfect match of nucleotides with each of the miRNA expression cassette sequences is not necessary in order to have the desired result of decreased bioavailability of the target biomolecule as a result of the target cell producing the miRNA sequence that will bind to and degrade the mRNA of the target biomolecule. In some embodiments of the present disclosure, about 80% to about 100% nucleotide sequence matching with each of the miRNA expression cassettes causes the desired result. In some embodiments of the present disclosure, about 85% to about 100% nucleotide sequence matching with each of the miRNA expression cassettes causes the desired result. In some embodiments of the present disclosure, about 90% to about 100% nucleotide sequence matching with each of the miRNA expression cassettes causes the desired result. In some embodiments of the present disclosure, about 95% to about 100% nucleotide sequence matching with each of the miRNA expression cassettes causes the desired result.

Example 1—Expression Cassette

Expression cassettes for expressing miRNA were synthesized. The synthesized miRNA expression cassettes were cloned into the pAVA-00200 plasmid backbone containing the CASI promoter, multiple cloning site (MCS), Woodchuck Hepatitis Virus post-transcriptional regulatory element (WPRE), and Simian virus 40 (SV40) polyadenylation (polyA) sequence, all flanked by the AAV2 inverted terminal repeats (ITR). pAVA-00200 was cut with the restriction enzymes KpnI and XbaI in the MCS and separated on a 1% agarose gel. The band of interest was excised and purified using a gel extraction kit. Each miRNA expression cassette was amplified by polymerase chain reaction (PCR) using Taq polymerase and the PCR products were gel purified and the bands on interest were also excised and purified using a gel extraction kit. These PCR products contained the miRNA expression cassettes in addition to 15 base pair 5' and 3' overhangs that aligned with the ends of the linearized pAVA-00200 backbone. Using in-fusion cloning, the amplified miRNA expression cassettes are integrated with the pAVA-00200 backbone via homologous recombination. The resulting RP contained the following: 5' ITR, CASI promoter, miRNA expression cassette, WPRE, SV40 polyA and ITR 3'.

The invention claimed is:

1. A composition that comprises a recombinant plasmid (RP) comprising a sequence of nucleotides that is SEQ ID NO: 4.

2. The composition of claim 1, wherein the RP is encapsulated in a protein coat, a lipid vesicle, or any combination thereof.

3. A composition that comprises a recombinant plasmid (RP) comprising a sequence of nucleotides that is SEQ ID NO: 12.

4. The composition of claim 3, wherein the RP is encapsulated in a protein coat, a lipid vesicle, or any combination thereof.

* * * * *

SEQUENCE LISTING

```
Sequence total quantity: 17
SEQ ID NO: 1             moltype = DNA  length = 5883
FEATURE                  Location/Qualifiers
source                   1..5883
                         mol_type = other DNA
                         organism = synthetic construct
SEQUENCE: 1
aatcaacctc tggattacaa aatttgtgaa agattgactg gtattcttaa ctatgttgct   60
ccttttacgc tatgtggata cgctgcttta atgcctttgt atcatgctat tgcttcccgt  120
atggctttca ttttctcctc cttgtataaa tcctggttgc tgtctcttta tgaggagttg  180
tggcccgttg tcaggcaacg tggcgtggtg tgcactgtgt ttgctgacgc aaccccccact 240
ggttggggca ttgccaccac ctgtcagctc ctttccggga ctttcgcttt cccccctcct  300
attgccacgg cggaactcat cgccgcctgc cttgcccgct gctggacagg ggctcggctg  360
ttgggcactg acaattccgt ggtgttgtcg gggaaatcat cgtcctttcc ttggctgctc  420
gcctgtgttg ccacctggat tctgcgcggg acgtccttct gctacgtccc ttcggccctc  480
aatccagcgg accttccttc ccgcggcctg ctgccggctc tgcggcctct tccgcgtctt  540
cgccttcgcc ctcagacgag tcggatctcc ctttgggccg cctccccgcc taagcttacc  600
gataccgtcg agatctaact tgtttattgc agcttataat ggttacaaat aaagcaatag  660
catcacaaat ttcacaaata aagcattttt ttcactgcat tctagttgtg gtttgtccaa  720
actcatcaat gtatcttatc atgtctggat ctcgacctcg actagagcat ggctacgtag  780
ataagtagca tggcgggtta atcattaact acaaggaacc cctagtgatg gagttggcca  840
ctccctctct gcgcgctcgc tcgctcactg aggccgggcg accaaaggtc gcccgacgcc  900
cgggctttgc ccgggcggcc tcagtgagcg agcgagcgcg cagctggcgt aatagcgaag  960
aggcccgcac cgatcgccct tcccaacagt tgcgcagcct gaatggcgaa tggcgattcc 1020
gttgcaatgg ctggcggtaa tattgttctg gatattacca gcaaggccga tagtttgagt 1080
tcttctactc aggcaagtga tgttattact aatcaaagaa gtattgcgac aacggttaat 1140
ttgcgtgatg gacagactct tttactcggt ggcctcactg attataaaaa cacttctcag 1200
gattctggcg taccgttcct gtctaaaatc cctttaatcg gcctcctgtt tagctcccgc 1260
tctgattcta acgaggaaag cacgttatac gtgctcgtca aagcaaccat agtacgcgcc 1320
ctgtagcggc gcattaagcg cggcgggtgt ggtggttacg cgcagcgtga ccgctacact 1380
tgccagcgcc ctagcgcccg ctcctttcgc tttcttccct tcctttctcg ccacgttcgc 1440
cggctttccc cgtcaagctc taaatcgggg ctcccttta gggttccgat ttagtgcttt 1500
acggcacctc gaccccaaaa aacttgatta gggtgatggt tcacgtagtg ggccatcgcc 1560
ctgatagacg gtttttcgcc ctttgacgtt ggagtccacg ttctttaata gtggactctt 1620
gttccaaact ggaacaacac tcaaccctat ctcggtctat tctttttgatt tataagggat 1680
tttgccgatt tcggcctatt ggttaaaaaa tgagctgatt taacaaaaat ttaacgcgaa 1740
ttttaacaaa atattaacgt ttacaattta aatatttgct tatacaatct tcctgttttt 1800
ggggcttttc tgattatcaa ccggggtaca tatgattgac atgctagttt tacgattacc 1860
gttcatcgat tctcttgttt gctccagact ctcaggcaat gacctgatag cctttgtaga 1920
gacctctcaa aaatagctac cctctccggc atgaatttat cagctagaac ggttgaatat 1980
catattgatg gtgatttgac tgtctccggc ctttctcacc cgtttgaatc tttacctaca 2040
cattcctcag gcattgcatt taaaatatat gagggttcta aaaattttta tccttgcgtt 2100
gaaataaagg cttctcccgc aaaagtatta cagggtcata atgtttttgg tacaaccgat 2160
ttagctttat gctctgaggc tttattgctt aattttgcta attctttgcc ttgcctgtat 2220
gatttattgg atgttggaat tcctgatgcg gtattttctc cttacgcatc tgtgcggtat 2280
ttcacaccgc atatggtgca ctctcagtac aatctgtct gatgccgcat agttaagcca 2340
gccccgacac ccgccaacac ccgctgacgc gccctgacgg gcttgtctgc tcccggcatc 2400
```

```
cgcttacaga caagctgtga ccgtctccgg gagctgcatg tgtcagaggt tttcaccgtc  2460
atcaccgaaa cgcgcgagac gaaagggcct cgtgatacgc ctattttat aggttaatgt  2520
catgataata atggtttctt agacgtcagg tggcacttt cggggaaatg tgcgcggaac  2580
ccctatttgt ttatttttct aaatacattc aaatatgtat ccgctcatga dacaataacc  2640
ctgataaatg cttcaataat attgaaaaag gaagagtatg agtattcaac atttccgtgt  2700
cgcccttatt cccttttttg cggcattttg ccttcctgtt tttgctcacc cagaaacgct  2760
ggtgaaagta aaagatgctg aagatcagtt gggtgcacga gtgggttaca tcgaactgga  2820
tctcaacagc ggtaagatcc ttgagagttt tcgccccgaa gaacgttttc caatgatgag  2880
cactttttaaa gttctgctat gtggcgcggt attatcccgt attgacgccg ggcaagagca  2940
actcggtcgc cgcatacact attctcagaa tgacttggtt gagtactcac cagtcacaga  3000
aaagcatctt acgggatggca tgacagtaag agaattatgc agtgctgcca taaccatgag  3060
tgataacact gcggccaact tacttctgac aacgatcgga ggaccgaagg agctaaccgc  3120
ttttttgcac aacatggggg atcatgtaac tcgccttgat cgttgggaac cggagctgaa  3180
tgaagccata ccaaacgacg agcgtgacac cacgatgcct gtagcaatgg caacaacgtt  3240
gcgcaaacta ttaactggcg aactacttac tctagcttcc cggcaacaat taatagactg  3300
gatggaggcg gataaagttg caggaccact tctgcgctcg gcccttccgg ctggctggtt  3360
tattgctgat aaatctggag ccggtgagcg tgggtctcgc ggtatcattg cagcactggg  3420
gccagatggt aagccctccc gtatcgtagt tatctacacg acggggagtc aggcaactat  3480
ggatgaacga aatagacaga tcgctgagat aggtgcctca ctgattaagc attggtaact  3540
gtcagaccaa gtttactcat atatacttta gattgattta aaacttcatt tttaatttaa  3600
aaggatctag gtgaagatcc tttttgataa tctcatgacc aaaatccctt aacgtgagtt  3660
ttcgttccac tgagcgtcag accccgtaga aaagatcaaa ggatcttctt gagatccttt  3720
tttctgcgc gtaatctgct gcttgcaaac aaaaaaacca ccgctaccag cggtggtttg  3780
tttgccggat caagagctac caactctttt tccgaaggta actggcttca gcagagcgca  3840
gataccaaat actgtcctc tagtgtagcc gtagttaggc caccacttca agaactctgt  3900
agcaccgcct acatacctcg ctctgctaat cctgttaaca gtggctgctg ccagtggcga  3960
taagtcgtgt cttaccgggt tggactcaag acgatagtta ccggataagg cgcagcggtc  4020
gggctgaacg gggggttcgt gcacacagcc cagcttggag cgaacgacct acaccgaact  4080
gagataccta cagcgtgagc tatgagaaag cgccacgctt cccgaaggga gaaaggcgga  4140
caggtatccg gtaagcggca gggtcggaac aggagagcgc acgaggggag ttccaggggg  4200
aaacgcctgg tatctttata gtcctgtcgg gtttcgccac ctctgacttg agcgtcgatt  4260
tttgtgatgc tcgtcagggg gcggagcct atggaaaaac gccagcaacg cggccttttt  4320
acggttcctg gccttttgct ggccttttgc tcacatgttc tttcctgcgt tatccctga  4380
ttctgtggat aaccgtatta ccgcctttga gtgagctgat accgctcgcc gcagccgaac  4440
gaccgagcgc agcgagtcag tgagcgagga agcggaagag cgcccaatac gcaaaccgcc  4500
tctcccccgcg cgttggccga ttcattaatg cagcagctgc gcgctcgctc gctcactgag  4560
gccgccgggg caaagcccgg gcgtcgggcg acctttggtc gcccgggctc agtgagcgag  4620
cgagcgcgca gagaggagt ggccaactcc atcactaggg gttccttgta gttaatgatt  4680
aacccgccat gctacttatc tacgtagcca tgtctctagga cattgattat tgactagtga  4740
agttccgcgt tacataactt acggtaaatg gcccgcctgg ctgaccgccc aacgaccccg  4800
gcccattgac gtcaataatg acgtatgttc ccatagtaac gccaatagggacttcccatt  4860
gacgtcaatg ggtggagtat ttacggtaaa ctgcccactt ggcagtacat caagtgtatc  4920
atatgccaag tacgccccct attgacgtca atgacggtaa atggcccgcc tggcattatg  4980
cccagtacat gaccttatgg gactttccta cttggcagta catctacgta ttagtcatcg  5040
ctattaccat ggtcgaggtg agccccacgt tctgcttcac tctcccccatc tccccccct  5100
ccccacccccc aattttgtat ttatttattt tttaattatt ttgtgcagcg atggggcgg  5160
ggggggggggg gggcgcgc caggcgggcc ggggcggggc gaggggcggg gcggggcgag  5220
gcggagaggt gcggcggcag ccaatcagag cggcgcgctc cgaaagtttc ctttatggcg  5280
gaggcggcg cggcggcggc cctataaaaa gcgaagcgcg cggcgggcgg gagtcgctgc  5340
gcgctgcctt cgccccgtgc cccgctccgc cgccgcctcg cgccgcccgc ccggctctg  5400
actgaccgcg ttactaaaac aggtaagtcc ggcctccggtgggggtttg gcgcctccgg  5460
cgggcgccccc cctcctcacg gcgagcgctg ccacgtcaga cgaagggcgc agcgagcgtc  5520
ctgatccttc cgcccggacg ctcaggacag cggcccgctg ctcataagac tcggccttag  5580
aaccccagta tcagcagaag gacatttag gacgggactt gggtgactct agggcactgg  5640
ttttctttcc agagagtcgga acaggcgagg aaaagtagtc ccttctcggc gattctgcgg  5700
agggatctcc gtggggcggt gaacgccgat gatgcctcta ctaaccatgt tcatgtttc  5760
ttttttttc tacaggtcct gggtgacgaa cagggtaccg ccaccatggc caccggctct  5820
cgcacaagcc tgctgctggc tttcggactg ctgtgcctgc cttggctcca ggagggctcc  5880
gcc                                                                5883
```

SEQ ID NO: 2           moltype = DNA   length = 456
FEATURE                Location/Qualifiers
source                 1..456
                       mol_type = other DNA
                       organism = synthetic construct

SEQUENCE: 2

```
gctagcatcg ataccgtcgc tatgtgctgg aggcttgctg aaggctgtat gctgtaaggt   60
ggttatggga gaatgccgtt ttggcctctg actgacggca ttctcctaac caccttacag  120
gacacaaggc ctgttactag cactcacatg gaacaaatga cctctagcct ggaggcttgc  180
tgaaggctgt atgctgttga gtttcgcatt cttgttgccg ttttggcctc tgactgacgg  240
caacaagagc gaaactcaac aggacacaag gcctgttact agcactcaca tggaacaaat  300
ggcctctagc ctggaggctt gctgaaggct gtatgctgtc tatcctttca agctagtcac  360
cgttttggcc tctgactgac ggtgactagc gaaaggatag acaggacaca aggcctgtta  420
ctagcactca catggaacaa atggcctctc tagaat                            456
```

SEQ ID NO: 3           moltype = DNA   length = 456
FEATURE                Location/Qualifiers
source                 1..456
                       mol_type = other DNA

```
                        organism = synthetic construct
SEQUENCE: 3
gctagcatcg ataccgtcgc tatgtgctgg aggcttgctg aaggctgtat gctgaagtta      60
gcatgtgtcc cagaaccgtt ttggcctctg actgacggtt ctgggacatg ctaacttcag     120
gacacaaggc ctgttactag cactcacatg aacaaatggc cctctagcct ggaggcttgc     180
tgaaggctgt atgctgagaa gaaaggtatc ccaattgccg ttttggcctc tgactgacgg     240
caattgggac ctttcttctc aggacacaag gcctgttact agcactcaca tggaacaaat     300
ggcctctagc ctggaggctt gctgaaggct gtatgctgta gtgtttccaa atactgcttg     360
cgttttggcc tctgactgac gcaagcagta tggaaacact acaggacaca aggcctgtta     420
ctagcactca catggaacaa atggcctctc tagaat                               456

SEQ ID NO: 4             moltype = DNA  length = 456
FEATURE                  Location/Qualifiers
source                   1..456
                         mol_type = other DNA
                         organism = synthetic construct
SEQUENCE: 4
gctagcatcg ataccgtcgc tatgtgctgg aggcttgctg aaggctgtat gctgtctgac      60
agtgatgtca tcctttcgtt ttggcctctg actgacgaaa ggatgatcac tgtcagacag     120
gacacaaggc ctgttactag cactcacatg aacaaatggc cctctagcct ggaggcttgc     180
tgaaggctgt atgctgattt aggtcagatg gaaactcgcg ttttggcctc tgactgacgc     240
gagtttccct gacctaaatc aggacacaag gcctgttact agcactcaca tggaacaaat     300
ggcctctagc ctggaggctt gctgaaggct gtatgctgag tgtatgctta acgtggactt     360
cgttttggcc tctgactgac gaagtccacg aagcatacac tcaggacaca aggcctgtta     420
ctagcactca catggaacaa atggcctctc tagaat                               456

SEQ ID NO: 5             moltype = DNA  length = 456
FEATURE                  Location/Qualifiers
source                   1..456
                         mol_type = other DNA
                         organism = synthetic construct
SEQUENCE: 5
gctagcatcg ataccgtcgc tatgtgctgg aggcttgctg aaggctgtat gctgatactt      60
cagcctgaat cgtgaccgtt ttggcctctg actgacggtc acgattggct gaagtatcag     120
gacacaaggc ctgttactag cactcacatg aacaaatggc cctctagcct ggaggcttgc     180
tgaaggctgt atgctgactt cactcatatt gttccactcg ttttggcctc tgactgacga     240
gtggaacaat gagtgaagtc aggacacaag gcctgttact agcactcaca tggaacaaat     300
ggcctctagc ctggaggctt gctgaaggct gtatgctgta tattctacaa atcaccaggg     360
cgttttggcc tctgactgac gccctggtga tgtagaatat acaggacaca aggcctgtta     420
ctagcactca catggaacaa atggcctctc tagaat                               456

SEQ ID NO: 6             moltype = DNA  length = 456
FEATURE                  Location/Qualifiers
source                   1..456
                         mol_type = other DNA
                         organism = synthetic construct
SEQUENCE: 6
gctagcatcg ataccgtcgc tatgtgctgg aggcttgctg aaggctgtat gctgtataag      60
tccagtgaga agaaggcgtt ttggcctctg actgacgcct tcttctctgg acttatacag     120
gacacaaggc ctgttactag cactcacatg aacaaatggc cctctagcct ggaggcttgc     180
tgaaggctgt atgctgctat catcaaatga gctgctgcgt tttggcctct gactgacgca     240
gcagctcttg atgatagtca ggacacaagg cctgttacta gcactcacat ggaacaaatg     300
gcctctagcc tggaggcttg ctgaaggctg tatgctgaag actgctggaa attctatggc     360
tgttttggcc tctgactgac gaccatagaa tccagcagtc tcaggacaca aggcctgtta     420
ctagcactca catggaacaa atggcctctc tagaat                               456

SEQ ID NO: 7             moltype = DNA  length = 457
FEATURE                  Location/Qualifiers
source                   1..457
                         mol_type = other DNA
                         organism = synthetic construct
SEQUENCE: 7
gctagcatcg ataccgtcgc tatgtgctgg aggcttgctg aaggctgtat gctgattagc      60
actggtgatt tccggcgacc ttggcctctg actgacgcc ggaaatccag tgctaatcag     120
gacacaaggc ctgttactag cactcacatg aacaaatggc cctctagcct ggaggcttgc     180
tgaaggctgt atgctgattg agtttcgcat tcttgttgcc gttttggcct ctgactgacg     240
gcaacaagag cgaaactcaa caggacacaa ggcctgttac tagcactcac atggaacaaa     300
tggcctctag cctggaggct tgctgaaggc tgtatgctga ttgatcaggc aaacatagtc     360
ccgttttggc ctctgactga cggggactat gtgcctgatca atcaggacac aaggcctgtt     420
actagcactc acatggaaca aatggcctct ctagaat                              457

SEQ ID NO: 8             moltype = DNA  length = 456
FEATURE                  Location/Qualifiers
source                   1..456
                         mol_type = other DNA
                         organism = synthetic construct
SEQUENCE: 8
gctagcatcg ataccgtcgc tatgtgctgg aggcttgctg aaggctgtat gctgtctgat      60
cgtggtgtta tttgggcgtt ttggcctctg actgacgccc aaataaccac gatcagacag     120
```

```
gacacaaggc ctgttactag cactcacatg gaacaaatgg cctctagcct ggaggcttgc    180
tgaaggctgt atgctgttga gtttcgcatt cttgttgccg ttttggcctc tgactgacgg    240
caacaagagc gaaactcaac aggacacaag gcctgttact agcactcaca tggaacaaat    300
ggcctctagc ctggaggctt gctgaaggct gtatgctgta tcctcttata actcagcctc    360
cgttttggcc tctgactgac ggaggctgag ataagaggac acaggacaca aggcctgtta    420
ctagcactca catggaacaa atggcctctc tagaat                              456

SEQ ID NO: 9            moltype = DNA   length = 456
FEATURE                 Location/Qualifiers
source                  1..456
                        mol_type = other DNA
                        organism = synthetic construct
SEQUENCE: 9
gctagcatcg ataccgtcgc tatgtgctgg aggcttgctg aaggctgtat gctgtcgtac    60
tgacttgtag gtatgccgtt ttggcctctg actgacggca tacctaagtc agtacgtcag   120
gacacaaggc ctgttactag cactcacatg gaacaaatgg cctctagcct ggaggcttgc   180
tgaaggctgt atgctgactc ctaatcaata gcttccaccg ttttggcctc tgactgacgg   240
tggaagcttg attaggagtc aggacacaag gcctgttact agcactcaca tggaacaaat   300
ggcctctagc ctggaggctt gctgaaggct gtatgctgaa tatgccttta agctttgctg   360
cgttttggcc tctgactgac gcagcaaagc aaaggcatat tcaggacaca aggcctgtta   420
ctagcactca catggaacaa atggcctctc tagaat                             456

SEQ ID NO: 10           moltype = DNA   length = 6339
FEATURE                 Location/Qualifiers
source                  1..6339
                        mol_type = other DNA
                        organism = synthetic construct
SEQUENCE: 10
aatcaacctc tggattacaa aatttgtgaa agattgactg gtattcttaa ctatgttgct    60
ccttttacgc tatgtggata cgctgcttta atgcctttgt atcatgctat tgcttcccgt   120
atggctttca ttttctcctc cttgtataaa tcctggttgc tgtctcttta tgaggagttg   180
tggcccgttg tcaggcaacg tggcgtggtg tgcactgtgt ttgctgacgc aaccccccact  240
ggttgggGca ttgccaccac ctgtcagctc ctttccggga cttttcgctt cccccctccct  300
attgccacgg cgaactcat cgccgcctgc cttgcccgct gctggacagg ggctcggctg    360
ttgggcactg acaattccgt ggtgttgtcg gggaaatcat cgtccttttcc ttggctgctc  420
gcctgtgttg ccacctggat tctgcgcggg acgtccttct gctacgtccc ttcggccctc   480
aatccagcgg accttccttc ccgcggcctg ctgccggctc tgcggcctct tccgcgtctt   540
cgccttcgc ctcagacgag tcggatctcc ctttgggccg cctccccgcc taagcttatc    600
gataccgtcg agatctaact tgtttattgc agcttataat ggttacaaat aaagcaatag   660
catcacaaat ttcacaaata aagcatttt ttcactgcat tctagttgtg gtttgtccaa    720
actcatcaat gtatcttatc atgtctggat ctcgacctcg actagagcat ggctacgtag   780
ataagtagca tggcgggtta atcattaact acaaggaacc cctagtgatg gagttggcca   840
ctccctctct gcgcgctcgc tcgctcactg aggccgggcg accaaaggtc gcccgacgcc   900
cgggctttgc ccgggcggcc tcagtgagcg agcgagcgcg cagctggcgt aatagcgaag   960
aggcccgcac cgatcgccct tcccaacagt tgcgcagcct gaatggcgaa tggcgattcc  1020
gttgcaatgg ctggcggtaa tattgttctg gatattacca gcaaggccga tagtttgagt  1080
tcttctactc aggcaagtga tgtttattact aatcaaagaa cttccacgaa acggttaat   1140
ttgcgtgatg gacagactct tttactcggt ggcctcactg attataaaaa cacttctcag  1200
gattctggcg taccgttcct gtctaaaatc ccttttaatcg gcctcctgtt tagctcccgc  1260
tctgattcta acgaggaaag cacgttatac gtgctcgtca aagcaaccat agtacgcgcc  1320
ctgtagcggc gcattaagcg cggcgggtgt ggtggttacg ccgcagcgtga ccgctacct   1380
tgccagcgcc ctagcgcccg ctcctttcgc tttcttccct tcctttctcg ccacgttcgc  1440
cggctttccc cgtcaagctc taaatcgggg gctcccttta gggttccgat ttagtgcttt  1500
acggcacctc gaccccaaaa aacttgatta gggtgatggt tcacgtagtg gccatcgcc   1560
ctgatagacg gttttcgcc ctttgacgtt ggagtccacg ttctttaata gtggactctt  1620
gttccaaact ggaacaacac tcaaccctat ctcggtctat tcttttgatt tataagggat  1680
tttgccgatt tcggcctatt ggttaaaaaa tgagctgatt taacaaaaat ttaacgcgaa  1740
ttttaacaaa atattaacgt ttacaattta aatatttgct tatacaatct tcctgttttt  1800
ggggcttttc tgattatcaa ccggggtaca tatgattgac atgctagttt tacgattacg  1860
ttcatcgat tctcttgttt gctccagact ctcaggcaat gacctgatag cctttgtaga  1920
gacctctcaa aaatagctac cctctccggc atgaatttat cagctagaac ggttgaatat  1980
catattgatg gtgatttgac tgtctccggc ctttctcacc cgtttgaatc tttacctaca  2040
cattactcag gcattgcatt taaaatatat gagggttcta aaaattttta tccttgcgtt  2100
gaaataaagg cttctcccgc aaaagtatta cagggtcata atgtttttgg tacaaccgat  2160
ttagctttat gctctgaggc tttattgctt aattttgcta attctttgcc ttgcctgtat  2220
gatttattgg atgttggaat tcctgatgcg gtattttctc cttacgcatc tgtgcggtat  2280
ttcacaccgc atatggtgca ctctcagtac aatctgctct gatgccgcat agttaagcca  2340
gccccgacac ccgccaacac ccgctgacgc gccctgacgg gcttgtctgc tcccggcatc  2400
cgcttacaga caagctgtga ccgtctccgg gagctgcatg tgtcagaggt tttcaccgtc  2460
atcaccgaaa cgcgcgagac gaaagggcct cgtgatacgc ctatttttat aggttaatgt  2520
catgataata atggtttctt agacgtcagg tggcactttt cggggaaatg tgcgcggaac  2580
ccctatttgt ttatttttct aaatacattc aaatatgtat ccgctcatga acaataaccc  2640
tgataaatg cttcaataat attgaaaaag gaagagtatg agtattcaac atttccgtgt   2700
cgcccttatt ccctttttttg cggcattttg ccttcctgtt tttgctcacc cagaaacgct  2760
ggtgaaagta aaagatgctg aagatcagtt gggtgcacga gtgggttaca tcgaactgga  2820
tctcaacagc ggtaagatcc ttgagagttt tcgccccgaa gaacgttttc caatgatgag  2880
cactttaaaa gttctgctat gtggcgcggt attatcccgt attgacgccg ggcaagcagca 2940
actcggtcgc cgcatacact attctcagaa tgacttggtt gagtactcac cagtcacaga  3000
aaagcatctt acggatggca tgacagtaag agaattatgc agtgctgcca taaccatgag  3060
```

```
tgataacact gcggccaact tacttctgac aacgatcgga ggaccgaagg agctaaccgc  3120
tttttgcac aacatggggg atcatgtaac tcgccttgat cgttgggaac cggagctgaa  3180
tgaagccata ccaaacgacg agcgtgacac cacgatgcct gtagcaatgg caacaacgtt  3240
gcgcaaacta ttaactggcg aactacttac tctagcttcc cggcaacaat taatagactg  3300
gatggaggcg gataaagttg caggaccact tctgcgctcg gcccttccgg ctggctggtt  3360
tattgctgat aaatctggag ccggtgagcg tgggtctcgc ggtatcattg cagcactggg  3420
gccagatggt aagccctccc gtatcgtagt tatctacacg acggggagtc aggcaactat  3480
ggatgaacga aatagacaga tcgctgagat aggtgcctca ctgattaagc attggtaact  3540
gtcagaccaa gtttactcat atatactttta gattgattta aaacttcatt tttaatttaa  3600
aaggatctag gtgaagatcc ttttttgataa tctcatgacc aaaatccctt aacgtgagtt  3660
ttcgttccac tgagcgtcag acccccgtaga aaagatcaaa ggatcttctt gagatccttt  3720
ttttctgcgc gtaatctgct gcttgcaaac aaaaaaacca ccgctaccag cggtggtttg  3780
tttgccggat caagagctac caactcttt tccgaaggta actggcttca gcagagcgca  3840
gataccaaat actgtccttc tagtgtagcc gtagttaggc caccacttca agaactctgt  3900
agcaccgcct acatacctcg ctctgctaat cctgttacca gtggctgctg ccagtggcga  3960
taagtcgtgt cttaccgggt tggactcaag acgatagtta ccggataagg cgcagcggtc  4020
gggctgaacg ggggggttcgt gcacacagcc cagcttggag cgaacgacct acaccgaact  4080
gagataccta cagcgtgagc tatgagaaag cgccacgctt ccgaaggga gaaaggcgga  4140
caggtatccg gtaagcggca gggtcggaac aggagagcgc acgagggagc ttccaggggg  4200
aaacgcctgg tatctttata gtcctgtcgg gtttcgccac ctctgacttg agcgtcgatt  4260
tttgtgatgc tcgtcagggg ggcggagcct atggaaaaac gccagcaacg cggcctttttt  4320
acggttcctg gccttttgct ggccttttgc tcacatgttc tttcctgcgt tatcccctga  4380
ttctgtggat aaccgtatta ccgcctttga gtgagctgat accgctcgcc gcagccgaac  4440
gaccgagcgc agcgagtcag tgagcgagga agcggaagag cgcccaatac gcaaaccgcc  4500
tctccccgcg cgttggccga ttcattaatg cagcagctgc gcgctcgctc gctcactgag  4560
gccgcccggg caaagcccgg gcgtcgggcg acctttgtc gcccggcctc agtgagcgag  4620
cgagcgcgca gagagggagt ggccaactcc atcactaggg gttccttgta gttaatgatt  4680
aacccgccat gctacttatc tacgtagcca tgctctagga cattgattat tgactagtgg  4740
agttccgcgt tacataactt acggtaaatg gcccgcctgg ctgaccgccc aacgaccccg  4800
gcccattgac gtcaataatg acgtatgttc ccatagtaac gccaataggg actttccatt  4860
gacgtcaatg ggtggagtat ttacggtaaa ctgcccactt ggcagtacat caagtgtatc  4920
atatgccaag tacgccccct attgacgtca atgacggtaa atggcccgcc tggcattatg  4980
cccagtacat gaccttatgg gactttccta cttggcagta catctacgta ttagtcatcg  5040
ctattaccat ggtcgaggtg agccccacgt tctgcttcac tctccccatc tcccccccc  5100
ccccacccc aatttgtat ttatttattt tttaattatt ttgtgcagcg atgggggcgg  5160
ggggggggg gggcgcgcgc caggcgggc gggggggggc gagggcggg gcggggcgag  5220
gcggagaggt gcggcggcag ccaatcagag cggcgcgctc cgaaagtttc cttttatggc  5280
gaggcggcgg cggcggcggc cctataaaaa gcgaagcgcg cggcgggcgg gagtcgctgc  5340
gcgctgcctt cgccccgtgc cccgctccgc cgccgcctcg cgccgcccga cccggctctg  5400
actgaccgcg ttactaaaac aggtaagtcc ggcctccgcg ccgggttttg gcgcctcccg  5460
cgggcgcccc cctcctcacg cgcagcgctg ccacgtcaga cgaagggcgc agcgagcgtc  5520
ctgatccttc cgcccggacg ctcaggacag cggcccgctg ctcataagac tcggccttag  5580
aacccagta tcagcagaag gacattttag gacgggactt gggtgactct aggggcactgg  5640
ttttctttcc agagagcgga acaggcgagg aaaagtagtc ccttctcggc gattctgcgg  5700
agggatctcc gtggggcggt gaacgccgat gatgcctcta ctaaccatgt tcatgttttc  5760
ttttttttc tacaggtcct gggtgacgaa cagggtaccg ccaccatggc caccggctct  5820
cgcacaagcc tgctgctggc tttcgactg ctgtgcctgc cttggctcca ggaggggctcc  5880
gccgctagca tcgataccgt cgctatgtgc tggaggcttg ctgaaggctg tatgctgtaa  5940
ggtggttatg ggagaatgcc gttttggcct ctgactgacg gcattctcct aaccaccttc  6000
caggacacaa ggcctgttac tagcactcac atggaacaaa tggcctctag cctgaaggct  6060
tgctgaaggc tgtatgctgt tgagtttcgc attcttgtta ccgttttgc ctctgactga  6120
cggcaacaag agcgaaactc aacaggacac aaggcctgtt actagcactc acatggaaca  6180
aatggcctct agcctggagg cttgctgaag gctgtatgct gtctatcctt tcaagctagt  6240
caccgttttg gcctctgact gacggtgact agcgaaagga tagacaggac acaaggcctg  6300
ttactagcac tcacatggaa caaatggcct ctctagaat                         6339
SEQ ID NO: 11          moltype = DNA   length = 6339
FEATURE                Location/Qualifiers
source                 1..6339
                       mol_type = other DNA
                       organism = synthetic construct
SEQUENCE: 11
aatcaacctc tggattacaa aatttgtgaa agattgactg gtattcttaa ctatgttgct  60
ccttttacgc tatgtggata cgctgcttta atgcctttgt atcatgctat tgcttcccgt  120
atggctttca ttttctcctc cttgtataaa tcctggttgc tgtctcttta tgaggagttg  180
tggcccgttg tcaggcaacg tggcgtggtg tgcactgtgt ttgctgacgc aacccccact  240
ggttgggca ttgccaccac ctgtcagctc ctttccggga ctttcgcttt ccccctccct  300
attgccacgg cggaactcat cgccgcctgc cttgcccgct gctggacagg ggctcggctg  360
ttgggcactg acaattccgt ggtgttgtcg gggaaatcat cgtcctttcc ttggctgctc  420
gcctgtgttg ccacctggat tctgcgcggg acgtccttct gctacgtccc ttcggccctc  480
aatccagcgg accttccttc ccgcggcctg ctgccggctc tgcggcctct tccgcgtctt  540
cgccttcgcc ctcagacgag tcggatctcc ctttgggccg cctccccgcc taagcttatc  600
gataccgtcg agatctaact tgtttattgc agcttataat ggttacaaat aaagcaatag  660
catcacaaat ttcacaaata aagcatttt ttcactgcat tctagttgtg gtttgtccaa  720
actcatcaat gtatcttatc atgtctggat ctcgacctcg actagagcat ggctacgtag  780
ataagtagca tggcgggtta atcattaact acaaggaacc cctagtgatg gagttggcca  840
ctccctctct gcgcgctcgc tcgctcactg aggccgggcg accaaaggtc gcccgacgcc  900
cgggctttgc ccgggcggcc tcagtgagcg agcgagcgcg cagctggcgt aatagcgaag  960
aggcccgcac cgatcgccct tcccaacagt tgcgcagcct gaatggcgaa tggcgattcc  1020
```

```
gttgcaatgg ctggcggtaa tattgttctg gatattacca gcaaggccga tagtttgagt   1080
tcttctactc aggcaagtga tgttattact aatcaaagaa gtattgcgac aacggttaat   1140
ttgcgtgatg gacagactct tttactcggt ggcctcactg attataaaaa cacttctcag   1200
gattctggcg taccgttcct gtctaaaatc cctttaatcg gcctcctgtt tagctcccgc   1260
tctgattcta acgaggaaag cacgttatac gtgctcgtca aagcaaccat agtacgcgcc   1320
ctgtagcggc gcattaagcg cggcgggtgt ggtggttacg cgcagcgtga ccgctacact   1380
tgccagcgcc ctagcgcccg ctcctttcgc tttcttccct tcctttctcg ccacgttcgc   1440
cggctttccc cgtcaagctc taaatcgggg ctccctttta gggttccgat ttagtgcttt   1500
acggcacctc gaccccaaaa aacttgatta gggtgatggt tcacgtagtg ggccatcgcc   1560
ctgatagacg gttttcgcc ctttgacgtt ggagtccacg ttctttaata gtggactctt   1620
gttccaaact ggaacaacac tcaaccctat ctccggtctat tcttttgatt tataagggat   1680
tttgccgatt tcggcctatt ggttaaaaaa tgagctgatt taacaaaaat ttaacgcgaa   1740
ttttaacaaa atattaacgt ttacaattta aatatttgct tatacaatct tcctgttttt   1800
ggggcttttc tgattatcaa ccgggggtaca tatgattgac atgctagttt tacgattacc   1860
gttcatcgat tctcttgttt gctccagact ctcaggcaat gacctgatag cctttgtaga   1920
gacctctcaa aaatagctac cctctccggc atgaatttat cagctagaac ggttgaatat   1980
catattgatg gtgatttgac tgtctccggc ctttctcacc cgtttgaatc tttacctaca   2040
cattactcag gcattgcatt taaaatatat gagggttcta aaaattttta tccttgcgtt   2100
gaaataaagg cttctcccgc aaaagtatta caggggtcata atgttttgg tacaaccgat   2160
ttagctttat gctctgaggc tttattgctt aattttgcta attctttgcc ttgcctgtat   2220
gatttattgg atgttggaat tcctgatgcg gtattttctc cttacgcatc tgtgcggtat   2280
ttcacaccgc atatggtgca ctctcagtac aatctgctct gatgccgcat agttaagcca   2340
gccccgacac ccgccaacac ccgctgacgc gccctgacgg gcttgtctgc tcccggcatc   2400
cgcttacaga caagctgtga ccgtctccgg gagctgcatg tgtcagaggt tttcaccgtc   2460
atcaccgaaa cgcgcgagac gaaagggcct cgtgatacgc ctatttttat aggttaatgt   2520
catgataata atggtttctt agacgtcagg tggcacttttc cggggaaatg tgcgcggaac   2580
ccctatttgt ttatttttct aaatacattc aaatatgtat ccgctcatga caataaccc   2640
ctgataaatg cttcaataat attgaaaaag gaagagtatg agtattcaac atttccgtgt   2700
cgcccttatt ccctttttttg cggcattttg ccttcctgtt tttgctcacc cagaaacgct   2760
ggtgaaagta aaagatgctg aagatcagtt gggtgcacga gtgggttaca tcgaactgga   2820
tctcaacagc ggtaagatcc ttgagagttt tcgccccgaa gaacgttttc caatgatgag   2880
cacttttaaa gttctgctat gtggcgcggt attatcccgt attgacgccg ggcaagagca   2940
actcggtcgc cgcatacact attctcagaa tgacttggtt gagtactcac cagtcacaga   3000
aaagcatctt acggatggca tgacagtaag agaattatgc agtgctgcca taaccatgag   3060
tgataacact gcggccaact tacttctgac aacgatcgga ggaccgaagg agctaaccgc   3120
tttttttgcac aacatggggg atcatgtaac tcgccttgat cgttgggaac cggagctgaa   3180
tgaagccata ccaaacgacg agcgtgacac cacgatgcct gtagcaatgg caacaacgtt   3240
gcgcaaacta ttaactggcg aactacttac tctagcttcc cggcaacaat taatagactg   3300
gatggaggcg gataaagttg caggaccact tctgcgctcg gcccttccgg ctggctgttt   3360
tattgctgat aaatctggag ccggtgagcg tgggtctcgc ggtatcattg cagcactggg   3420
gccagatggt aagccctccc gtatcgtagt tatctacacg acggggagtc aggcaactat   3480
ggatgaacga aatagacaga tcgctgagat aggtgcctca ctgattaagc attggtaact   3540
gtcagaccaa gtttactcat atatacttta gattgattta aaacttcatt tttaatttaa   3600
aaggatctag gtgaagatcc ttttttgataa tctcatgacc aaaatccctt aacgtgagtt   3660
ttcgttccac tgagcgtcag accccgtaga aagatcaaa ggatcttctt gagatccttt   3720
ttttctgcgc gtaatctgct gcttgcaaac aaaaaaacca ccgctaccag cggtggtttg   3780
tttgccggat caagagctac caactctttt tccgaaggta actggcttca gcagagcgca   3840
gataccaaat actgtccttc tagtgtagcc gtagttaggc caccacttca agaactctgt   3900
agcaccgcct acatacctcg ctctgctaat cctgttacca gtggctgctg ccagtggcga   3960
taagtcgtgt cttaccgggt tggactcaag acgatagtta ccggataagg cgcagcggtc   4020
gggctgaacg gggggttcgt gcacacagcc cagcttggag cgaacgacct acaccgaact   4080
gagataccta cagcgtgagc tatgagaaag cgccacgctt cccgaaggga gaaaggcgga   4140
caggtatccg gtaagcggca gggtcggaac aggagagcgc acgagggagc ttccagggg   4200
aaacgcctgg tatctttata gtcctgtcgg gtttcgccac ctctgacttg agcgtcgatt   4260
tttgtgatgc tcgtcagggg gcggagcct atggaaaaac gccagcaacg cggcctttt   4320
acggttcctg gccttttgct ggccttttgc tcacatgttc tttcctgcgt tatccctga   4380
ttctgtggat aaccgtatta ccgcctttga gtgagctgat accgctcgcc gcagccgaac   4440
gaccgagcgc agcgagtcag tgagcgagga agcggaagag cgcccaatac gcaaaccgcc   4500
tctccccgcg cgttggccga ttcattaatg cagcagctgc gcgctcgctc gctcactgag   4560
gccgccggg caaagccggg gcgtcgggcg acctttggtc gcccggcctc agtgagcgag   4620
cgagcgcgca gagggagt ggccaactcc atcactaggg gttccttgta gttaatgatt   4680
aacccgccat gctacttatc tacgtagcca tgctctagga cattgattat tgactagtgg   4740
agttccgcgt tacataactt acggtaaatg gcccgcctgg ctgaccgccc aacgacccc   4800
gcccattgac gtcaataatg acgtatgttc ccatagtaac gcaataggg actttccatt   4860
gacgtcaatg ggtggagtat ttacggtaaa ctgcccactt ggcagtacat caagtgtatc   4920
atatgccaag tacgccccct attgacgtca atgacggtaa atggcccgcc tggcattatg   4980
cccagtacat gaccttatgg gactttccta cttggcagta catctacgta ttagtcatcg   5040
ctattaccat ggtcgaggtg agccccacgt tctgcttcac tctccccatc tcccccccgg   5100
ccccacccc aattttgtat ttatttattt tttaattatt ttgtgcagcg atgggggcgg   5160
gggggggggg gggcgcgcgc caggcggggc ggggcgggc gagggcgcgg gcggggcgag   5220
gcgagaggt gcggcggcag ccaatcagag cggcgcgctc cgaaagtttc cttttatggc   5280
gaggcggcgg cggcggcggc cctataaaaa gcgaagcgcg cggcgggcgg gagtcgctgc   5340
gcgctgcctt cgccccgtgc cccgctccgc cgccgcctcg cgccgcccgc cccggctctg   5400
actgaccgcg ttactaaaac aggtaagtcc ggcctccggg cggcctcccg   5460
cgggcgcccc cctcctcacg gcgagcgctg ccacgtcaga cgaagggcgc agcgagcgtc   5520
ctgatccttc cgcccggacg ctcaggacag cggcccgctg ctcataagac tcggccttag   5580
aaccccagta tcagcagaag gacatttag acgggactt gggtgactct agggcactgg   5640
ttttctttcc agagagcgga acaggcgagg aaaagtagtc ccttctcggc gattctgcgg   5700
agggatctcc gtggggcggt gaacgccgat gatgcctcta ctaaccatgt tcatgttttc   5760
```

```
ttttttttttc tacaggtcct gggtgacgaa cagggtaccg ccaccatggc caccggctct 5820
cgcacaagcc tgctgctggc tttcggactg ctgtgcctgc cttggctcca ggagggctcc 5880
gccgctagca tcgataccgt cgctatgtgc tggaggcttg ctgaaggctg tatgctgaag 5940
ttagcatgtg tcccagaacc gttttggcct ctgactgacg gttctgggac atgctaactt 6000
caggacacaa ggcctgttac tagcactcac atggaacaaa tggcctctag cctggaggct 6060
tgctgaaggc tgtatgctga agaaaaggt atcccaattg ccgttttggc ctctctgactga 6120
cggcaattgg gacctttctt ctcaggacac aaggcctgtt actagcactc acatggaaca 6180
aatggcctct agcctggagg cttgctgaag gctgtatgct gtagtgtttc caaatactgc 6240
ttgcgttttg gcctctgact gacgcaagca gtatggaaac actacaggac acaaggcctg 6300
ttactagcac tcacatggaa caaatggcct ctctagaat                         6339

SEQ ID NO: 12          moltype = DNA  length = 6339
FEATURE                Location/Qualifiers
source                 1..6339
                       mol_type = other DNA
                       organism = synthetic construct
SEQUENCE: 12
aatcaacctc tggattacaa aatttgtgaa agattgactg gtattcttaa ctatgttgct  60
ccttttacgc tatgtggata cgctgcttta atgcctttgt atcatgctat tgcttcccgt 120
atggctttca ttttctcctc cttgtataaa tcctggttgc tgtctcttta tgaggagttg 180
tggcccgttg tcaggcaacg tggcgtggtg tgcactgtgt ttgctgacgc aacccccact 240
ggttggggca ttgccaccac ctgtcagctc ctttccggga ctttcgcttt ccccctccct 300
attgccacgg cggaactcat cgccgcctgc cttgcccgct gctgacaggg gctcggctg  360
ttgggcactg acaattccgt ggtgttgtcg gggaaatcat cgtcctttcc ttggctgctc 420
gcctgtgttg ccacctggat tctgcgcggg acgtccttct gctacgtccc ttcggccctc 480
aatccagcgg accttcctc ccgcggcctg ctgccggctc ctccgcgtct tccgcgtctt 540
cgccttcgcc ctcagacgag tcggatctcc ctttgggccg cctccccgcc taagcttatc 600
gataccgtcg agatcaact tgtttattgc agcttataat ggttacaaat aaagcaatag 660
catcacaaat ttcacaaata aagcatttt tcactgcat tctagttgtg gtttgtccaa 720
actcatcaat gtatcttatc atgtctggat ctcgacctcg atagagcat ggctacgtag 780
ataagtagca tggcgggtta atcattaact acaaggaacc cctagtgatg gagttggcca 840
ctccctctct gcgcgctcgc tcgctcactg aggccgggcg accaaaggtc gcccgacgcc 900
cgggctttgc ccgggcggcc tcagtgagcg agcgagcgcg cagctggcgt aatagcgaag 960
aggcccgcac cgatcgccct tcccaacagt tgcgcagcct gaatggcgaa tggcgattcc 1020
gttgcaatgg ctggcggtaa tattgttctg gatattacca gcaaggccga tagtttgagt 1080
tcttctactc aggcaagtga tgttattact aatcaaagaa gtattgcgac aacggttaat 1140
ttgcgtgatg gacagactct tttactcggt ggcctcactg attataaaa cacttctcag 1200
gattctggcg taccgttcct gtctaaaatc cctttaatcg gcctcctgtt tagctccgc  1260
tctgattcta acgaggaaag cacgttatac gtgctcgtca aagccaacat agtacgcgcc 1320
ctgtagcggc gcattaagcg cggcgggtgt ggtggttacg cgcagcgtga ccgctacact 1380
tgccagcgcc ctagcgcccg ctcctttcgc tttcttccct tcctttctcg ccacgttcgc 1440
cggctttccc cgtcaagctc taaatcgggg gctcccttta gggttccgat ttagtgcttt 1500
acggcacctc gaccccaaaa aacttgatta gggtgatggt tcacgtagtg ggccatcgcc 1560
ctgatagacg gtttttcgcc ctttgacgtt ggagtccacg ttctttaata gtggactctt 1620
gttccaaact ggaacaacac tcaacctat ctcggtctat tcttttgatt tataagggat 1680
tttgccgatt tcggcctatt ggttaaaaaa tgagctgatt taacaaaaat ttaacgcgaa 1740
ttttaacaaa atattaacgt ttacaattta aatatttgct tatacaatct tcctgttttt 1800
ggggcttttc tgattatcaa ccgggtaca tatgattgac atgctagttt tacgattacc 1860
gttcatcgat tctcttgttt gctccagact ctcaggcaat gacctgatag cctttgtaga 1920
gacctctcaa aaatagctac cctctccggc atgaattat cagctagaac ggttgaatat 1980
catattgatg gtgatttgac tgtctccggc ctttctcacc cgtttgaatc tttacctaca 2040
cattactcag gcattgcatt taaaatatat gagggttcta aaaattttta tccttgcgtt 2100
gaaataaagg cttctcccgc aaaagtatta cagggtcata atgtttttgg tacaaccgat 2160
ttagctttat gctctgaggc tttattgctt aattttgcta attctttgcc ttgcctgtat 2220
gatttattgg atgttggaat tcctgatgcg gtattttctc cttacgcatc tgtgcggtat 2280
ttcacaccgc atatggtgca ctctcagtac aatctgctct gatgccgcat agttaagcca 2340
gccccgacac ccgccaacac ccgctgacgc gccctgacgg gcttgtctgc tcccggcatc 2400
cgcttacaga caagctgtga ccgtctccgg gagctgcatg tgtcagaggt tttcaccgtc 2460
atcaccgaaa cgcgcgagac gaaagggcct cgtgatacgc ctatttttat aggttaatgt 2520
catgataata atggtttctt agacgtcagg tggcactttt cggggaaatg tgcgcggaac 2580
ccctatttgt ttatttttct aaatacattc aaatatgtat ccgctcatga caataaccc  2640
ctgataaatg cttcaataat attgaaaag gaagagtatg agtattcaac atttccgtgt 2700
cgcccttatt cccttttttg cggcattttg ccttcctgtt tttgctcacc cagaaacgct 2760
ggtgaaagta aaagatgctg aagatcagtt gggtgcacga gtgggttaca tcgaactgga 2820
tctcaacagc ggtaagatcc ttgagagttt tcgccccgaa gaacgttttc caatgatgag 2880
cacttttaaa gttctgctat gtggcgcggt attatcccgt attgacgccg ggcaagagca 2940
actcggtcgc cgcatacact attctcagaa tgacttggtt gagtactcac cagtcacaga 3000
aaagcatctt acggatggca tgacagtaag agaattatgc agtgctgcca taaccatgag 3060
tgataacact gcggccaact tacttctgac aacgatcgga ggaccgaagg agctaaccgc 3120
tttttttgcac aacatggggg atcatgtaac tcgccttgat cgttgggaac cggagctgaa 3180
tgaagccata ccaaacgacg agcgtgacac cacgatgcct gtagcaatgg caacaacgtt 3240
gcgcaaacta ttaactggcg aactacttac tctagcttcc cggcaacaat taatagactg 3300
gatggaggcg gataaagttg caggaccact tctgcgctcg gcccttccgg ctggctggtt 3360
tattgctgat aaatctggag ccggtgagcg tgggtctcgc ggtatcattg cagcactggg 3420
gccagatggt aagccctccc gtatcgtagt tatctacacg acggggagtc aggcaactat 3480
ggatgaacga aatagacaga tcgctgagat aggtgcctca ctgattaagc attggtaact 3540
gtcagaccaa gtttactcat atatacttta gattgattta aaacttcatt tttaatttaa 3600
aaggatctag gtgaagatcc ttttttgataa tctcatgacc aaaatccctt aacgtgagtt 3660
ttcgttccac tgagcgtcag accccgtaga aaagatcaaa ggatcttctt gagatccttt 3720
```

```
ttttctgcgc gtaatctgct gcttgcaaac aaaaaaacca ccgctaccag cggtggtttg  3780
tttgccggat caagagctac caactctttt tccgaaggta actggcttca gcagagcgca  3840
gataccaaat actgtccttc tagtgtagcc gtagttaggc caccacttca agaactctgt  3900
agcaccgcct acatacctcg ctctgctaat cctgttacca gtggctgctg ccagtggcga  3960
taagtcgtgt cttaccgggt tggactcaag acgatagtta cggataagg cgcagcggtc  4020
gggctgaacg gggggttcgt gcacacagcc cagcttggag cgaacgacct acaccgaact  4080
gagataccta cagcgtgagc tatgagaaag cgccacgctt cccgaaggga gaaaggcgga  4140
caggtatccg gtaagcggca gggtcggaac aggagagcgc acgagggagc ttccaggggg  4200
aaacgcctgg tatctttata gtcctgtcgg gtttcgccac ctctgacttg agcgtcgatt  4260
tttgtgatgc tcgtcagggg ggcggagcct atggaaaaac gccagcaacg cggcctttt  4320
acggttcctg gccttttgct ggcctttgc tcacatgttc tttcctgcgt tatccctga  4380
ttctgtggat aaccgtatta ccgcctttga gtgagctgat accgctcgcc gcagccgaac  4440
gaccgagcgc agcgagtcag tgagcgagga agcggaagag cgcccaatac gcaaaccgcc  4500
tctccccgcg cgttggccga ttcattaatg cagcagctgc gcgctcgctc gctcactgag  4560
gccgcccggg caaagcccgg gcgtcgggcg accttggtc gcccggcctc agtgagcgag  4620
cgagcgcgca gagggagt ggccaactcc atcactaggg gttccttgta gttaatgatt  4680
aacccgccat gctacttatc tacgtagcca tgctctagga cattgattat tgactagtgg  4740
agttccgcgt tacataactt acggtaaatg gcccgcctgg ctgaccgccc aacgaccccc  4800
gcccattgac gtcaataatg acgtatgttc ccatagtaac gccaatagg acttccatt  4860
gacgtcaatg ggtggagtat ttacggtaaa ctgcccactt ggcagtacat caagtgtatc  4920
atatgccaag tacgccccct attgacgtca atgacgtaa atggcccgcc tggcattatg  4980
cccagtacat gaccttatgg gactttccta cttggcagta catctacgta ttagtcatcg  5040
ctattaccat ggtcgaggtg agccccacgt tctgcttcac tctccccatc tccccccct  5100
ccccacccc aattttgtat ttatttattt tttaattatt ttgtgcagcg atggggggcgg  5160
ggggggggg gggcgcgcgc caggcggggc ggggcgggc gaggggcggg gcggggcgag  5220
gcggagaggt gcggcggcag ccaatcagag cggcgcgctc cgaaagtttc cttttatgcc  5280
gaggcggcgg cggcggcggc cctataaaaa gcgaagcgcg cggcgggcgg gagtcgctgc  5340
gcgctgcctt cgccccgtgc cccgctccgc cgccgcctcg cgccgcccgc cccggctctg  5400
actgaccgcg ttactaaaac aggtaagtcc ggcctccgcg ccgggtttgg cgcctcccg  5460
cgggcgcccc cctcctcacg gcgagcgctg ccacgtcaga cgaagggcgc agcgagcgtc  5520
ctgatccttc cgcccggacg ctcaggacag cggcccgctg ctcataagac tcggccttag  5580
aaccccagta tcagcagaag gacatttag gacgggactt gggtgactct agggcactgg  5640
ttttctttcc agagagcgga acaggcgagg aaaagtagtc ccttctcggc gattctgcgg  5700
agggatctcc gtggggcggt gaacgccgat gatgcctcta ctaaccatgt tcatgttttc  5760
tttttttttc tacaggtcct gggtgacgaa cagggtaccg ccaccatgag caccggctct  5820
cgcacaagcc tgctgctggc tttcggactc tgtgcctgc cttggctcca ggagggctcc  5880
gccgctagca tcgataccgt cgctatgtgc tggaggcttg ctgaaggctg tatgctgtct  5940
gacagtgatg tcatccttc gttttggcct ctgactgacg aaaggatgat cactgtcaga  6000
caggacacaa ggcctgttac tagcactcac atggaacaaa tggcctctag cctggaggct  6060
tgctgaaggc tgtatgctga tttaggtcag atggaaactc gcgttttggc ctctgactga  6120
cgcgagtttc cctgacctaa atcaggacac aaggcctgtt actagcactc acatggaaca  6180
aatgcctctc agcctggagg cttgctgaag gctgtatgct gagtgtatgc ttaacgtgga  6240
cttcgttttg gcctctgact gacgaagtcc acgaagcata cactcaggac acaaggcctg  6300
ttactagcac tcacatggaa caaatggcct ctctagaat                         6339
```

SEQ ID NO: 13        moltype = DNA  length = 6339
FEATURE             Location/Qualifiers
source              1..6339
                      mol_type = other DNA
                      organism = synthetic construct
SEQUENCE: 13

```
aatcaacctc tggattacaa aatttgtgaa agattgactg gtattcttaa ctatgttgct   60
ccttttacgc tatgtggata cgctgcttta atgcctttgt atcatgctat tgcttcccgt  120
atggctttca ttttctcctc cttgtataaa tcctggttgc tgtctcttta tgaggagttg  180
tggcccgttg tcaggcaacg tggcgtggtg tgcactgtgt ttgctgacgc aaccccccact  240
ggttggggca ttgccaccac ctgtcagctc ctttccggga cttttcgctt tcccctccct  300
attgccacgg cggaactcat cgccgcctgc cttcccgct gctggacagg gctcggctg  360
ttgggcactg acaattccgt ggtgttgtcg gggaaatcat cgtcctttcc ttggctgctc  420
gcctgtgttg ccacctggat tctgcgcggg acgtccttct gctacgtccc ttcggccctc  480
aatccagcga accttccttc ccgcggcctg ctgccggctc tgcggcctct tccgcgtctt  540
cgccttcgcc ctcagacgag tcggatctcc ctttgggccg cctccccgcc taagcttatc  600
gataccgtca gatctaact tgtttattgc agcttataat ggttacaaat aaagcaatag  660
catcacaaat ttcacaaata aagcatttt ttcactgcat tctagttgtg gtttgtccaa  720
actcatcaat gtatcttatc atgtctggat ctcgacctcg atagaggcat gctacgtag  780
ataagtagca tggcgggtta atcattaact acaaggaacc cctagtgatg agttggcca  840
ctccctctct gcgcgctcgc tcgctcactg aggccgggcg accaaaggtc gcccgacgcc  900
cgggctttgc ccgggcggcc tcagtgagcg agcgagcgcg cagctggcgt aatagcgaag  960
aggcccgcac cgatcgccct tcccaacagt tgcgcagcct gaatggcgaa tggcgattcc 1020
gttgcaatgg ctggcggtaa tattgttctg gatattacca gcaaggccga tagtttgagt 1080
tcttctactc aggcaagtga tgttattact aatcaaagaa gtattgcgac aacggttaat 1140
ttgcgtgatg gacagactct tttactcggt ggcctcactg attataaaaa cacttctcag 1200
gattctggcg taccgttcct gtctaaaatc cctttaatcg gcctcctgtt tagctcccgc 1260
tctgattcta acgaggaaag cacgttatac gtgctcgtca aagcaaccat agtacgcgcc 1320
ctgtagcgg gcattaagcg cggcgggtgt ggtggttacg cgcagcgtga ccgctacact 1380
tgccagcgcc ctagcgcccg ctcctttcgc tttcttccct tcctttctcg ccacgttcgc 1440
cggctttccc cgtcaagctc taaatcgggg ctccctttta gggttccgat ttagtgcttt 1500
acggcacctc gaccccaaaa aacttgatta gggtgatggt tcacgtagtg gccatcgcc 1560
ctgatagacg gttttttcgcc ctttgacgtt ggagtccacg ttctttaata gtggactctt 1620
gttccaaact ggaacaacac tcaaccctat ctcggtctat tcttttgatt tataagggat 1680
```

```
tttgccgatt tcggcctatt ggttaaaaaa tgagctgatt taacaaaaat ttaacgcgaa    1740
ttttaacaaa atattaacgt ttacaattta aatatttgct tatacaatct tcctgttttt    1800
ggggcttttc tgattatcaa ccggggtaca tatgattgac atgctagttt tacgattacc    1860
gttcatcgat tctcttgttt gctccagact ctcaggcaat gacctgatag cctttgtaga    1920
gacctctcaa aaatagctac cctctccggc atgaatttat cagctagaac ggttgaatat    1980
catattgatg gtgatttgac tgtctccggc ctttctcacc cgtttgaatc tttacctaca    2040
cattactcag gcattgcatt taaaatatat gagggttcta aaaattttta tccttgcgtt    2100
gaaataaagg cttctcccgc aaaagtatta cagggtcata atgttttttgg tacaaccgat    2160
ttagctttat gctctgaggc tttattgctt aattttgcta attctttgcc ttgcctgtat    2220
gatttattgg atgttggaat tcctgatgcg gtattttctc cttacgcatc tgtgcggtat    2280
ttcacaccgc atatggtgca ctctcagtac aatctgctct gatgccgcat agttaagcca    2340
gccccgacac ccgccaacac ccgctgacgc gccctgacgg gcttgtctgc tcccggcatc    2400
cgcttacaga caagctgtga ccgtctccgg gagctgcatg tgtcagaggt tttcaccgtc    2460
atcaccgaaa cgcgcgagac gaaagggcct cgtgatacgc ctattttat aggttaatgt    2520
catgataata atggtttctt agacgtcagg tggcacttt cggggaaatg tgcgcggaac    2580
ccctatttgt ttattttct aaatacattc aaatatgtat ccgctcatga acaataacc    2640
ctgataaatg cttcaataat attgaaaaag gaagagtatg agtattcaac atttccgtgt    2700
cgcccttatt ccctttttttg cggcattttg ccttcctgtt tttgctcacc cagaaacgct    2760
ggtgaaagta aaagatgctg aagatcagtt gggtgcacga gtgggttaca tcgaactgga    2820
tctcaacagc ggtaagatcc ttgagagttt tcgccccgaa gaacgttttc caatgatgag    2880
cacttttaaa gttctgctat gtggcgcggt attatcccgt attgacgccg ggcaagagca    2940
actcggtcgc cgcatacact attctcagaa tgacttggtt gagtactcac cagtcacaga    3000
aaagcatctt acgatggca tgacagtaag agaattatgc agtgctgcca taaccatgag    3060
tgataacact gcggccaact tacttctgac aacgatcgga ggaccgaagg agctaaccgc    3120
ttttttgcac aacatggggg atcatgtaac tcgccttgat cgttgggaac cggagctgaa    3180
tgaagccata ccaaacgacg agcgtgacac cacgatgcct gtagcaatgg caacaacgct    3240
gcgcaaacta ttaactggcg aactacttac tctagcttcc cggcaacaat taatagactg    3300
gatgaggcg gataaagttg caggaccact tctgcgctcg gcccttccgg ctggctggtt    3360
tattgctgat aaatctggag ccggtgagcg tgggtctcgc ggtatcattg cagcactggg    3420
gccagatggt aagccctccc gtatcgtagt tatctacacg acggggagtc aggcaactat    3480
ggatgaacga aatagacaga tcgctgagat aggtgcctca ctgattaagc attggtaact    3540
gtcagaccaa gtttactcat atatacttta gattgattta aaacttcatt tttaatttaa    3600
aaggatctag gtgaagatcc tttttgataa tctcatgacc aaaatccctt aacgtgagtt    3660
ttcgttccac tgagcgtcag accccgtaga aaagatcaaa ggatcttctt gagatccttt    3720
ttttctgcgc gtaatctgct gcttgcaaac aaaaaaacca ccgctaccag cggtggtttg    3780
tttgccggat caagagctac caactctttt tccgaaggta actggcttca gcagagcgca    3840
gataccaaat actgtccttc tagtgtagcc gtagttaggc caccacttca agaactctgt    3900
agcaccgcct acatacctcg ctctgctaat cctgttacca gtggctgctg ccagtggcga    3960
taagtcgtgt cttaccgggt tggactcaag acgatagtta ccggataagg cgcagcggtc    4020
gggctgaacg ggggggttcgt gcacacagcc cagcttggag cgaacgacct acaccgaact    4080
gagataccta cagcgtgagc tatgagaaag cgccacgctt cccgaaggga aaaggcgga    4140
caggtatccg gtaagcggca gggtcggaac aggagagcgc acgagggagc ttccaggggg    4200
aaacgcctgg tatctttata gtcctgtcgg gtttcgccac ctctgacttg agcgtcgatt    4260
tttgtgatgc tcgtcagggg gcggagcct atggaaaaac gccagcaacg cggccttttt    4320
acggttcctg gccttttgct ggccttttgc tcacatgttc tttcctgcgt tatccctga    4380
ttctgtggat aaccgtatta ccgcctttga gtgagctgat accgctcgcc gcagccgaac    4440
gaccgagcgc agcgagtcag tgagcgagga agcggaagag cgcccaatac gcaaaccgcc    4500
tctccccgcg cgttggccga ttcattaatg cagcagctgc gcgctcgctc gctcactgag    4560
gccgcccggg caaagcccgg gcgtcgggcg acctttggtc gcccggcctc agtgagcgag    4620
cgagcgcgca gagagggagt ggccaactcc atcactaggg gttccttgta gttaatgatt    4680
aacccgccat gctacttatc tacgtagcca tgctctagaa cattgattat tgactagtgg    4740
agttccgcgt tacataactt acggtaaatg gcccgcctgg ctgaccgccc aacgacccc    4800
gcccattgac gtcaataatg acgtatgttc ccatagtaac gccaataggg actttccatt    4860
gacgtcaatg ggtggagtat ttacggtaaa ctgcccactt ggcagtacat caagtgtatc    4920
atatgccaag tacgccccct attgacgtca atgacggtaa atggcccgcc tggcattatg    4980
cccagtacat gaccttatgg gactttccta cttggcagta catctacgta ttagtcatcg    5040
ctattaccat ggtcgaggtg agccccacgt tctgcttcac tctccccatc tccccccct    5100
ccccacccccc aattttgtat ttattatttt tttaattatt ttgtgcagcg atggggggcg    5160
gggggggggg gggcgcgcgc caggcggggc gggcgggc gagggggcgg gcggggcgag    5220
gcggagggt gcggcgcag ccaatcagag cggcggcgctc cgaaagtttc cttttatggc    5280
gaggcggcag cggcggcggc cctataaaaa gcgaagcgcg cggcgggcgg gagtcgctgc    5340
gcgctgcctt cgccccgtgc cccgctccgc cgccgcctcg cgccgcccgc cccggctctg    5400
actgaccgcg ttactaaaac aggtaagtcc ggcctccgcg ccgggttttg gcgcctcccg    5460
cgggcgcccc cctcctcacg gcgagcgctg ccacgtcaga cgaagggcgc agcgctcgct    5520
ctgatccttc cgcccggacg ctcaggacag cggcccgctg ctcataagac tcggccttag    5580
aaccccagta tcagcagaag gacattttag gacgggactt gggtgactct agggcactgg    5640
ttttctttcc agagagcgga acaggcgagg aaaagtagtc ccttctcggc gattctgcgg    5700
agggatctcc gtggggcggt gaacgccgat gatgcctcta ctaaccatgt tcatgttttc    5760
tttttttttc tacaggtcct gggtgacgaa cagggtaccg ccaccatgac caccggctct    5820
cgcacaagcc tgctgctggc tttcggactg ctgtgcctgc cttggctcca ggagggctcc    5880
gccgctagca tcgataccgt cgctatgtgc tggaggcttg ctgaaggctg tatgctgata    5940
cttcagcctg aatcgtgacc gttttggcct ctgactgacg gtcacgattg gctgaagtat    6000
caggacacaa ggcctgttac tagcactcac atggaacaaa tggcctctag cctggaggct    6060
tgctgaaggc tgtatgctga cttcactcat attgttccac tcgttttggc ctctgactga    6120
cgagtggaac aatgagtgaa gtcaggacac aaggcctgtt actagcactc acatggaaca    6180
aatgccctct agcctggagg cttgctgaag gctgtatgct gtatattcta caaatcacca    6240
gggcgttttg gcctctgact gacgccctgg tgatgtagaa tatacaggac acaaggcctg    6300
ttactagcac tcacatggaa caaatggcct ctctagaat                          6339
```

| SEQ ID NO: 14 | moltype = DNA length = 6339 |
|---|---|
| FEATURE | Location/Qualifiers |
| source | 1..6339 |
| | mol_type = other DNA |
| | organism = synthetic construct |

SEQUENCE: 14

```
aatcaacctc tggattacaa aatttgtgaa agattgactg gtattcttaa ctatgttgct    60
ccttttacgc tatgtggata cgctgcttta atgcctttgt atcatgctat tgcttcccgt   120
atggctttca ttttctcctc cttgtataaa tcctggttgc tgtctcttta tgaggagttg   180
tggcccgttg tcaggcaacg tggcgtggtg tgcactgtgt ttgctgacgc aaccccact   240
ggttggggca ttgccaccac ctgtcagctc ctttccggga ctttcgcttt cccctccct   300
attgccacgg cggaactcat cgccgcctgc cttgccgct gctggacagg ggctcggctg    360
ttgggcactg acaattccgt ggtgttgtcg gggaaatcat cgtcctttcc ttggctgctc   420
gcctgtgttg ccacctggat tctgcgcggg acgtccttct gctacgtcct ttcggccctc   480
aatccagcgg accttccttc ccgcggcctg ctgccggctc tgcggcctct tccgcgtctt   540
cgccttcgcc ctcagacgag tcggatctcc ctttgggccg cctcccgcc taagcttatc    600
gataccgtcg agatctaact tgtttattgc agcttataat ggttacaaat aaagcaatag   660
catcacaaat ttcacaaata aagcattttt ttcactgcat tctagttgtg gtttgtccaa   720
actcatcaat gtatcttatc atgtctggat ctcgacctcg actagagcat ggctacgtag   780
ataagtagca tggcgggtta atcattaact acaaggaacc cctagtgatg gagttggcca   840
ctccctctct gcgcgctcgc tcgctcactg aggccgggcg accaaaggtc gcccgacgcc   900
cgggctttgc ccgggcggcc tcagtgagcg agcgagcgcg cagctggcgt aatagcgaag   960
aggcccgcac cgatcgccct tcccaacagt tgcgcagcct gaatggcgaa tggcgattcc  1020
gttgcaatgg ctgcggtaa tattgttctg gatattacca gcaaggccga tagtttgagt  1080
tcttctactc aggcaagtga tgttattact aatcaaagaa gtattgcgac aacggttaat  1140
ttgcgtgatg gacagactct tttactcggt ggcctcacgc attataaaaa cacttctcag  1200
gattctggcg taccgttcct gtctaaaatc cctttaatcg gcctcctgtt tagctcccgc  1260
tctgattcta acgaggaaag cacgttatac gtgctcgtca aagcaaccat agtacgcgcc  1320
ctgtagcggc gcattaagcg cggcgggtgt ggtggttacg cgcagcgtga ccgctacact  1380
tgccagcccg ctcctttcgc tttcttccct tcctttctcg ccacgttcgc  1440
cggctttccc cgtcaagctc taaatcgggg gctcccttta gggttccgat ttagtgcttt  1500
acggcacctc gaccccaaaa aacttgatta gggtgatggt tcacgtagtg ggccatcgcc  1560
ctgatagacg gttttttcgcc ctttgacgtt ggagtccacg ttctttaata gtggactctt  1620
gttccaaaact ggaacaacac tcaaccctat ctcggtctat tcttttgatt tataagggat  1680
tttgccgatt tcggcctatt ggttaaaaaa tgagctgatt taacaaaat ttaacgcgaa  1740
ttttaacaaa atattaacgt ttacaattta aatatttgct tatacaatct tcctgttttt  1800
ggggcttttc tgattatcaa ccggggtaca tatgattgac atgctagttt tacgattacc  1860
gttcatcgat tctcttgttt gctccagact ctcaggcaat gacctgatag cctttgtaga  1920
gacctctcaa aaatagctac cctctccggc atgaatttat cagctagaac ggttgaatat  1980
catattgatg gtgatttgac tgtctccggc ctttctcacc cgtttgaatc tttacctaca  2040
cattactcag gcattgcatt taaaatatat gagggttcta aaaattttta tccttgcgtt  2100
gaaataaagg cttctcccgc aaaagtatta cagggtcata atgtttttgg tacaaccgat  2160
ttagctttat gctctgaggc tttattgctt aattttgcta attctttgcc ttgcctgtat  2220
gatttattgg atgttggaat tcctgatgcg gtattttctc cttacgcatc tgtgcggtat  2280
ttcacaccgc atatggtgca ctctcagtac aatctgctct gatgccgcat agttaagcca  2340
gccccgacac ccgccaacac ccgctgacgc gccctgacgg gcttgtctgc tcccggcatc  2400
cgcttacaga caagctgtga ccgtctccgg gagctgcatg tgtcagaggt tttcaccgtc  2460
atcaccgaaa cgcgcgagac gaaagggcct cgtgatacgc ctatttttat aggttaatgt  2520
catgataata atggtttctt agacgtcagg tggcactttt cggggaaatg tgcgcggaac  2580
ccctatttgt ttatttttct aaatacattc aaatatgtat ccgctcatga caataaccc  2640
ctgataaatg cttcaataat attgaaaaag gaagagtatg agtattcaac atttccgtgt  2700
cgcccttatt ccctttttg cggcatttg ccttcctgtt tttgctcacc cagaaacgct  2760
ggtgaaagta aaagatgctg aagatcagtt gggtgcacga gtgggttaca tcgaactgga  2820
tctcaacagc ggtaagatcc ttgagagttt tcgccccgaa gaacgttttc caatgatgag  2880
cacttttaaa gttctgctat gtggcgcggt attatcccgt attgacgccg ggcaagagca  2940
actcggtcgc cgcatacact attctcagaa tgacttggtt gagtactcac cagtcacaga  3000
aaagcatctt acggatggca tgacagtaag agaattatgc agtgctgcca taaccatgag  3060
tgataacact gcggccaact tacttctgac aacgatcgga ggaccgaagg agctaaccgc  3120
ttttttgcac aacatggggg atcatgtaac tcgccttgat cgttgggaac cggagctgaa  3180
tgaagccata ccaaacgacg agcgtgacac cacgatgcct gtagcaatgg caacaacgtt  3240
gcgcaaacta ttaactggcg aactacttac tctagcttcc cggcaacaat taatagactg  3300
gatgaaggcg gataaagttg caggaccact tctgcgctcg gcccttccgg ctggctggtt  3360
tattgctgat aaatctggag ccggtgagcg tgggtctcgc ggtatcattg cagcactggg  3420
gccagatggt aagccctccc gtatcgtagt tatctacacg acggggagtc aggcaactat  3480
ggatgaacga aatagacaga tcgctgagat aggtgcctca ctgattaagc attggtaact  3540
gtcagaccaa gtttactcat atatacttta gattgattta aaacttcatt tttaatttaa  3600
aaggatctag gtgaagatcc tttttgataa tctcatgacc aaaatccctt aacgtgagtt  3660
ttcgttccac tgagcgtcag accccgtaga aagatcaaa ggatcttctt gagatccttt  3720
ttttctgcgc gtaatctgct gcttgcaaac aaaaaaacca ccgctaccag cggtggtttg  3780
tttgccggat caagagctac caactctttt tccgaaggta actggcttca gcagagcgca  3840
gataccaaat actgtccttc tagtgtagcc gtagttaggc caccacttca agaactctgt  3900
agcaccgcct acatacctcg ctctgctaat cctgttacca gtggctgctg ccagtggcga  3960
taagtcgtgt cttaccgggt tggactcaag acgatagtta ccggataagg cgcagcggtc  4020
gggctgaacg gggggttcgt gcacacagcc cagcttggag cgaacgacct acaccgaact  4080
gagataccta cagcgtgagc tatgagaaag cgccacgctt cccgaaggga gaaaggcgga  4140
caggtatccg gtaagcggca gggtcggaac aggagagcgc acgagggagc ttccagggg  4200
aaacgcctgg tatctttata gtcctgtcgg gtttcgccac ctctgacttg agcgtcgatt  4260
tttgtgatgc tcgtcagggg ggcggagcct atggaaaaac gccagcaacg cggcctttt  4320
acggttcctg gccttttgct ggccttttgc tcacatgttc tttcctgcgt tatccccctga  4380
```

```
ttctgtggat aaccgtatta ccgcctttga gtgagctgat accgctcgcc gcagccgaac    4440
gaccgagcgc agcgagtcag tgagcgagga agcggaagag cgcccaatac gcaaaccgcc    4500
tctcccgcg cgttggccga ttcattaatg cagcagctgc gcgctcgctc gctcactgag    4560
gccgcccggg caaagcccgg gcgtcgggcg acctttggtc gcccggcctc agtgagcgag    4620
cgagcgcgca gagagggagt ggccaactcc atcactgagg gttccttgta gttaatgatt    4680
aacccgccat gctacttatc tacgtagcca tgctctagga cattgattat tgactagtgg    4740
agttccgcgt tacataactt acggtaaatg gcccgcctgg ctgaccgccc aacgacccc    4800
gcccattgac gtcaataatg acgtatgttc ccatagtaac gccaataggg actttccatt    4860
gacgtcaatg ggtggagtat ttacgtaaa ctgcccactt ggcagtacat caagtgtatc    4920
atatgccaag tacgccccct attgacgtca atgacggtaa atggcccgcc tggcattatg    4980
cccagtacat gaccttatgg gactttccta cttggcagta catctacgta ttagtcatcg    5040
ctattaccat ggtcgaggtg agccccacgt tctgcttcac tctccccatc tccccccct    5100
cccacccc aattttgtat ttatttattt tttaattatt ttgtgcagcg atgggggcgg    5160
ggggggggg gggcgcgcgc caggcggggc ggggcgggg gagggggcgg gcggggcgag    5220
gcggagaggt gcggcggcag ccaatcagag cggcgcgctc cgaaagtttc cttttatggc    5280
gaggcggcgg cggcggcggc cctataaaaa gcgaagcgcg cggcgggcgg gagtcgctgc    5340
gcgctgcctt cgccccgtgc cccgctccgc cgccgcctcg cgccgcccgc cccggctctg    5400
actgaccgcg ttactaaaac aggtaagtcc ggcctccgg ccgggttttg gcgcctcccg    5460
cgggcgcccc cctcctcacg gcgagcgctg ccacgtcaga cgaagggcgc agcgagcgtc    5520
ctgatccttc cgcccggacg ctcaggacag cggcccgctg ctcataagac tcggcctag    5580
aaccccagta tcagcagaag gacatttag gacgggactt gggtgactct agggcactgg    5640
ttttcttcc agagagcgga acaggcgagg aaaagtagtc cttctcggc gattctgcgg    5700
agggatctcc gtgggcggt gaacgccgat gatgcctcta ctaaccatgt tcatgttttc    5760
ttttttttc tacaggtcct gggtgacgaa cagggtaccg ccaccatggc caccggctct    5820
cgcacaagcc tgctgctggc tttcggactg ctgtgcctgc cttggctcca ggagggctcc    5880
gccgctagca tcgataccgt cgctatgtgc tggaggcttg ctgaaggctg tatgctgtat    5940
aagtccagtg agaagaaggc gttttgcct ctgactgacg ccttcttctc tggacttata    6000
caggacacaa ggcctgttac tagcactcac atggaacaaa tggcctctag cctgaggct    6060
tgctgaaggc tgtatgctgc tatcatcaaa tgagctgctg cgttttggcc tctgactgac    6120
gcagcagctc ttgatgatag tcaggacaca aggcctgtta ctagcactca catggaacaa    6180
atggcctcta gcctgaggc ttgctgaagg ctgtatgctg aagactgctg gaaattctat    6240
ggctgttttg gcctctgact gacgaccata gaatccagca gtctcaggac acaaggcctg    6300
ttactagcac tcacatggaa caaatggcct ctctagaat                          6339

SEQ ID NO: 15       moltype = DNA   length = 6340
FEATURE             Location/Qualifiers
source              1..6340
                    mol_type = other DNA
                    organism = synthetic construct
SEQUENCE: 15
aatcaacctc tggattacaa aatttgtgaa agattgactg gtattcttaa ctatgttgct     60
ccttttacgc tatgtggata cgctgcttta atgcctttgt atcatgctat tgcttcccgt    120
atggctttca ttttctcctc cttgtataaa tcctggttgc tgtctcttta tgaggagttg    180
tggcccgttg tcaggcaacg tggcgtggtg tgcactgtgt ttgctgacgc aaccccact    240
ggttggggca ttgccaccac ctgtcagctc ctttccggga cttttgcttt cccctcct    300
attgccacgg cggaactcat cgccgcctgc cttgcccgct gctggacagg ggctcggctg    360
ttgggcagtg acaattcgt ggtgttgtc gggaaatcat cgtccttcc ttggctgctc    420
gcctgtgttg ccacctggat tctgcgcggg acgtccttct gctacgtccc ttcggccctc    480
aatccagcgg accttccttc ccgcggcctg ctgccggctc tgcggcctct tccgcgtctt    540
cgccttcgcc ctcagacgag tcggatctcc ctttgggccg cctccccgcc taagcttatc    600
gataccgtcg agatctaact tgtttattgc agcttataat ggttacaaat aaagcaatag    660
catcacaaat ttcacaaata aagcattttt tcactgcat tctagttgtg gtttgtccaa    720
actcatcaat gtatcttatc atgtctggat ctcgacctcg actagagcat ggctacgtag    780
ataagtagca tggcgggtta atcattaact acaaggaacc cctagtgatg gagttggcca    840
ctccctctct gcgcgctcgc tcgctcactg aggccggggc accaaaggtc gcccgacgcc    900
cgggctttgc ccgggcggcc tcagtgagcg agcgagcgcg cagctggcgt aatagcgaag    960
aggcccgcac cgatcgccct tcccaacagt tgcgcagcct gaatggcgaa tggcgattcc   1020
gttgcaatgg ctggcggtaa tattgttctg gatattacca gcaaggccga tagtttgagt   1080
tcttctactc aggcaagtga tgttattact aatcaaagaa gtattgcgac aacggttaat   1140
ttgcgtgatg gacagactct tttactcggt ggcctcactg attataaaaa cacttctcag   1200
gattctggcg taccgttcct gtctaaaatc ccttttaatcg gcctcctgtt tagctcccgc   1260
tctgattcta acgaggaaag cacgttatac gtgctcgtca aagcaaccat agtacgcgcc   1320
ctgtagcggc gcattaagcg cggcgggtgt ggtggttacg cgcagcgtga ccgctacact   1380
tgccagcgcc ctagcgcccg ctcctttcgc tttcttccct tcctttctcg ccacgttcgc   1440
cggctttccc cgtcaagctc taaatcgggg gctcccttta gggttccgat ttagtgcttt   1500
acggcacctc gaccccaaaa aacttgatta gggtgatggt tcacgtagtg gccatcgcc   1560
ctgatagacg ttttttcgcc ctttgacgtt ggagtccacg ttctttaata gtggactctt   1620
gttccaaact ggaacaacac tcaaccctat ctcggtctat tcttttgatt tataagggat   1680
tttgccgatt tcggcctatt ggttaaaaaa tgagctgatt taacaaaaat ttaacgcgaa   1740
ttttaacaaa atattaacgt ttacaattta aatatttgct tatacaatct tcctgttttt   1800
ggggcttttc tgattatcaa ccggggtaca tatgattgac atgctagttt tacgattacc   1860
gttcatcgat tctcttgttt gctccagact ctcaggcaat gacctgatag cctttgtaga   1920
gacctctcaa aaatagctac cctctccggc atgaattat cagctagaac ggttgaatat   1980
catattgatg tgtattttgac tgtctccggc cttctcacc cgtttgaatc tttacctaca   2040
cattactcag gcattgcatt taaaatatat gagggttcta aaattttta tccttgcgtt   2100
gaaataaagg cttctcccgc aaaagtatta cagggtcata atgttttgg tacaaccgat   2160
ttagctttat gctctgaggc tttattgctt aattttgcta attctttgcc ttgcctgtat   2220
gatttattgg atgttggaat tcctgatgcg gtattttctc cttacgcatc tgtgcggtat   2280
ttcacaccgc atatggtgca ctctcagtac aatctgctct gatgccgcat agttaagcca   2340
```

```
gccccgacac ccgccaacac ccgctgacgc gccctgacgg gcttgtctgc tcccggcatc    2400
cgcttacaga caagctgtga ccgtctccgg gagctgcatg tgtcagaggt tttcaccgtc    2460
atcaccgaaa cgcgcgagac gaaagggcct cgtgatacgc ctattttttat aggttaatgt    2520
catgataata atgtttcttt agacgtcagg tggcactttt cggggaaatg tgcgcggaac    2580
ccctatttgt ttatttttct aaatacattc aaatatgtat cgcgctcatga gacaataacc    2640
ctgataaatg cttcaataat attgaaaaag gaagagtatg agtattcaac atttccgtgt    2700
cgcccttatt ccctttttg cggcattttg ccttcctgtt tttgctcacc cagaaacgct    2760
ggtgaaagta aaagatgctg aagatcagtt gggtgcacga gtgggttaca tcgaactgga    2820
tctcaacagc ggtaagatcc ttgagagttt tcgccccgaa gaacgttttc caatgatgag    2880
cacttttaaa gttctgctat gtggcgcggt attatcccgt attgacgccg ggcaagagca    2940
actcggtcgc cgcatacact attctcagaa tgacttggtt gagtactcac cagtcacaga    3000
aaagcatctt acggatggca tgacagtaag agaattatgc agtgctgcca taaccatgag    3060
tgataacact gcggccaact tacttctgac aacgatcgga ggaccgaagg agctaaccgc    3120
tttttttgcac aacatggggg atcatgtaac tcgccttgat cgttgggaac cggagctgaa    3180
tgaagccata ccaaacgacg agcgtgacac cacgatgcct gtagcaatgg caacaacgtt    3240
gcgcaaacta ttaactggcg aactacttac tctagcttcc cggcaacaat taatagactg    3300
gatgggaggcg gataaagttg caggaccact tctgcgctcg gcccttccgg ctggctggtt    3360
tattgctgat aaatctggag ccggtgagcg tgggtctcgc ggtatcattg cagcactggg    3420
gccagatggt aagccctccc gtatcgtagt tatctcacg acgggggagtc aggcaactat    3480
ggatgaacga aatagacaga tcgctgagat aggtgcctca ctgattaagc attggtaact    3540
gtcagaccaa gtttactcat atatacttta gattgattta aaacttcatt tttaatttaa    3600
aaggatctag gtgaagatcc ttttttgataa tctcatgacc aaaatccctt aacgtgagtt    3660
ttcgttccac tgagcgtcag accccgtaga aagatcaaa ggatcttctt gagatccttt    3720
tttttctgcgc gtaatctgct gcttgcaaac aaaaaaacca ccgctaccag cggtggtttg    3780
tttgccggat caagagctac caactctttt tccgaaggta actggcttca gcagagcgca    3840
gataccaaat actgtccttc tagtgtagcc gtagttaggc caccacttca agaactctgt    3900
agcaccgcct acatacctcg ctctgctaat cctgttacca gtggctgctg ccagtggcga    3960
taagtcgtgt cttaccgggt tggactcaag acgatagtta ccggataagg cgcagcggtc    4020
gggctgaacg gggggttcgt gcacacagcc cagcttggag cgaacgacct acaccgaact    4080
gagataccta cagcgtgagc tatgagaaag cgccacgctt cccgaaggga gaaaggcgga    4140
caggtatccg gtaagcggca gggtcggaac aggagagcgc acgagggagc ttccaggggg    4200
aaacgcctgg tatctttata gtcctgtcgg gtttcgccac ctctgacttg agcgtcgatt    4260
tttgtgatgc tcgtcagggg gcggagcct atggaaaaac gccagcaacg cggcttttt    4320
acggttcctg gccttttgct ggccttttgc tcacatgttc tttcctgcgt tatccctga    4380
ttctgtggat aaccgtatta ccgcctttga gtgagctgat accgctcgcc gcagccgaac    4440
gaccgagcgc agcgagtcag tgagcgagga agcgaagag cgcccaatac gcaaaccgcc    4500
tctccccgcg cgttggccga ttcattaatg cagcagctgc gcgctcgctc gctcactgag    4560
gccgcccggg caaagcccgg gcgtcgggcg acctttggtc gcccggcctc agtgagcgag    4620
cgagcgcgca gagggggagt ggccaactcc atcactaggg gttccttgta gttaatgatt    4680
aacccgccat gctacttatc tacgtagcca tgctctagga cattgattat tgactagtgg    4740
agttccgcgt tacataactt acggtaaatg gcccgcctgg ctgaccgccc aacgacccc    4800
gcccattgac gtcaataatg acgtatgttc ccatagtaac gccaataggg actttccatt    4860
gacgtcaatg ggtggagtat ttacggtaaa ctgcccactt ggcagtacat caagtgtatc    4920
atatgccaag tacgccccct attgacgtca atgacggtaa atggcccgcc tggcattatg    4980
cccagtacat gaccttatgg gactttccta cttggcagta catctacgta ttagtcatcg    5040
ctattaccat ggtcgaggtg agccccacgt tctgcttcac tctccccatc tcccccccct    5100
ccccaccccc aatttgtat ttatttattt tttaattatt ttgtgcagcg atgggggcgg    5160
ggggggggg gggcgcgcgc caggcggggc ggggcgggc gaggggcggg gcggggcgag    5220
gcggagaggt gcggcggcag ccaatcagag cggcgcgctc cgaaagtttc cttttatggc    5280
gaggcggcgg cggcggcggc cctataaaaa gcgaagcgcg cggcgggcgg gagtcgctgc    5340
gcgctgcctt cgccccgtgc cccgctccgc cgccgcctcg cgccgcccgc cccggctctg    5400
actgaccgcg ttactaaaac aggtaagtcc ggcctccgcg ccgggttttg gcgcctcccg    5460
cgggcgcccc cctcctcacg cgagcgcgct ccacgtcaga cgaagggcgc agcgagcgtc    5520
ctgatccttc cgcccggacg ctcaggacag cggcccgctg ctcataagac tcggccttag    5580
aacccagta tcagcagaag gacatttag gacgggactt gggtgactct agggcactgg    5640
ttttctttcc agagagcgga acaggcgagg aaaagtagtc ccttctcggc gattctgcgg    5700
agggatctcc gtgggcggt gaacgccgat gatgcctcta ctaaccatgt tcatgttttc    5760
tttttttttc tacaggtcct gggtgacgaa cagggtaccg ccaccatggc caccggctct    5820
cgcacaagcc tgctgctggc tttgactg ctgtgcctgc cttggctcca ggagggctcc    5880
gccgctagca tcgataccgt cgctatgtgc tggaggcttg ctgaaggctg tatgctgatt    5940
agcactggtg atttccggct gttttggcct ctgactgacg accggaaatc cagtgctaat    6000
caggacacaa ggcctgttac tagcactcac atggaacaaa tggcctctag cctggaggct    6060
tgctgaaggc tgtatgctga ttgagtttcg cattcttgtt gccgttttgg cctctgactg    6120
acggcaacaa gagcgaaact caacaggaca caaggcctac tactagcact cacatggaac    6180
aaatggcctc tagcctggag gcttgctgaa ggctgtatgc tgattgatca ggcaaacata    6240
gtcccgtttt ggcctctgac tgacgggact atgtgcctga tcaatcagga cacaaggcct    6300
gttactagca ctcacatgga acaaatggcc tctctagaat                           6340
```

SEQ ID NO: 16   moltype = DNA length = 6339
FEATURE    Location/Qualifiers
source     1..6339
       mol_type = other DNA
       organism = synthetic construct
SEQUENCE: 16

```
aatcaacctc tggattacaa aatttgtgaa agattgactg gtattcttaa ctatgttgct     60
ccttttacgc tatgtggata cgctgcttta atgcctttgt atcatgctat tgcttcccgt    120
atggctttca ttttctcctc cttgtataaa tcctggttgc tgtctcttta tgaggagttg    180
tggcccgttg tcaggcaacg tggcgtggtg tgcactgtgt ttgctgacgc aacccccact    240
ggttggggca ttgccaccac ctgtcagctc ctttccggga ctttcgcttt ccccctccct    300
```

```
attgccacgg cggaactcat cgccgcctgc cttgcccgct gctggacagg ggctcggctg   360
ttgggcactg acaattccgt ggtgttgtcg gggaaatcat cgtcctttcc ttggctgctc   420
gcctgtgttg ccacctggat tctgcgcggg acgtccttct gctacgtccc ttcggccctc   480
aatccagcgg accttccttc ccgcggcctg ctgccggctc tgcggcctct tccgcgtctt   540
cgccttcgcc ctcagacgag tcggatctcc ctttgggcg cctccccgcc taagcttatc   600
gataccgtcg agatctaact tgtttattgc agcttataat ggttacaaat aaagcaatag   660
catcacaaat ttcacaaata aagcattttt ttcactgcat tctagttgtg gtttgtccaa   720
actcatcaat gtatcttatc atgtctggat ctcgacctcg actagagcat ggctacgtag   780
ataagtagca tggcgggtta atcattaact acaaggaacc cctagtgatg gagttggcca   840
ctccctctct gcgcgctcgc tcgctcactg aggccgggcg accaaaggtc gcccgacgcc   900
cgggctttgc ccgggcggcc tcagtgagcg agcgagcgcg cagctggcgt aatagcgaag   960
aggcccgcac cgatcgccct tcccaacagt tgcgcagcct gaatgcgaa tggcgattcc  1020
gttgcaatgg ctggcggtaa tattgttctg gatattacca gcaaggccga tagtttgagt  1080
tcttctactc aggcaagtga tgttattact aatcaaagaa gtattgcgac aacgttaat  1140
ttgcgtgatg gacagactct tttactcggt ggcctcactg attataaaaa cacttctcag  1200
gattctggcg taccgttcct gtctaaaatc cctttaatcg gcctcctgtt tagctcccgc  1260
tctgattcta acgaggaaag cacgttatac gtgctcgtca aagcaaccat agtacgcgcc  1320
ctgtagcggc gcattaagcg cggcgggtgt ggtggttacg cgcagcgtga ccgctacact  1380
tgccagcgcc ctagcgcccg ctcctttcgc tttcttccct tcctttctcg ccacgttcgc  1440
cggctttccc cgtcaagctc taaatcgggg gctcccttta gggttccgat ttagtgcttt  1500
acggcacctc gaccccaaaa aacttgatta gggtgatggt tcacgtagtg ggccatcgcc  1560
ctgatagacg ttttcgcc cttgacgtt ggagtccacg ttctttaata gtggactctt  1620
gttccaaact ggaacaacac tcaacctat ctcggtctat tcttttgatt tataagggat  1680
tttgccgatt tcggcctatt ggttaaaaaa tgagctgatt taacaaaat ttaacgcgaa  1740
ttttaacaaa atattaacgt ttacaattta aatatttgct tatacaatct tcctgttttt  1800
ggggcttttc tgattatcaa ccggggtaca tatgattgac atgctagttt tacgattacc  1860
gttcatcgat tctcttgttt gctccagact ctcaggcaat gacctgatag cctttgtaga  1920
gacctctcaa aaatagctac cctctccggc atgaatttat cagctagaac ggttgaatat  1980
catattgatg gtgatttgac tgtctccggc ctttctcacc cgtttgaatc tttacctaca  2040
cattactcag gcattgcatt taaaatatat gagggttcta aaaattttta tccttgcgtt  2100
gaaataaagg cttctcccgc aaaagtatta cagggtcata atgttttgg tacaaccgat  2160
ttagctttat gctctgaggc tttattgctt aattttgcta attctttgcc ttgcctgtat  2220
gatttattgg atgttggaat tcctgatgcg gtattttctc cttacgcatc tgtgcggtat  2280
ttcacaccgc atatggtgca ctctcagtac aatctgctct gatgccgcat agttaagcca  2340
gccccgacac ccgccaacac ccgctgacgc gccctgacgg gcttgtctgc tcccggcatc  2400
cgcttacaga caagctgtga ccgtctccgg gagctgcatg tgtcagaggt tttcaccgtc  2460
atcaccgaaa cgcgcgagac gaaagggcct cgtgatacgc ctatttttat aggttaatgt  2520
catgataata atggttttctt agacgtcagg tggcactttt cggggaaatg tgcgcggaac  2580
ccctatttgt ttatttttct aaatacattc aaatatgtat ccgctcatga gacaataacc  2640
ctgataaatg cttcaataat attgaaaaag gaagagtatg agtattcaac atttccgtgt  2700
cgcccttatt ccctttttg cggcattttg ccttcctgtt tttgctcacc cagaaacgct  2760
ggtgaaagta aaagatgctg aagatcagtt gggtgcacga gtgggttaca tcgaactgga  2820
tctcaacagc ggtaagatcc ttgagagttt tcgccccgaa gaacgttttc caatgatgag  2880
cacttttaaa gttctgctat gtggcgcggt attatcccgt attgacgccg ggcaagagca  2940
actcggtcgc cgcatacact attctcagaa tgacttggtt gagtactcac cagtcacaga  3000
aaagcatctt acgatggca tgacagtaag agaattatgc agtgctgcca taaccatgag  3060
tgataacact gcggccaact tacttctgac aacgatcgga ggaccgaagg agctaaccgc  3120
ttttttgcac aacatggggg atcatgtaac tcgccttgat cgttgggaac cggagctgaa  3180
tgaagccata ccaaacgacg agcgtgacac cacgatgcct gtagcaatgg caacaacgtt  3240
gcgcaaacta ttaactggcg aactacttac tctagcttcc cggcaacaat taatagactg  3300
gatggaggcg gataaagttg caggaccact tctgcgctcg gcccttccgg ctggctgctt  3360
tattgctgat aaatctggag ccggtgagcg tgggtctcgc ggtatcattg cagcactggg  3420
gccagatggt aagccctccc gtatcgtagt tatctacacg acgggagtc aggcaactat  3480
ggatgaacga aatagacaga tcgctgagat aggtgcctca ctgattaagc attggtaact  3540
gtcagaccaa gtttactcat atatacttta gattgatta aaacttcatt tttaatttaa  3600
aaggatctag gtgaagatcc tttttgataa tctcatgacc aaaatccctt aacgtgagtt  3660
ttcgttccac tgagcgtcag accccgtaga aagatcaaa ggatcttctt gagatccttt  3720
ttttctgcgc gtaatctgct gcttgcaaac aaaaaaacca ccgctaccag cggtggtttg  3780
tttgccggat caagagctac caactctttt tccgaaggta actggcttca gcagagcga  3840
gataccaaat actgtccttc tagtgtagcc gtagttaggc caccacttca agaactctgt  3900
agcaccgcct acatacctcg ctctgctaat cctgttacca gtggctgctg ccagtggcga  3960
taagtcgtgt cttaccgggt tggactcaag acgatagtta ccggataagg cgcagcggtc  4020
gggctgaacg ggggggttcgt gcacacagcc cagcttggag cgaacgacct acaccgaact  4080
gagataccta cagcgtgagc tatgagaaag cgccacgctt cccgaaggga gaaaggcgga  4140
caggtatccg gtaagcggca gggtcggaac aggagagcgc acgagggagc ttccagggg  4200
aaacgcctgg tatctttata gtcctgtcgg gtttcgccac ctctgacttg agcgtcgatt  4260
tttgtgatgc tcgtcagggg gcggagcct atggaaaaac gccagcaacg cggcctttt   4320
acggttcctg gccttttgct ggccttttgc tcacatgttc tttcctgcgt tatccctga   4380
tctctggat aaccgtatta ccgcctttga gtgagctgat accgctcgcc gcagccgaac   4440
gaccgagcgc agcgagtcag tgagcgagga agcggaagag cgcccaatac gcaaaccgcc   4500
tctccccgcg cgttggccga ttcattaatg cagcagctgc gcgctcgctc gctcactgag   4560
gccgcccggg caaagcccgg gcgtcgggcg acctttggtc gcccggcctc agtgagcgag   4620
cgagcgcgca gagggagt ggccaactcc atcactaggg gttccttgta gttaatgatt   4680
aacccgccat gctacttatc tacgtagcca cattgattat tgactagtgg                 4740
agttccgcgt tacataactt acggtaaatg gcccgcctgg ctgaccgccc aacgaccccc   4800
gcccattgac gtcaataatg acgtatgttc ccatagtaac gccaataggg actttccatt   4860
gacgtcaatg gtggagtat ttacggtaaa ctgcccactt ggcagtacat caagtgtatc   4920
atatgccaag tacgccccct attgacgtca atgacggtaa atggcccgcc tggcattatg   4980
cccagtacat gaccttatgg gactttccta cttggcagta catctacgta ttagtcatcg   5040
```

```
ctattaccat ggtcgaggtg agccccacgt tctgcttcac tctccccatc tccccccct   5100
ccccacccc  aattttgtat ttatttattt tttaattatt ttgtgcagcg atggggggcgg  5160
ggggggggg  gggcgcgcgc caggcggggc gggcggggc  gagggcggg  gcggggcgag  5220
gcggagaggt gcggcggcag ccaatcagag cggcgcgctc cgaaagtttc cttttatggc  5280
gaggcggcgg cggcggcgc  cctataaaaa gcgaagcgcg cggcgggcgg gagtcgctgc  5340
gcgctgcctt cgccccgtgc cccgctccgc cgccgcctcg cgccgcccgc cccggctctg  5400
actgaccgcg ttactaaaac aggtaagtcc ggcctccgcg ccgggttttg gcgcctcccg  5460
cgggcgcccc cctcctcacg gcgagcgctg ccacgtcaga cgaagggcgc agcgagcgtc  5520
ctgatccttc cgcccggacg ctcaggacag cggcccgctc ctcataagac tcggccttag  5580
aaccccagta tcagcagaag gacattttag gacgggactt gggtgactct agggcactgg  5640
ttttctttcc agagagcgga acaggcgagg aaaagtagtc ccttctcggc gattctgcgg  5700
agggatctcc gtggggcggt gaacgccgat gatgcctcta ctaaccatgt tcatgttttc  5760
ttttttttc  tacaggtcct gggtgacgaa cagggtaccg ccaccatggc caccggctct  5820
cgcacaagcc tgctgctggc tttcggactg ctgtgcctgc cttggctcca ggagggctcc  5880
gccgctagca tcgataccgt cgctatgtgc tggaggcttg ctgaaggctg tatgctgtct  5940
gatcgtggtg ttatttgggc gttttggcct ctgactgacg cccaaataac cacgatcaga  6000
caggacacaa ggcctgttac tagcactcac atggaacaaa tggcctctag cctggaggct  6060
tgctgaaggc tgtatgctgt tgagtttcgc attcttgttg ccgttttgcc ctctgactga  6120
cggcaacaag agcgaaactc aacaggacac aaggcctgtt actagcactc acatggaaca  6180
aatgcctct  agcctggagg cttgctgaag gctgtatgct gtatcctctt ataactcagc  6240
ctccgttttg gcctctgact gacgaggct  gagataagag gatacaggac acaaggcctg  6300
ttactagcac tcacatggaa caaatggcct ctctagaat                         6339

SEQ ID NO: 17            moltype = DNA   length = 6339
FEATURE                  Location/Qualifiers
source                   1..6339
                         mol_type = other DNA
                         organism = synthetic construct
SEQUENCE: 17
aatcaacctc tggattacaa aatttgtgaa agattgactg gtattcttaa ctatgttgct   60
ccttttacgc tatgtggata cgctgcttta atgcctttgt atcatgctat tgcttccgt   120
atggctttca ttttctcctc cttgtataaa tcctggttgc tgtctcttta tgaggagttg  180
tggcccgttg tcaggcaacg tggcgtggtg tgcactgtgt ttgctgacgc aaccccact   240
ggttggggca ttgccaccac ctgtcagctc ctttccggga cttttcgcttt ccccctcct   300
attgccacgg cggaactcat cgccgcctgc cttgcccgct gctgacagg  ggctcggctg  360
ttgggcactg acaattccgt ggtgttgtcg gggaaatcat cgtcctttcc ttggctgctc  420
gcctgtgttg ccacctggat tctgcgcggg acgtccttct gctacgtccc ttcggccctc  480
aatccagcgg accttccttc ccgcggcctg ctgccggctc tgcggcctct tccgcgtctt  540
cgccttgcc  ctcagacgag tcggatctcc ctttgggccg cctccccgcc taagcttatc  600
gataccgtcg agatctaact tgtttattgc agcttataat ggttacaaat aaagcaatag  660
catcacaaat ttcacaaata aagcattttt ttcactgcat tctagttgtg gtttgtccaa  720
actcatcaat gtatcttatc atgtctggat ctcgacctcg actagagcat ggctacgtag  780
ataagtagca tggcgggtta atcattaact acaaggaact cctagtagtg gagttggcca  840
ctccctctct gcgcgctcgc tcgctcactg aggccgggcg accaaaggtc gcccgacgcc  900
cgggctttgc ccgggcggcc tcagtgagcg agcgagcgcg cagctggcgt aatagcgaag  960
aggcccgcac cgatcgccct tcccaacagt tgcgcagcct gaatggcgaa tggcgattcc  1020
gttgcaatgg ctggcggtaa tattgttctg gatattacca caaggccgaa tagtttgagt  1080
tcttctactc aggcaagtga tgttattact aatcaaagaa gtattgcgac aacggttaat  1140
ttgcgtgatg gacagactct tttactcggt ggcctcactg attataaaaa cacttctcag  1200
gattctggcg taccgttcct gtctaaaatc cctttaatcg gcctcctgtt tagctcccgc  1260
tctgattcta acgaggaaag cacgttatac gtgctcgtca aagcaaccat agtacgcgcc  1320
ctgtagcggc gcattaagcg cggcgggtgt ggtggttacg cgcagcgtga ccgctacact  1380
tgccagcgcc ctagcgcccg ctcctttcgc tttcttccct tcctttctcg ccacgttcgc  1440
cggctttccc cgtcaagctc taaatcgggg gctcccttta gggttccgat ttagtgcttt  1500
acggcacctc gaccccaaaa aacttgatta gggtgatggt tcacgtagtg ggccatcgcc  1560
ctgatagacg gttttttcgcc ctttgacgtt ggagtccacg ttctttaata gtggactctt  1620
gttccaaact ggaacaacac tcaacccat  ctcggtctat tcttttgatt tataagggat  1680
tttgccgatt tcggcctatt ggttaaaaaa tgagctgatt taacaaaaat ttaacgcgaa  1740
ttttaacaaa atattaacgt ttacaattta aatatttgct tatacaatct tcctgttttt  1800
ggggcttttc tgattatcaa ccggggtaca tatgattgac atgctagttt tacgattacc  1860
gttcatcgat tctcttgttt gctccagact ctcaggcaat gacctgatag cctttgtaga  1920
gacctctcaa aaatagctac cctctccggc atgaatttat cagctagaac ggttgaatat  1980
catattgatg gtgatttgac tgtctccggc ctttctcacc cgtttgaatc tttacctaca  2040
cattactcag gcattgcatt taaaatatat gagggttcta aaaattttta tccttgcgtt  2100
gaaataaagg cttctcccgc aaaagtatta caggcatca  atgttttgg  tacaaccgat  2160
ttagcttat  gctctgaggc tttattgctt aattttgcta attctttgcc ttgcctgtat  2220
gatttattgg atgttggaat tcctgatgcg gtattttctc cttacgcatc tgtgcggtat  2280
ttcacaccgc atatggtgca ctctcagtac aatctgctct gatgccgcat agttaagcca  2340
gccccgacac ccgccaacac ccgccgacgc gccctgacgg gcttgtctgc tcccggcatc  2400
cgcttacaga caagctgtga ccgtctccgg gagctgcatg tgtcagaggt tttcaccgtc  2460
atcaccgaaa cgcgcgagac gaaagggcct cgtgatacgc ctatttttat aggttaatgt  2520
catgataata atggtttctt agacgtcagg tggcactttt cggggaaatg tgcgcggaac  2580
ccctatttgt ttatttttct aaatacattc aaatatgtat ccgctcatga caataaccc   2640
tgataaatg cttcaataat attgaaaaag gaagagtatg agtattcaac atttccgtgt  2700
cgcccttatt cccttttttg cggcattttg ccttcctgtt tttgctcacc cagaaacgct  2760
ggtgaaagta aaagatgctg aagatcagtt gggtgcacga gtgggttaca tcgaactgga  2820
tctcaacagc ggtaagatcc ttgagagttt tcgccccgaa gaacgttttc caatgatgag  2880
cacttttaaa gttctgctat gtggcgcggt attatcccgt attgacgccg ggcaagagca  2940
actcggtcgc cgcatacact attctcagaa tgacttggtt gagtactcac cagtcacaga  3000
```

-continued

```
aaagcatctt acggatggca tgacagtaag agaattatgc agtgctgcca taaccatgag 3060
tgataacact gcggccaact tacttctgac aacgatcgga ggaccgaagg agctaaccgc 3120
ttttttgcac aacatggggg atcatgtaac tcgccttgat cgttgggaac cggagctgaa 3180
tgaagccata ccaaacgacg agcgtgacac cacgatgcct gtagcaatgg caacaacgtt 3240
gcgcaaacta ttaactggcg aactacttac tctagcttcc cggcaacaat taatagactg 3300
gatggaggcg gataaagttg caggaccact tctgcgctcg gcccttccgg ctggctggtt 3360
tattgctgat aaatctggag ccggtgagcg tgggtctcgc ggtatcattg cagcactggg 3420
gccagatggt aagccctccc gtatcgtagt tatctacacg acggggagtc aggcaactat 3480
ggatgaacga aatagacaga tcgctgagat aggtgcctca ctgattaagc attggtaact 3540
gtcagaccaa gtttactcat atatacttta gattgattta aaacttcatt tttaatttaa 3600
aaggatctag gtgaagatcc ttttttgataa tctcatgacc aaaatccctt aacgtgagtt 3660
ttcgttccac tgagcgtcag acccgtaga aagatcaaa ggatcttctt gagatccttt 3720
ttttctgcgc gtaatctgct gcttgcaaac aaaaaaacca ccgctaccag cggtggtttg 3780
tttgccggat caagagctac caactctttt tccgaaggta actggcttca gcagagcgca 3840
gataccaaat actgtccttc tagtgtagcc gtagttaggc caccacttca agaactctgt 3900
agcaccgcct acatacctcg ctctgctaat cctgttacca gtggctgctg ccagtggcga 3960
taagtcgtgt cttaccgggt tggactcaag acgatagtta ccggataagg cgcagcggtc 4020
gggctgaacg gggggttcgt gcacacagcc cagcttggag cgaacgacct acaccgaact 4080
gagataccta cagcgtgagc tatgagaaag cgccacgctt cccgaaggga gaaaggcgga 4140
caggtatccg gtaagcggca gggtcggaac aggagagcgc acgagggagc ttccaggggg 4200
aaacgcctgg tatctttata gtcctgtcgg gtttcgccac ctctgacttg agcgtcgatt 4260
tttgtgatgc tcgtcagggg ggcggagcct atggaaaaac gccagcaacg cggccttttt 4320
acggttcctg gccttttgct ggccttttgc tcacatgttc tttcctgcgt tatccctga 4380
ttctgtggat aaccgtatta ccgcctttga gtgagctgat accgctcgcc gcagccgaac 4440
gaccgagcgc agcgagtcag tgagcgagga agcggaagag cgcccaatac gcaaaccgcc 4500
tctccccgcg cgttggccga ttcattaatg cagcagctgc gcgctcgctc gctcactgag 4560
gccgcccggg caaagcccgg gcgtcgggcg acctttggtc gcccggcctc agtgagcgag 4620
cgagcgcgca gagagggagt ggccaactcc atcactaggg gttccttgta gttaatgatt 4680
aacccgccat gctacttatc tacgtagcca tgctctagga cattgattat tgactagtgg 4740
agttccgcgt tacataactt acggtaaatg ccccgcctgg ctgaccgccc aacgaccccc 4800
gcccattgac gtcaataatg acgtatgttc ccatagtaac gccaataggg actttccatt 4860
gacgtcaatg ggtggagtat ttacggtaaa ctgcccactt ggcagtacat caagtgtatc 4920
atatgccaag tacgccccct attgacgtca atgacggtaa atggcccgcc tggcattatg 4980
cccagtacat gaccttatgg gactttccta cttggcagta catctacgta ttagtcatcg 5040
ctattaccat ggtcgaggtg agccccacgt tctgcttcac tctccccatc tcccccccct 5100
ccccaccccc aatttgtat ttatttattt tttaattatt ttgtgcagcg atggggggcgg 5160
ggggggggg gggcgcgcgc caggcggggc ggggcgggc gaggggcggg gcggggcgag 5220
gcggagaggt gcggcggcag ccaatcagag cggcgcgctc cgaaagtttc cttttatggc 5280
gaggcggcgg cggcggcggc cctataaaaa gcgaagcgcg cggcgggcgg gagtcgctgc 5340
gcgctgcctt cgccccgtgc cccgctccgc cgccgcctcg cgccgcccgc cccggctctg 5400
actgaccgcg ttactaaaac aggtaagtcc ggcctccgcg ccgggtttg gcgcctcccg 5460
cgggcgcccc cctcctcacg gcgagcgctg ccacgtcaga cgaagggcgc agcgagcgtc 5520
ctgatccttc cgcccggacg ctcaggacag cggcccgctg ctcataagac tcggccttag 5580
aaccccagta tcagcagaag gacattttag gacgggactt gggtgactct agggcactgg 5640
ttttctttcc agagagcgga acaggcgagg aaaagtagtc ccttctcggc gattctgcgg 5700
agggatctcc gtgggcggt gaacgccgat gatgcctcta ctaaccatgt tcatgttttc 5760
ttttttttc tacaggtcct gggtgacgaa cagggtaccg ccaccatggc caccggctct 5820
cgcacaagcc tgctgctggc tttcggactg ctgtgcctgc cttggctcca ggagggctcc 5880
gccgctagca tcgataccgt cgctatgtgc tggaggcttg ctgaaggctg tatgctgtcg 5940
tactgacttg taggtatgcc gttttggcct ctgactgacg gcatacctaa gtcagtacgt 6000
caggacacaa ggcctgttac tagcactcac atggaacaaa tggcctctag cctgaggct 6060
tgctgaaggc tgtatgctga ctcctaatca atagcttcca ccgttttggc ctctgactga 6120
cggtggaagc ttgattagga gtcaggacac aaggcctgtt actagcactc acatggaaca 6180
aatgcctct agcctggagg cttgctgaag gctgtatgct gaatatgcct ttaagctttg 6240
ctgcgttttg gcctctgact gacgcagcaa agcaaaggca tattcaggac acaaggcctg 6300
ttactagcac tcacatggaa caaatggcct ctctagaat 6339
```